(12) United States Patent
Backus

(10) Patent No.: US 9,924,824 B2
(45) Date of Patent: Mar. 27, 2018

(54) DEVICES AND METHODS TO DISINTEGRATE FOODS

(71) Applicant: Alan L. Backus, Los Angeles, CA (US)

(72) Inventor: Alan L. Backus, Los Angeles, CA (US)

(73) Assignee: Alan L. Backus, Los Angeles, CA (US)

( * ) Notice: Subject to any disclaimer, the term of this patent is extended or adjusted under 35 U.S.C. 154(b) by 378 days.

(21) Appl. No.: 14/524,395

(22) Filed: Oct. 27, 2014

(65) Prior Publication Data

US 2015/0101495 A1    Apr. 16, 2015

Related U.S. Application Data

(63) Continuation of application No. 13/785,198, filed on Mar. 5, 2013, now Pat. No. 8,869,686, which is a continuation of application No. 12/627,731, filed on Nov. 30, 2009, now Pat. No. 8,387,520, which is a continuation of application No. 12/577,483, filed on Oct. 12, 2009, now Pat. No. 8,807,022.

(51) Int. Cl.
| | |
|---|---|
| *A23N 1/00* | (2006.01) |
| *A47J 19/02* | (2006.01) |
| *A23N 1/02* | (2006.01) |
| *B02C 18/24* | (2006.01) |
| *A23L 13/50* | (2016.01) |
| *A23L 5/10* | (2016.01) |
| *A47J 37/12* | (2006.01) |

(52) U.S. Cl.
CPC ............ *A47J 19/027* (2013.01); *A23L 5/11* (2016.08); *A23L 13/55* (2016.08); *A23N 1/003* (2013.01); *A23N 1/02* (2013.01); *A47J 37/1257* (2013.01); *B02C 18/24* (2013.01); *A23N 1/00* (2013.01)

(58) Field of Classification Search
CPC .......... A23N 1/003; A23N 1/00; A47J 19/027
USPC ............................................. 99/510, 511, 513
See application file for complete search history.

(56) References Cited

U.S. PATENT DOCUMENTS

| | | |
|---|---|---|
| 241,024 A | 5/1881 | Kieser |
| 490,802 A | 1/1893 | Dunham et al. |
| 879,440 A | 2/1908 | Carothers |
| 1,955,975 A | 4/1934 | F'Uterbaugh |
| 1,958,570 A | 3/1936 | Griffin |
| 2,032,477 A | 2/1938 | Lorenzen |
| 2,109,398 A | 2/1938 | McNitt |
| 2,273,093 A | 2/1942 | Drachenberg |
| 2,274,306 A | 2/1942 | Smith |

(Continued)

OTHER PUBLICATIONS

UL 1083 "Standard for Safety, Household Electic Skillets and Frying-Tape Appliances," 6th Edition, dated Jan. 9, 2009, pp. 1-127.

*Primary Examiner* — Reginald L Alexander
(74) *Attorney, Agent, or Firm* — Ulmer & Berne LLP

(57) ABSTRACT

The subject application is directed to a food processing device to extract juice. The device includes an inlet coupled to a disintegrator. The inlet is configured to accept food items and the disintegrator configured to disintegrate food items passed through the inlet. The device further includes a separator that accepts the disintegrated food items and separates out the liquid components from the food item. The device further includes a reservoir that is coupled to the separator for accepting and holding the liquid components. The reservoir includes a translucent member for viewing of liquid levels within the reservoir, and a valved outlet. The valved outlet is configured to allow or prevent the flow of liquid from the reservoir through the valved outlet.

4 Claims, 46 Drawing Sheets

(56) References Cited

U.S. PATENT DOCUMENTS

| | | | |
|---|---|---|---|
| 2,297,880 A | 10/1942 | Fredrickson | |
| 2,302,138 A | 11/1942 | Nicholson | |
| 2,311,379 A | 2/1943 | Gillanders | |
| 2,315,028 A | 3/1943 | Thomas | |
| 2,325,779 A | 8/1943 | Kraber | |
| 2,345,683 A | 4/1944 | Owens | |
| 2,481,010 A | 9/1949 | Gundelfinger | |
| 2,510,420 A | 6/1950 | Ross | |
| 2,513,974 A | 7/1950 | Thomas | |
| 2,527,695 A | 10/1950 | Bennett | |
| 2,558,799 A | 7/1951 | Thomas | |
| 2,572,286 A | 10/1951 | Smith | |
| 2,608,152 A | 8/1952 | Halt | |
| 2,649,730 A | 8/1953 | Halt | |
| 2,655,354 A | 10/1953 | Murray | |
| 2,742,852 A | 4/1956 | McCulloch | |
| 2,840,130 A | 6/1958 | Schwarz | |
| 2,844,176 A | 7/1958 | Barrows et al. | |
| 2,845,971 A | 8/1958 | Cordero | |
| 2,864,419 A | 12/1958 | Woock | |
| 3,126,818 A | 3/1964 | Koelsch | |
| 3,203,343 A | 8/1965 | Myers | |
| 3,566,939 A | 3/1971 | Hubrich | |
| 3,916,776 A | 11/1975 | Arao et al. | |
| 3,976,001 A | 8/1976 | Trovinger | |
| 4,034,664 A | 7/1977 | Hassell | |
| 4,078,481 A | 3/1978 | Wunderlin | |
| 4,085,899 A | 4/1978 | Boothe | |
| 4,183,293 A | 1/1980 | Arao et al. | |
| 4,297,038 A | 10/1981 | Falkenbach | |
| 4,350,087 A | 9/1982 | Ramirez | |
| 4,363,265 A | 12/1982 | Tanioka et al. | |
| 4,393,760 A | 7/1983 | Hasegawa | |
| 4,429,626 A | 2/1984 | Ihara et al. | |
| 4,440,074 A | 4/1984 | Ihara et al. | |
| 4,506,601 A | 3/1985 | Ramirez et al. | |
| 4,614,153 A | 9/1986 | Kurome et al. | |
| 4,643,085 A | 2/1987 | Bertocchi | |
| 4,681,031 A | 7/1987 | Austad | |
| 4,700,621 A | 10/1987 | Elger | |
| 4,711,167 A | 12/1987 | Sano | |
| 4,744,522 A | 5/1988 | Borgmann et al. | |
| 4,924,770 A | 5/1990 | Raub | |
| 5,031,522 A | 7/1991 | Brixel et al. | |
| 5,031,524 A | 7/1991 | Wettlaufer | |
| 5,035,174 A | 7/1991 | Seal, Jr. | |
| 5,156,872 A | 10/1992 | Lee | |
| 5,207,152 A * | 5/1993 | Wettlaufer | B30B 9/02 |
| | | | 100/116 |
| 5,222,430 A | 6/1993 | Wang | |
| 5,257,575 A | 11/1993 | Harrison et al. | |
| 5,289,763 A | 3/1994 | Le Rouzic et al. | |
| 5,355,784 A | 10/1994 | Franklin et al. | |
| 5,381,730 A | 1/1995 | Kim | |
| 5,392,699 A | 2/1995 | Tai | |
| 5,421,248 A | 6/1995 | Hsu | |
| 5,433,144 A | 7/1995 | Lee | |
| 5,452,650 A | 9/1995 | Lee | |
| 5,479,851 A | 1/1996 | McClean et al. | |
| 5,495,795 A | 3/1996 | Harrison et al. | |
| 5,537,918 A | 7/1996 | Patel et al. | |
| 5,592,873 A | 1/1997 | Lee | |
| 5,613,430 A | 3/1997 | Lee | |
| 5,669,292 A | 9/1997 | Chen | |
| 5,743,176 A | 4/1998 | Anderson et al. | |
| 5,771,791 A | 6/1998 | Ling et al. | |
| 5,784,954 A | 7/1998 | Kokot et al. | |
| 5,806,413 A | 9/1998 | Trovinger | |
| 5,819,641 A | 10/1998 | Hsu | |
| 5,857,406 A | 1/1999 | Scheucher et al. | |
| 5,896,812 A | 4/1999 | Basora et al. | |
| 5,906,154 A | 5/1999 | Yoon et al. | |
| 5,924,357 A | 7/1999 | Chen | |
| 6,050,180 A | 4/2000 | Moline | |
| 6,065,861 A | 5/2000 | Chen | |
| 6,135,019 A | 10/2000 | Chou | |
| 6,202,547 B1 | 3/2001 | Tseng et al. | |
| 6,397,736 B1 | 6/2002 | Tseng et al. | |
| 6,412,404 B1 | 7/2002 | Hsu | |
| 6,425,321 B1 | 7/2002 | Yip | |
| 6,510,784 B1 | 1/2003 | Fevre et al. | |
| 6,527,570 B1 | 3/2003 | Hartman et al. | |
| 6,543,340 B1 | 4/2003 | Fouquet | |
| 6,604,454 B1 | 8/2003 | Tateno | |
| 6,637,323 B2 | 10/2003 | Kim | |
| 6,638,076 B2 | 10/2003 | Wang | |
| 6,669,124 B2 | 12/2003 | Lazzer et al. | |
| 6,709,150 B2 | 3/2004 | Lin | |
| 6,722,268 B2 | 4/2004 | Catelli et al. | |
| 6,791,576 B1 | 4/2004 | Hartman et al. | |
| 6,736,054 B2 | 5/2004 | Dionne | |
| 6,742,447 B1 | 6/2004 | Chen | |
| 6,813,997 B1 | 11/2004 | Lin | |
| 6,854,382 B2 | 2/2005 | Jan | |
| 6,862,982 B1 | 3/2005 | Wang | |
| 6,907,819 B2 | 6/2005 | Kernan | |
| 6,910,800 B2 | 6/2005 | Wu | |
| 6,962,107 B1 | 11/2005 | Yang | |
| 6,968,777 B2 | 11/2005 | Lin | |
| 6,971,306 B2 | 12/2005 | Areh et al. | |
| 6,981,442 B1 | 1/2006 | Lin | |
| 6,981,795 B2 * | 1/2006 | Nikkah | A47J 43/042 |
| | | | 241/46.17 |
| 7,004,414 B2 | 2/2006 | Chen | |
| 7,028,930 B2 | 4/2006 | Carnevale | |
| 7,040,220 B1 | 5/2006 | Cohen et al. | |
| 7,044,051 B2 | 5/2006 | Le Rouzic | |
| 7,059,241 B2 | 6/2006 | Lin | |
| 7,063,009 B2 | 6/2006 | Lin | |
| 7,066,082 B2 | 6/2006 | O'Loughlin | |
| 7,074,046 B2 | 7/2006 | Kernan | |
| 7,080,594 B2 | 7/2006 | Lin | |
| 7,086,328 B1 | 8/2006 | Mendes | |
| 7,117,784 B2 | 10/2006 | de Groote | |
| D540,127 S | 4/2007 | Ye et al. | |
| 7,252,252 B2 | 8/2007 | Mauch et al. | |
| 7,311,526 B2 | 12/2007 | Rohrbach et al. | |
| 7,318,375 B2 | 1/2008 | Huang | |
| 7,328,655 B2 | 2/2008 | Baptista | |
| 7,337,715 B2 | 3/2008 | Suter et al. | |
| 7,351,066 B2 | 4/2008 | DiFonzo et al. | |
| 7,421,945 B2 | 9/2008 | Schrader et al. | |
| 7,422,361 B2 * | 9/2008 | Pryor, Jr. | A47J 43/046 |
| | | | 366/197 |
| 7,442,042 B1 | 10/2008 | Lewis | |
| 7,461,801 B2 | 12/2008 | Chang | |
| 7,481,155 B2 | 1/2009 | Larsen | |
| 7,487,721 B2 | 2/2009 | Amador et al. | |
| 7,517,235 B2 | 4/2009 | Bagewadi et al. | |
| 7,587,974 B2 | 9/2009 | Cohen et al. | |
| 7,641,477 B2 | 1/2010 | DiFonzo et al. | |
| 7,645,143 B2 | 1/2010 | Rohrbach et al. | |
| 7,736,151 B2 | 6/2010 | Yang | |
| 7,762,817 B2 | 7/2010 | Ligtenberg et al. | |
| 7,771,202 B2 | 8/2010 | Amotz et al. | |
| 7,901,216 B2 | 3/2011 | Rohrbach et al. | |
| 7,931,472 B2 | 4/2011 | David et al. | |
| 7,997,906 B2 | 8/2011 | Ligtenberg et al. | |
| 8,087,939 B2 | 1/2012 | Rohrbach et al. | |
| 8,177,560 B2 | 5/2012 | Rohrbach et al. | |
| 8,186,265 B2 | 5/2012 | Popeil et al. | |
| 8,309,151 B2 | 11/2012 | Popeil et al. | |
| 8,348,678 B2 | 1/2013 | Hardisty et al. | |
| 8,435,042 B2 | 5/2013 | Rohrbach et al. | |
| 8,497,753 B2 | 7/2013 | DiFonzo et al. | |
| 8,535,088 B2 | 9/2013 | Gao et al. | |
| 2006/0086261 A1 | 4/2006 | Cohen et al. | |
| 2007/0074630 A1 | 4/2007 | Mengual | |
| 2007/0261571 A1 | 11/2007 | Esteve | |

\* cited by examiner

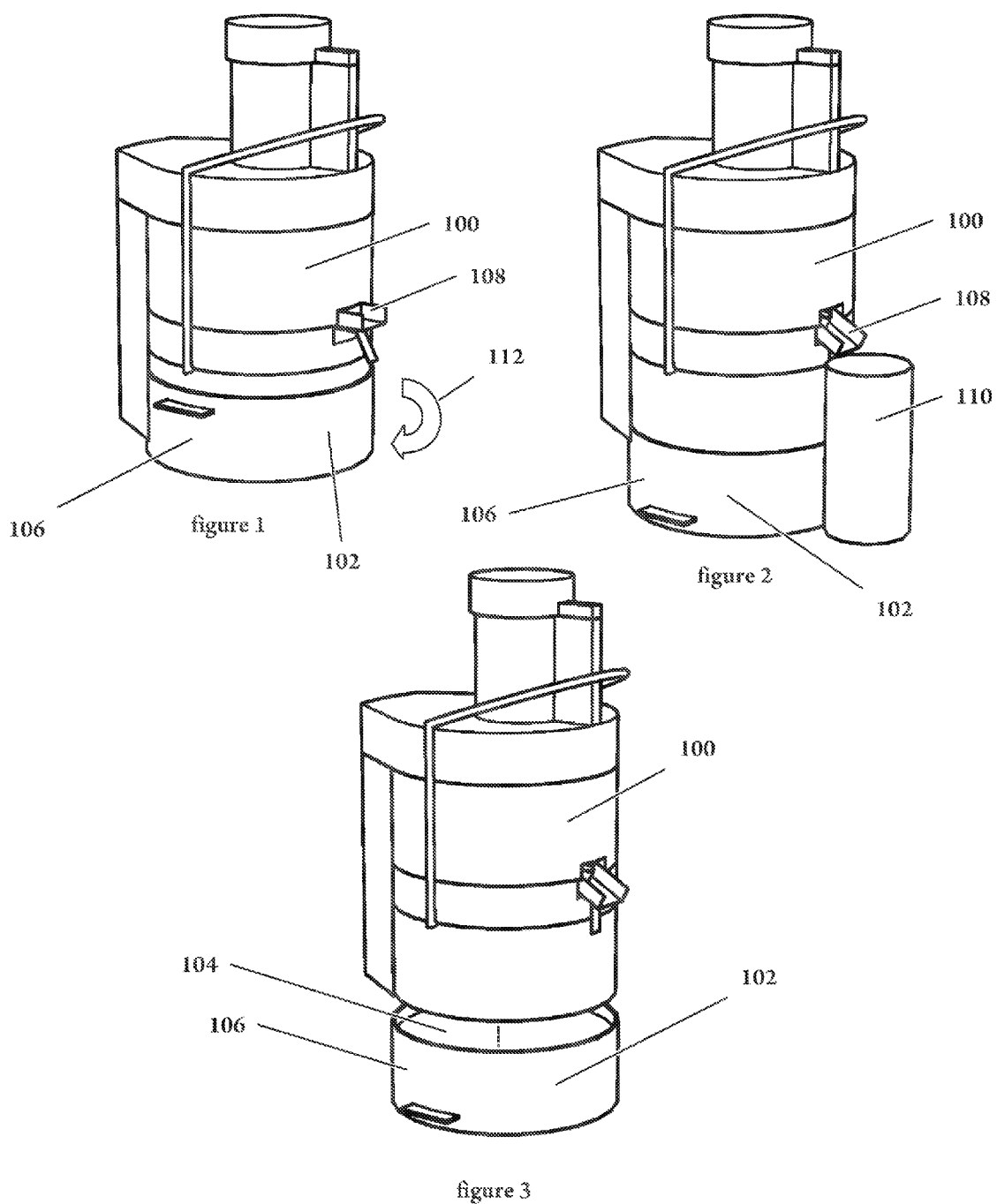

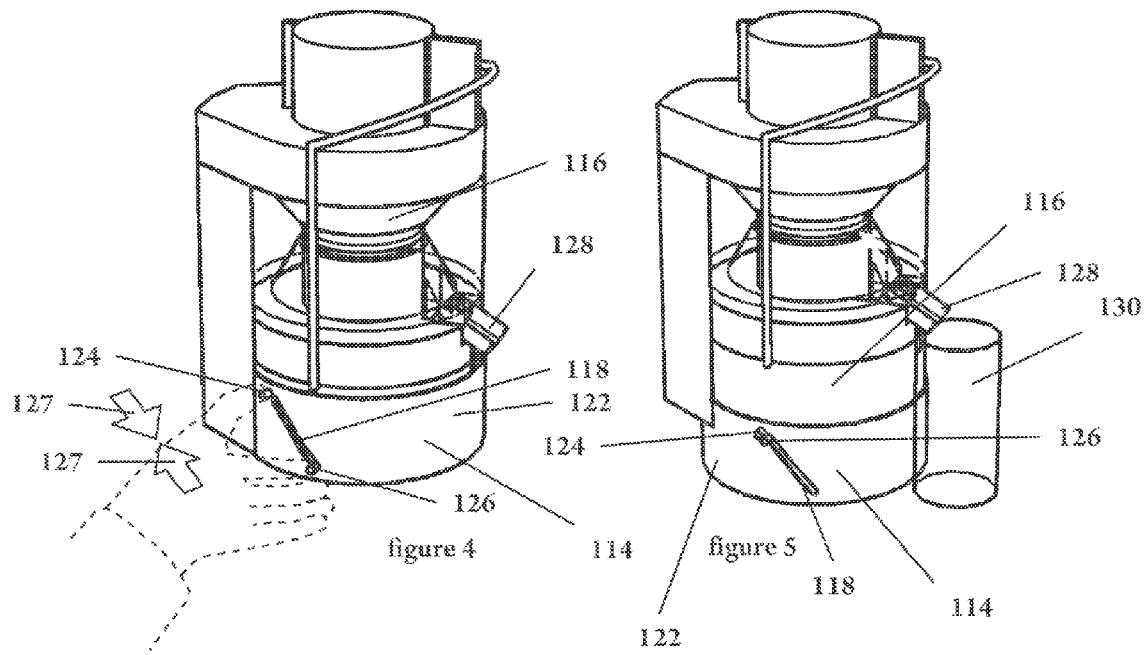
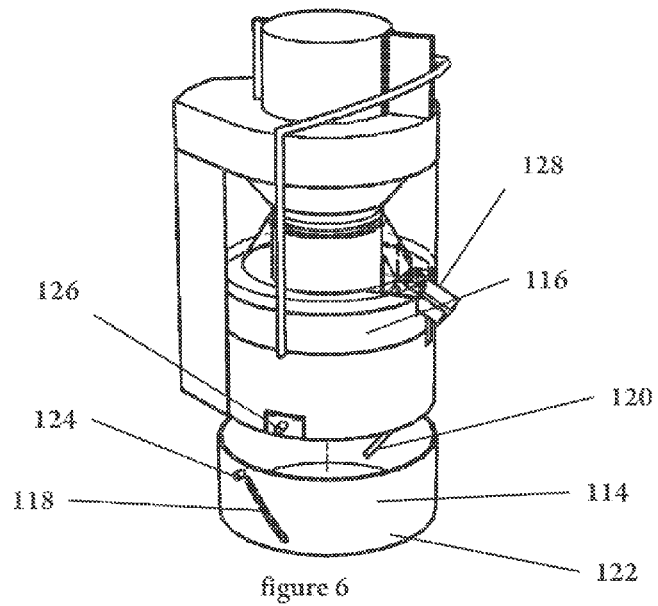

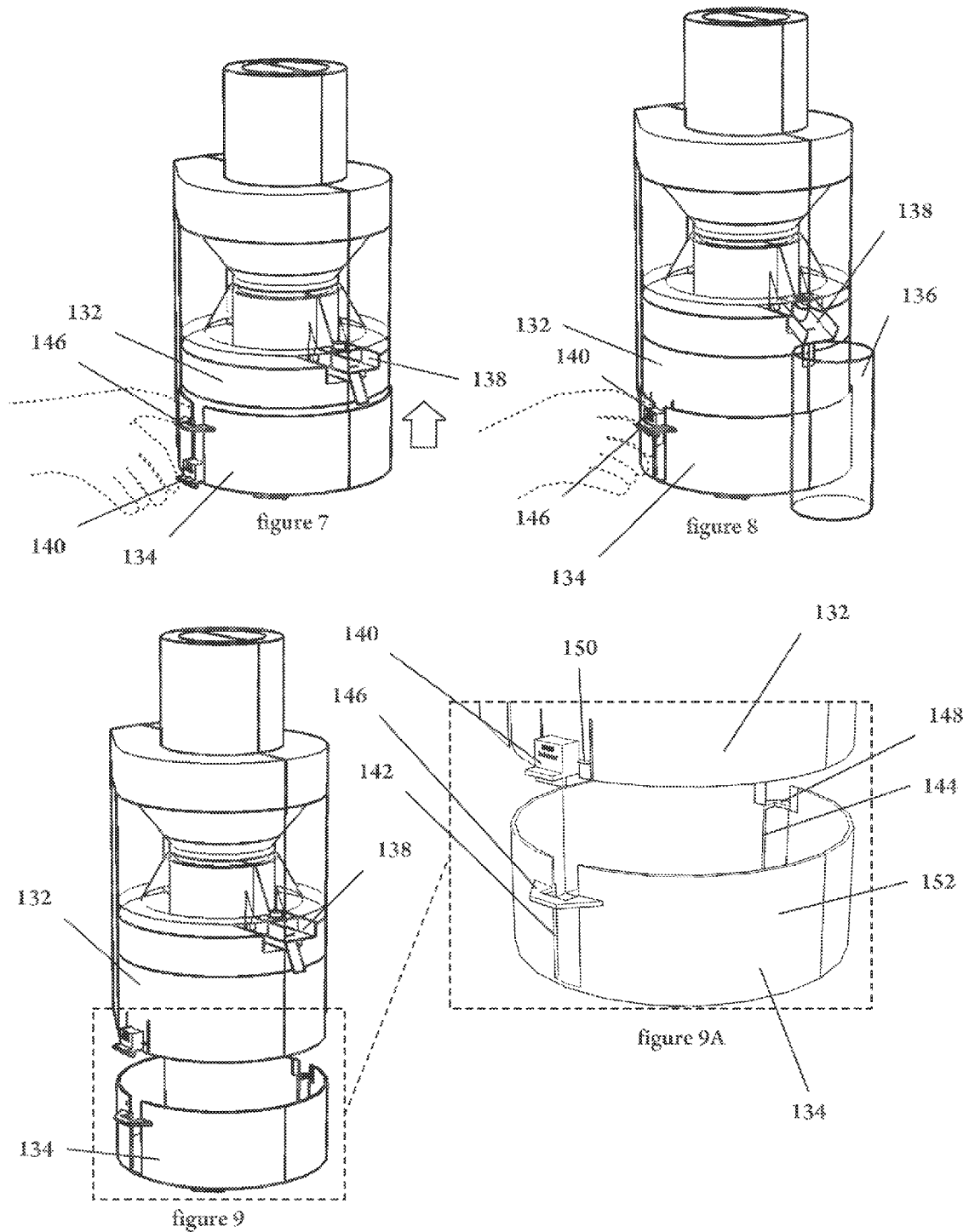

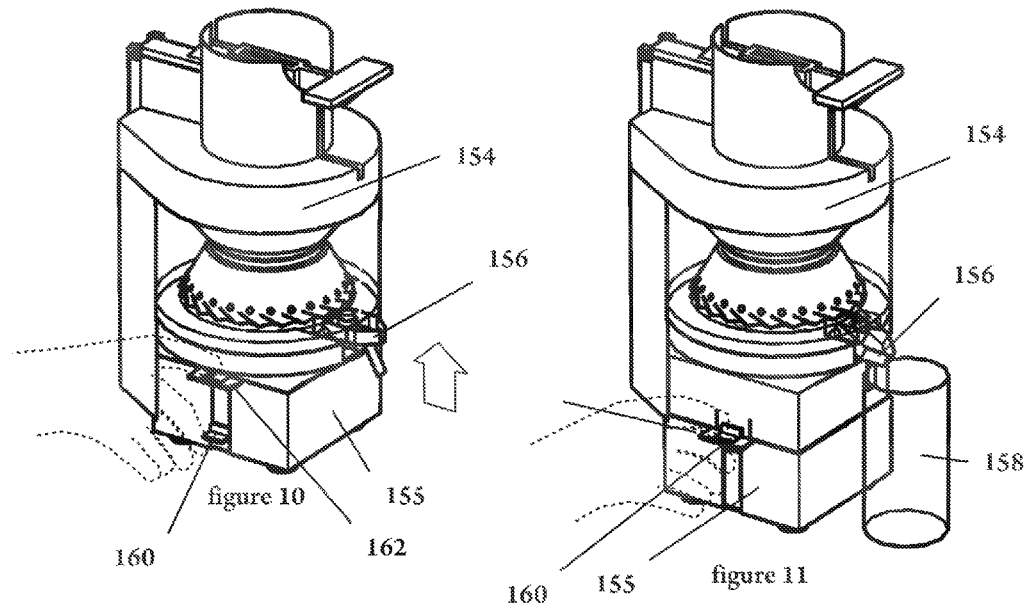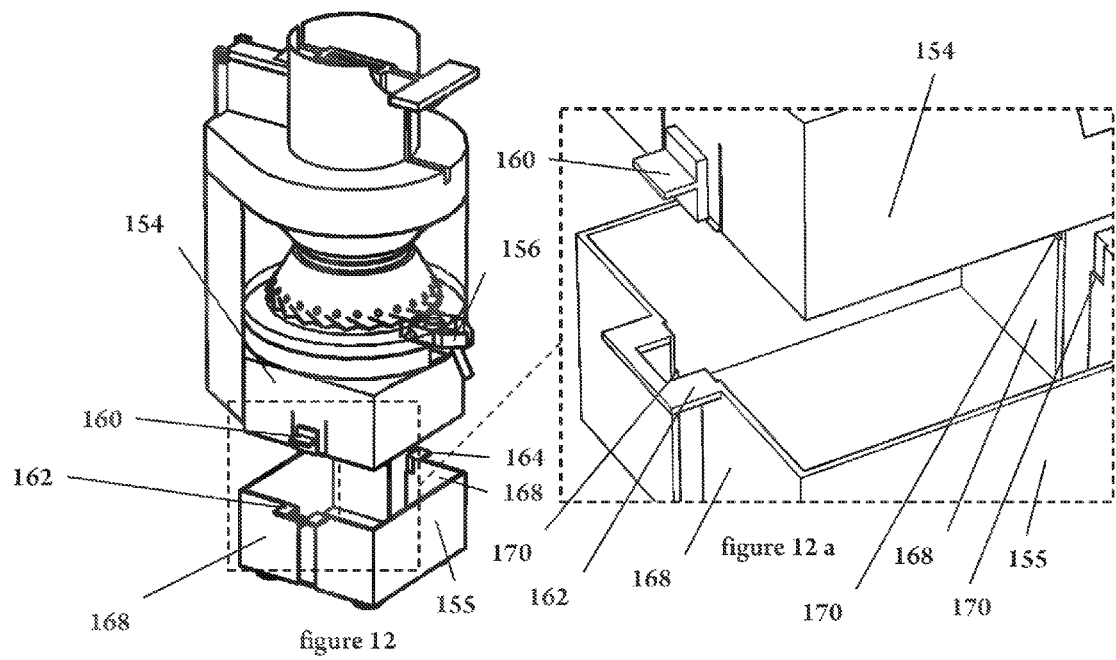

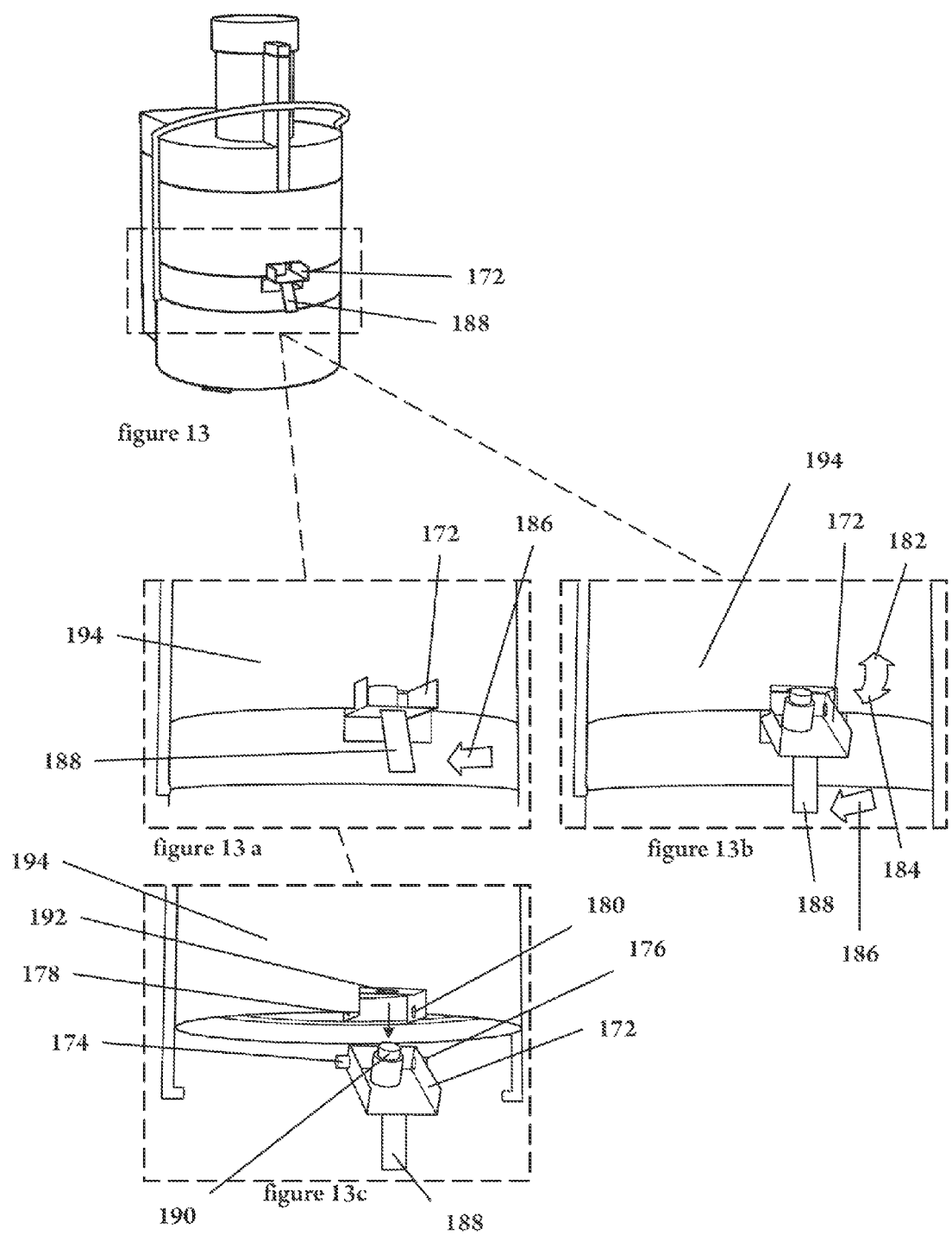

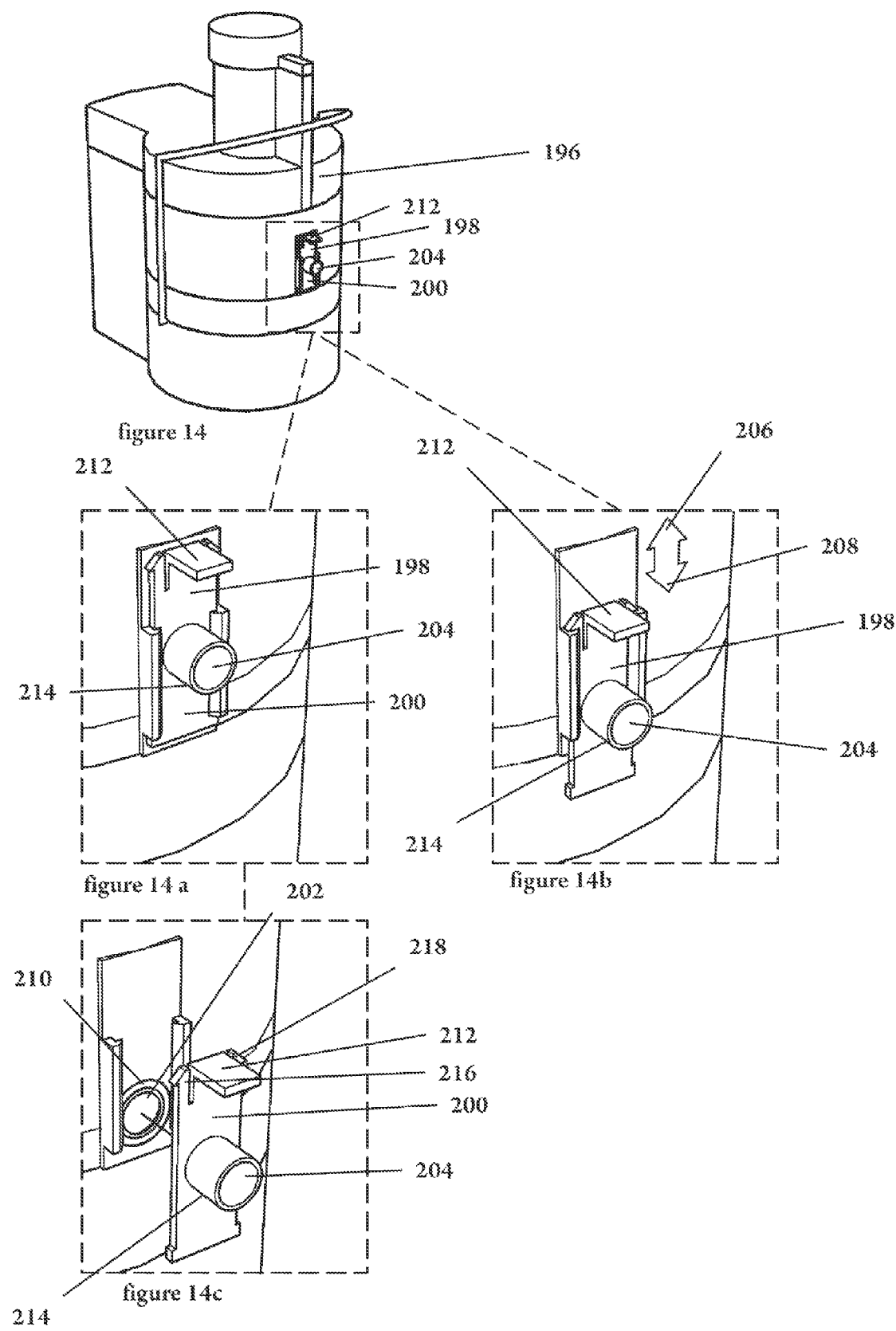

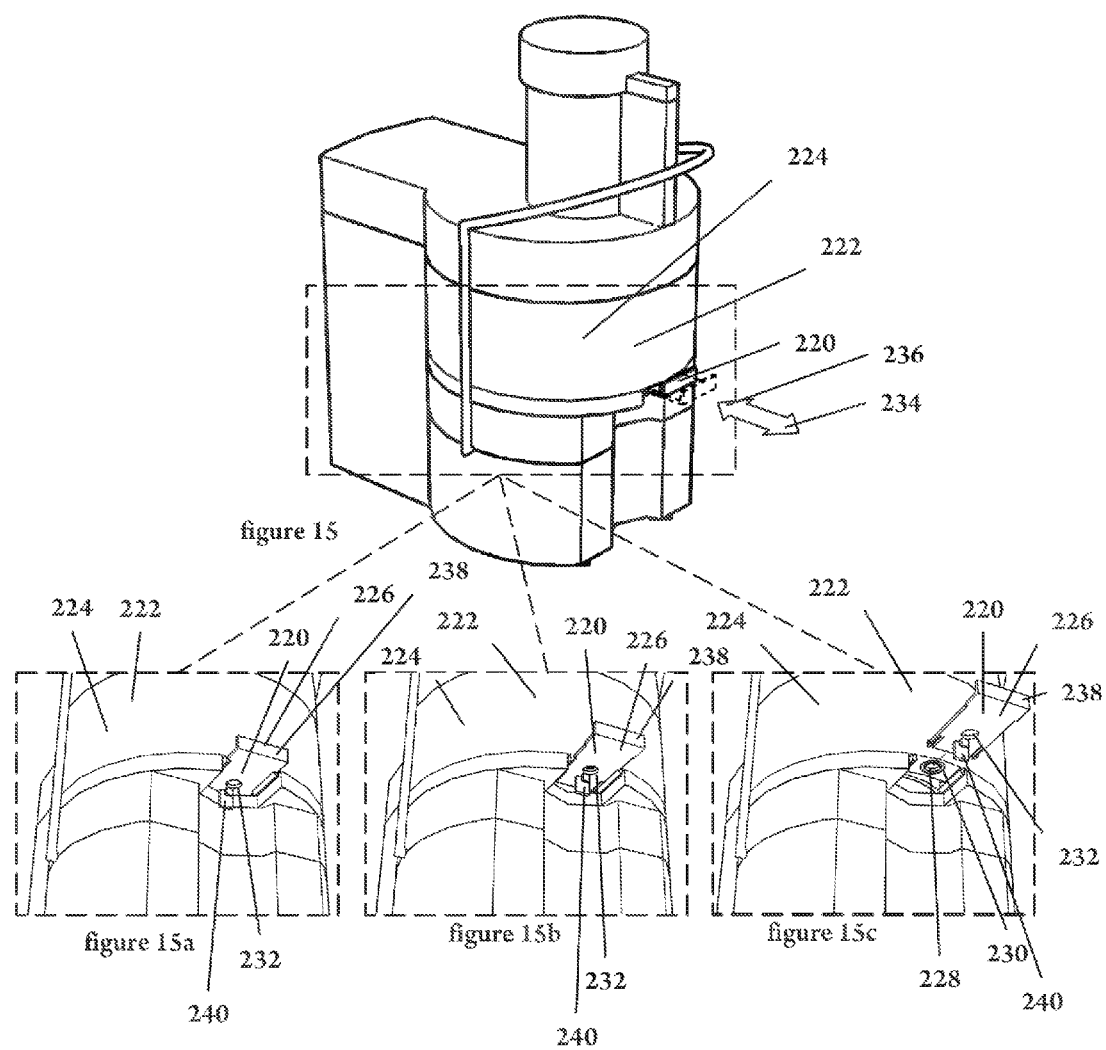

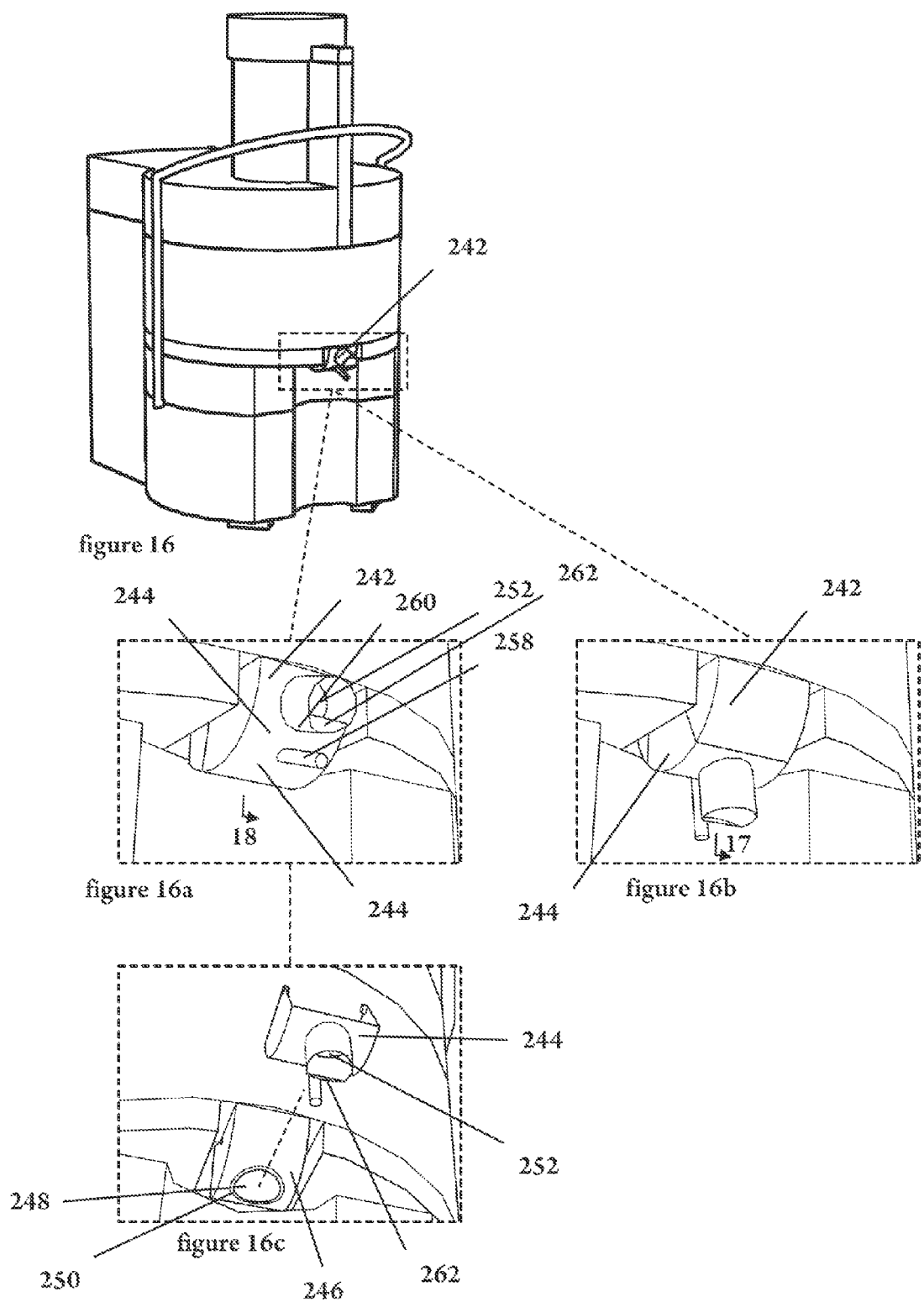

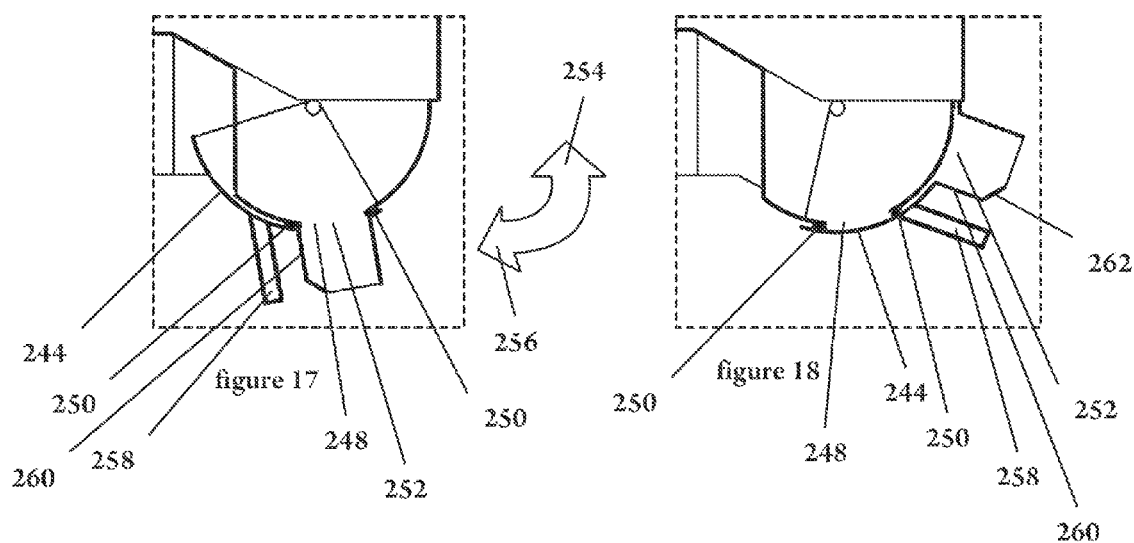

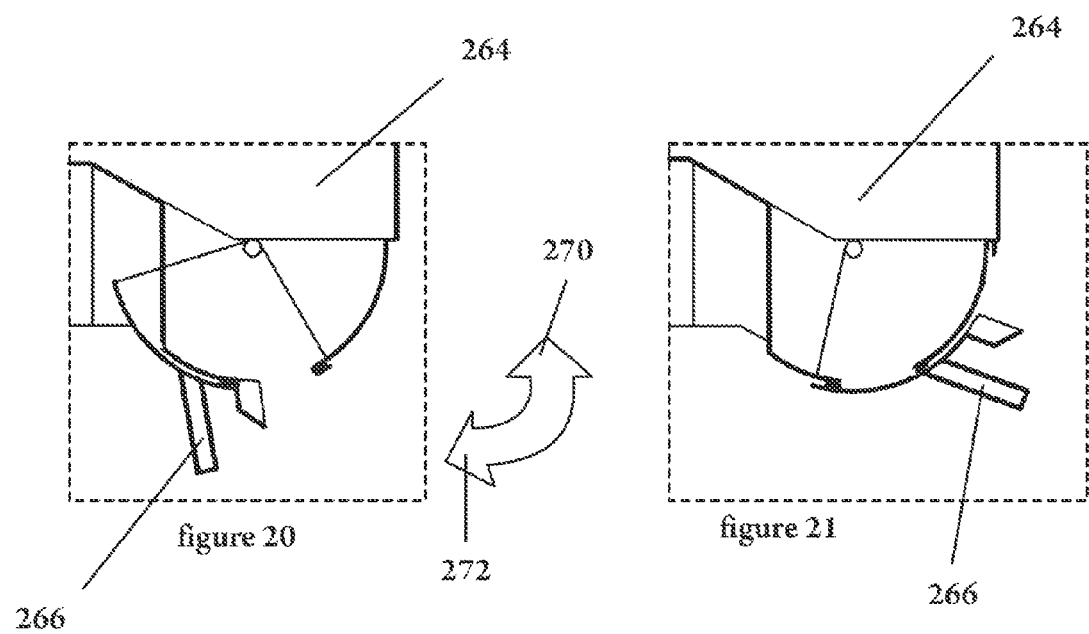

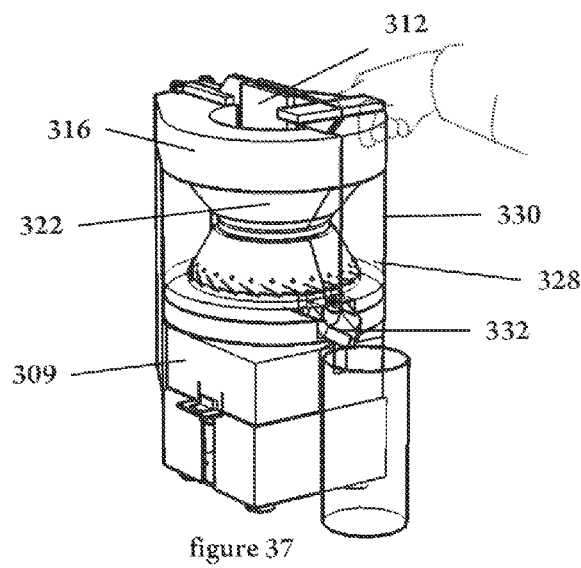
figure 37
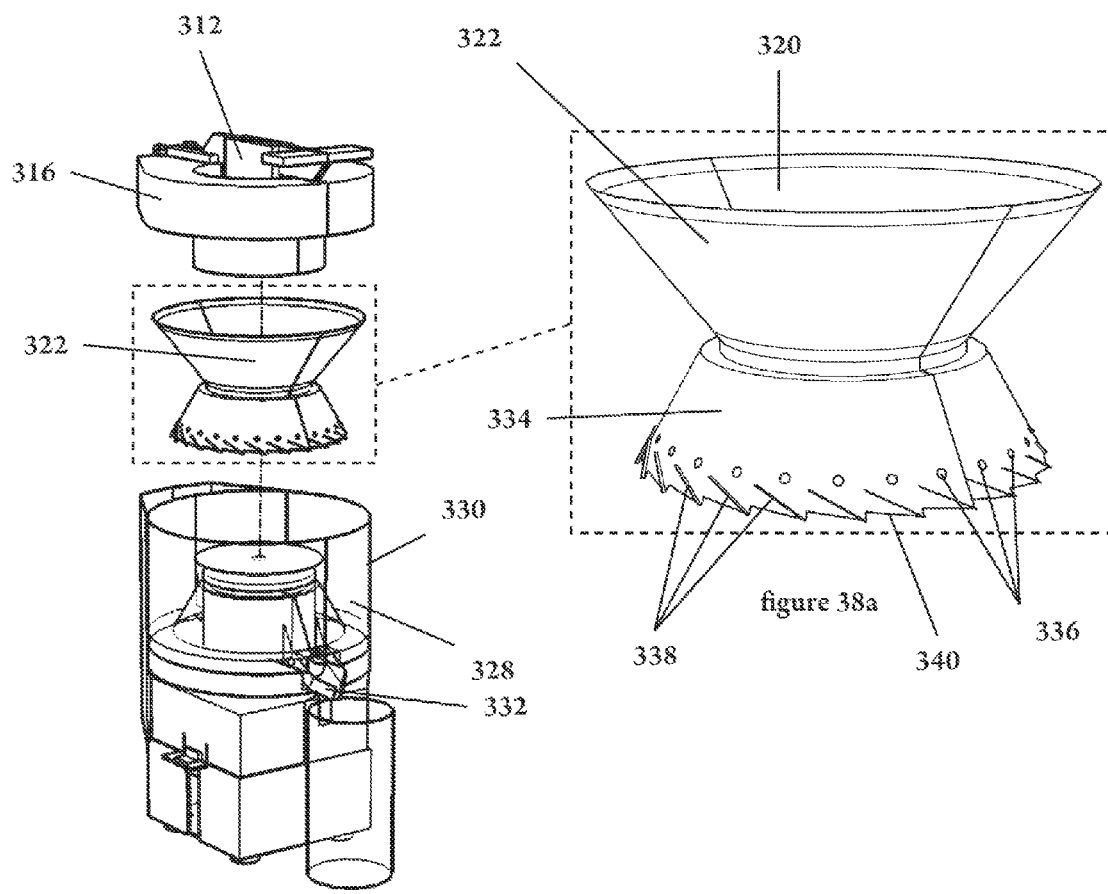
figure 38a
figure 38

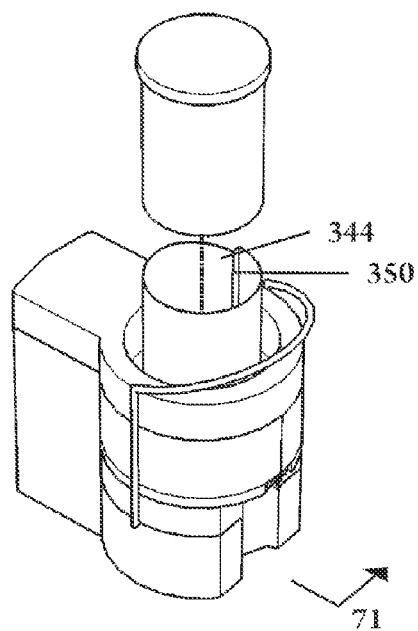
figure 68
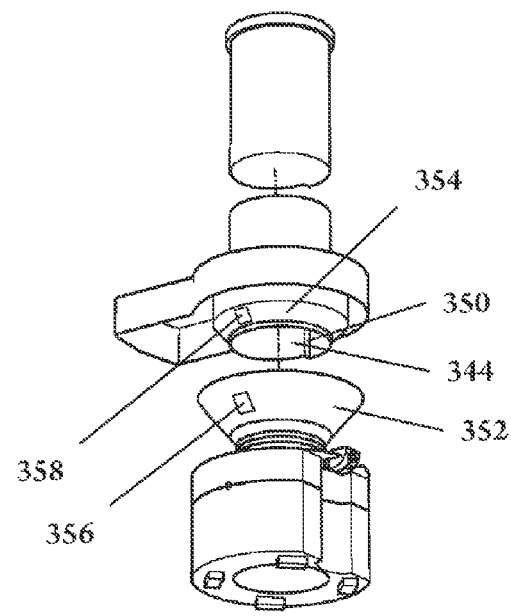
figure 69
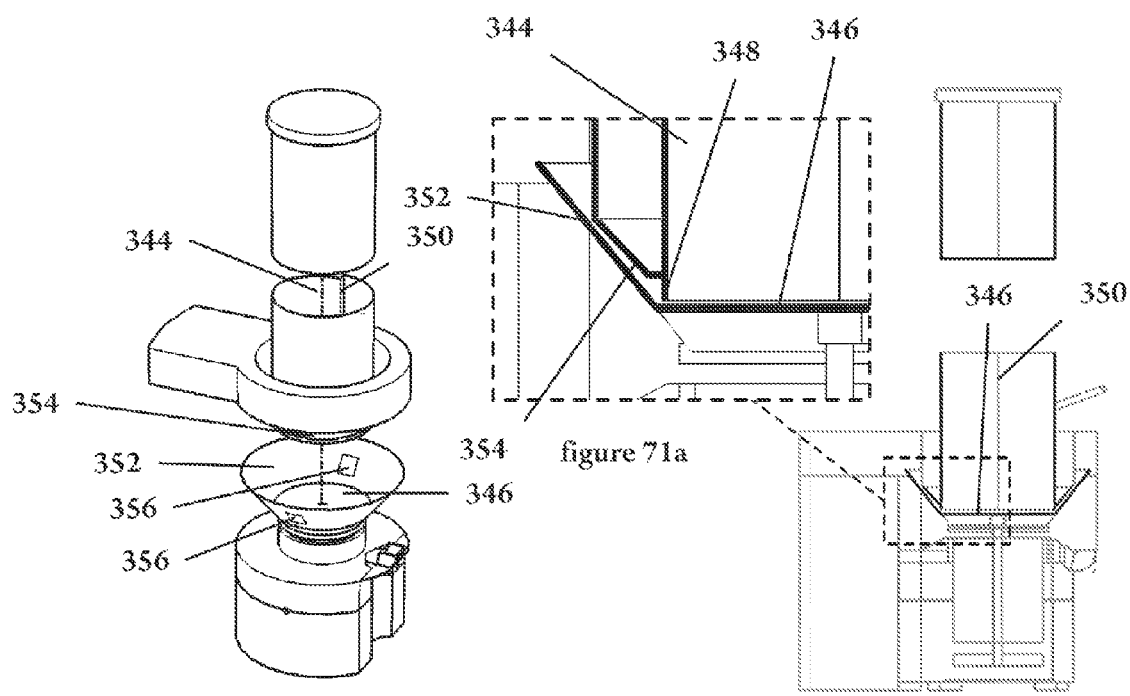
figure 70
figure 71

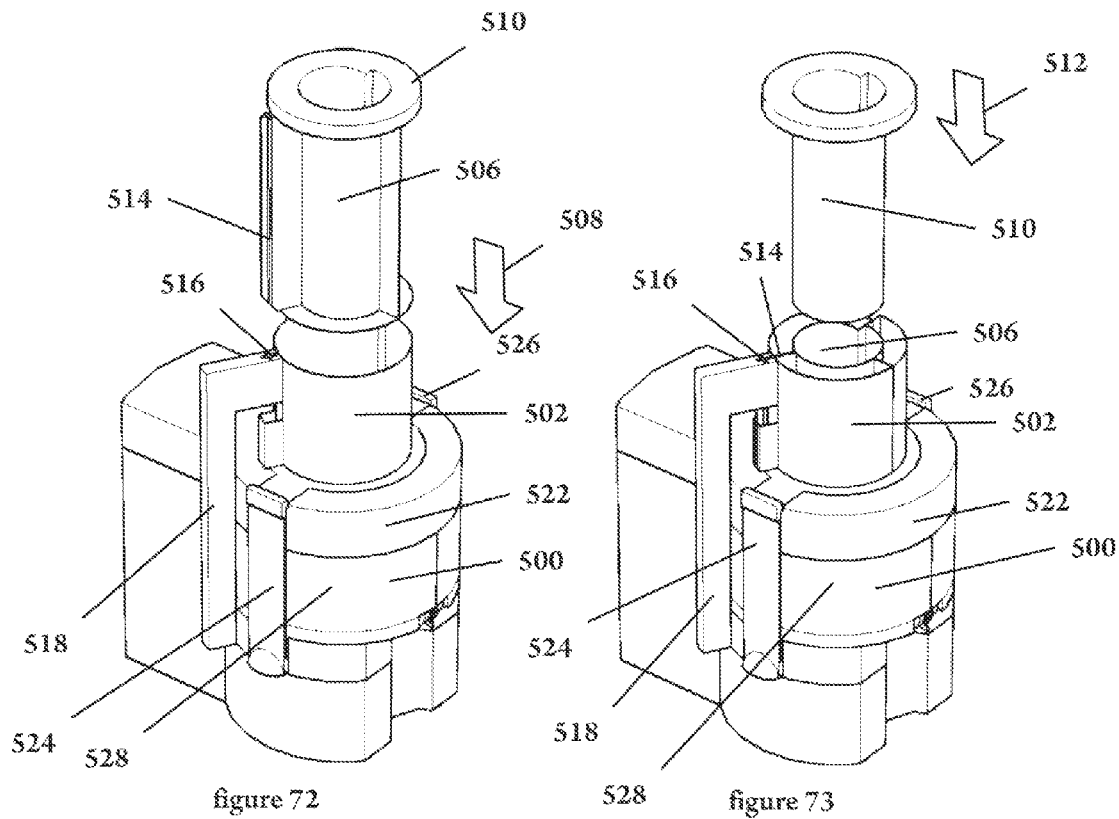
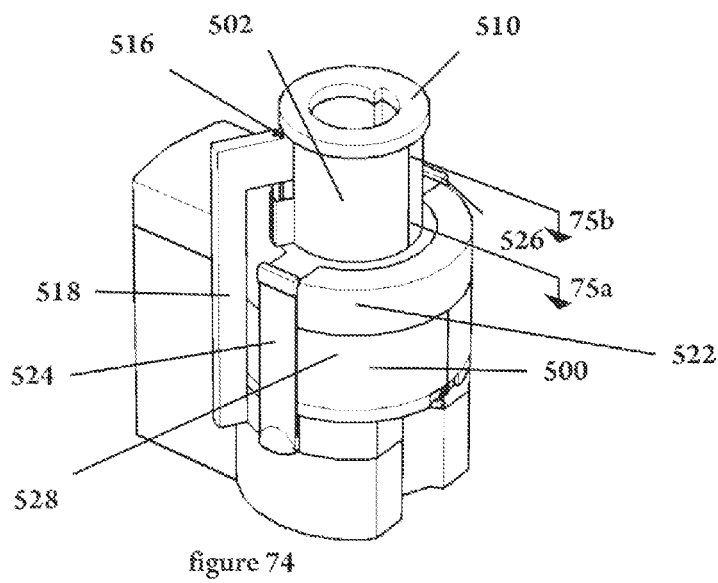
figure 72
figure 73
figure 74

DEVICES AND METHODS TO DISINTEGRATE FOODS

TECHNICAL FIELD

The subject application is directed toward devices which extract pulp and juice as well as other constituent components from foods such as fruits and vegetables.

BACKGROUND

Devices to disintegrate foods are very common today. Such devices include, but are not limited to: juicers, blenders, and food processors. Essentially, these devices feed foods, including, but not limited to, fruits and vegetables, into a machine which mechanically disintegrates the foods. Many of these devices have feed chutes. Also shared in common by many of these devices is a rotating shredder element which chops and/or grinds the foods.

One of the most common devices to disintegrate foods is the centrifugal type juicer. These devices typically have a generally vertical feed chute which is open at the top and terminates at its open lower end just above a motor powered horizontal shredding disc. Most of these shredding discs are simply flat plates with sharp protrusions facing upward. As food is fed through the feed chute, it is pushed by gravity and/or by a hand powered pusher plunger placed facing downward at the top of the chute. These pushing forces propel the food onto the top of the shredding disc where the sharp upward facing protrusions grind apart the food.

The shredded food is propelled outward radially from the center of the shredding disc by centrifugal force, until the shredded food hits a filter screen which is formed in the shape of an inverted truncated cone with its broader face being open and directed upwards. The truncated cone is attached to the shredding disc along the cone's lower smaller face which is positioned resting against the outer perimeter of the shredding disc.

The rotation of the truncated cone filter screen through centrifugal force, forces liquids, including juices, through the filter screen and into a collection vessel, while simultaneously directing solids, such as pulp, to be propelled diagonally upward, outward, and over the upper perimeter edge of the open broader face of the truncated cone, where it is collected in a collection bin.

The net result of the above actions is the separation of liquids from solids within the foods.

These centrifugal juicers are inexpensive to produce. They also produce juice relatively quickly when compared to other designs. However, typically they have several shortcomings.

To begin with, their truncated conical filter screens load up very quickly with pulp which reduces their efficiency and is very difficult to clean, especially if the pulp clogged in the screens is not cleaned immediately after juicing.

Also, even though there have been great strides in recent years in increasing the size of the feed chutes, and thus decreasing food preparation time because foods no longer have to be cut to a small size compared to using a small feed chute, some food cutting preparation is still required for larger foods.

Ironically, the new larger feed chutes found on newer centrifugal juicers, which offer convenience to juicer users, also introduce a safety hazard to the same users because the size of the new chutes is large enough to allow a child's hand to pass through the chute and into contact with the rapidly rotating shredder disc.

A further typical disadvantage of current centrifugal juicers is that a liquid collecting receptacle must be placed adjacent to the juicer to catch juices immediately as the juice is produced, because these juicers generally do not have any onboard ability to collect and store juices.

These juice collecting receptacles usually have the disadvantage that fresh juices collected within them typically separate within a few minutes thus losing their fresh taste and pleasing appearance. This is because there is generally nothing within or about such receptacles to mix and/or agitate the freshly made juice to prevent separation from occurring or to mix the juice once separation has occurred.

Further, many centrifugal type juicers have low pour spouts which don't permit normal height glasses to be placed beneath them. Such juicers must rely on resting on a wood block or other such pedestal to fill normal height glasses, or the user must find and use a special receptacle which has a low height upper rim which can fit below the pour spout.

Those juicers that have pour spouts which are high enough to fill a normal height glass, are generally difficult to store due to the juicer's height.

In addition, many juicers force their users to waste precious time before removing their glass while waiting for the juicer's pour spouts to stop dripping after juice has been dispensed.

Another typical disadvantage of current centrifugal type juicers is that particles of the foods fed down the feed chute can hit the fast spinning shredding disc and be thrown back at high speed through the feed chute at the juicer user causing messes on the user and/or adjacent countertops, as well as resulting in a safety hazard to the juicer user from being hit by fast-moving ejected food particles.

Centrifugal type juicers also can get jammed on food because there is no way to move the food around in relationship to the shredding disc. The only option offered by most centrifugal type juicers to free food jammed within the feed chute is to push down harder on the juicer's pusher plunger. Such pushing may relieve the problem, or it may compact the food within the chute and make the problem worse.

Juicing efficiency within juicers is always an issue because it affects the cost of juice produced. Centrifugal juicers are only moderately efficient when compared with other designs, because they leave significant amounts of juice and moisture within their waste. This efficiency is reduced as mentioned earlier when the truncated cone filter screen becomes filled with pulp. Efficiency is also lost because shredding of the food within a centrifugal juicer takes place in only one stage so any juice which is not extracted at this first and only stage is permanently lost.

Many of the disadvantages of centrifugal juicers are shared in common with other food preparation devices such as, but not limited to, blenders and food processors. Such disadvantages include, but are not limited to, issues involving feeding foods into the device, extracting processed foods from the device, the height of ejector chutes, as well as other safety, use and storage issues.

The example embodiments described herein are designed to address many known problems, including, but not limited to, those listed above, found in many of today's food preparation devices. Some of the embodiments described herein also go beyond this to suggest improvements on the functionality of food preparation devices.

SUMMARY OF THE PRESENT INVENTION

The subject application is directed to a food processing device that is configured to extract juice from a food item.

The device includes an inlet configured to accept food items. The device further includes a disintegrator coupled to the inlet and configured to disintegrate food items passed through the inlet. The device also includes a separator that accepts the disintegrated food items and separates out the liquid components from the food item. The device also includes a reservoir that is coupled to the separator and is configured to hold liquid components of the food item. The reservoir includes a translucent member for viewing of liquid levels within the reservoir, and a valved outlet. The valved outlet is configured to allow or prevent the flow of liquid from the reservoir through the valved outlet.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including:

FIG. 1 is an illustration of a food preparation device according to one embodiment of the subject application;

FIG. 2 is a further illustration of the food preparation device of FIG. 1 according to one embodiment of the subject application;

FIG. 3 is another illustration of the food preparation device of FIG. 1 and FIG. 2 according to one embodiment of the subject application;

FIG. 4 is an illustration of an adjustable height base of a food preparation device according to one embodiment of the subject application;

FIG. 5 is a further illustration of the adjustable height base of the food preparation device of FIG. 4 according to one embodiment of the subject application;

FIG. 6 is another illustration of the adjustable height base of the food preparation device of FIG. 4 and FIG. 5 according to one embodiment of the subject application;

FIG. 7 is an illustration of an adjustable height base of a food preparation device according to one embodiment of the subject application;

FIG. 8 is a further illustration of the adjustable height base of the food preparation device of FIG. 7 according to one embodiment of the subject application;

FIG. 9 is an illustration of the adjustable height base of the food preparation device of FIG. 7 and FIG. 8 according to one embodiment of the subject application;

FIG. 9A is an enlargement illustration of the adjustable height base of the food preparation device of FIG. 9 according to one embodiment of the subject application;

FIG. 10 is an illustration of an adjustable height base of a food preparation device according to one embodiment of the subject application;

FIG. 11 is a further illustration of the adjustable height base of the food preparation device of FIG. 10 according to one embodiment of the subject application;

FIG. 12 is an illustration of the adjustable height base of the food preparation device of FIG. 10 and FIG. 11 according to one embodiment of the subject application;

FIG. 12A is an enlargement illustration of the adjustable height base of the food preparation device of FIG. 12 according to one embodiment of the subject application;

FIG. 13 is an illustration of a pour spout configuration of a food preparation device according to one embodiment of the subject application;

FIG. 13a is an enlargement illustration of the pour spout configuration of the food preparation device of FIG. 13 according to one embodiment of the subject application;

FIG. 13b is an enlargement illustration of the pour spout configuration of the food preparation device of FIG. 13 according to one embodiment of the subject application;

FIG. 13c is an enlargement illustration of the pour spout configuration of the food preparation device of FIG. 13 according to one embodiment of the subject application;

FIG. 14 is an illustration of a valve controlled liquid dispensing spout configuration of a food preparation device according to one embodiment of the subject application;

FIG. 14a is an enlargement illustration of the valve controlled liquid dispensing spout configuration of the food preparation device of FIG. 14 according to one embodiment of the subject application;

FIG. 14b is an enlargement illustration of the valve controlled liquid dispensing spout configuration of the food preparation device of FIG. 14 according to one embodiment of the subject application;

FIG. 14c is an enlargement illustration of the valve controlled liquid dispensing spout configuration of the food preparation device of FIG. 14 according to one embodiment of the subject application;

FIG. 15 is an illustration of a liquid dispensing outlet configuration of a food preparation device according to one embodiment of the subject application;

FIG. 15a is an enlargement illustration of the liquid dispensing outlet configuration of the food preparation device of FIG. 15 according to one embodiment of the subject application;

FIG. 15b is an enlargement illustration of the liquid dispensing outlet configuration of the food preparation device of FIG. 15 according to one embodiment of the subject application;

FIG. 15c is an enlargement illustration of the liquid dispensing outlet configuration of the food preparation device of FIG. 15 according to one embodiment of the subject application;

FIG. 16 is an illustration of a liquid output passage configuration of a food preparation device according to one embodiment of the subject application;

FIG. 16a is an enlargement illustration of the liquid output passage configuration of the food preparation device of FIG. 16 according to one embodiment of the subject application;

FIG. 16b is an enlargement illustration of the liquid output passage configuration of the food preparation device of FIG. 16 according to one embodiment of the subject application;

FIG. 16c is an enlargement illustration of the liquid output passage configuration of the food preparation device of FIG. 16 according to one embodiment of the subject application;

FIG. 17 is an enlarged illustration of the liquid output passage configuration of the food preparation device of FIG. 16 according to one embodiment of the subject application;

FIG. 18 is an enlarged illustration of the liquid output passage configuration of the food preparation device of FIG. 16 according to one embodiment of the subject application;

FIG. 20 is an enlarged illustration of the liquid output passage configuration of the food preparation device of FIG. 19 according to one embodiment of the subject application;

FIG. 21 is an enlarged illustration of the liquid output passage configuration of the food preparation device of FIG. 19 according to one embodiment of the subject application;

FIG. 29a is an enlargement illustration of an interchangeable filter cone and a filter mesh configuration of the centrifugal juicer of FIG. 29 according to one embodiment of the subject application;

FIG. 29b is an enlargement illustration of an interchangeable filter cone and a filter mesh configuration of the centrifugal juicer of FIG. 29 according to one embodiment of the subject application;

FIG. 37 is a view of the illustration of the centrifugal juicer having a pusher plunger of FIG. 30 according to one embodiment of the subject application;

FIG. 38 is another view of the illustration of the centrifugal juicer having a pusher plunger of FIG. 30 according to one embodiment of the subject application;

FIG. 38a is perspective view of a truncated conical filter according to one embodiment of the subject application.

FIG. 68 is an illustration of a centrifugal juicer according to one embodiment of the subject application;

FIG. 69 is an illustration of an exploded view of the centrifugal juicer of FIG. 68 according to one embodiment of the subject application;

FIG. 70 is an illustration of another exploded view of the centrifugal juicer of FIG. 68 and FIG. 69 according to one embodiment of the subject application;

FIG. 71 is an illustration of an x-ray side view of the centrifugal juicer of FIG. 68, FIG. 69, and FIG. 70 according to one embodiment of the subject application;

FIG. 71A is an enlargement illustration of the centrifugal juicer of FIG. 71 according to one embodiment of the subject application;

FIG. 72 is an illustration of a centrifugal juicer according to one embodiment of the subject application;

FIG. 73 is another illustration of the centrifugal juicer of FIG. 72 according to one embodiment of the subject application;

FIG. 74 is an illustration of a perspective view of the centrifugal juicer of FIG. 72 and FIG. 73 according to one embodiment of the subject application;

FIG. 80a is an illustration of an expanded view of the food item and gripping pushing plunger of the centrifugal juicer of FIG. 80 according to one embodiment of the subject application;

FIG. 94 is an illustration of a perspective view of a blender having a pivoting support platform incorporated therein according to one embodiment of the subject application;

FIG. 95 is an illustration of a perspective view of the blender of FIG. 94 having the support platform extended according to one embodiment of the subject application;

FIG. 96 is an illustration of a perspective view of a blender having a telescoping support platform incorporated therein according to one embodiment of the subject application; and FIG. 97 is an illustration of a perspective view of the blender of FIG. 96 having the telescoping support platform extended according to one embodiment of the subject application.

DETAILED DESCRIPTION OF EXEMPLARY PREFERRED EMBODIMENTS OF THE PRESENT INVENTION

Several preferred embodiments of the subject application are described herein. Each alone or in combination addresses problems and design opportunities found in current food preparation devices. Except as noted, preferred embodiments are illustrated as centrifugal type juice extractors.

FIGS. 1 through 12, and including FIG. 9 enlargement, 9*a*, and FIG. 12 enlargement, 12*a*, are perspective views that show mechanisms to raise pour spout heights for easy dispensing of liquids while simultaneously offering compactness during storage. In general these designs raise the food preparation device using a support member which can telescope over the main body to a more compact configuration to reduce the space required to ship and store the food preparation device.

FIGS. 13 through 21 show various pour spout configurations. FIGS. 13, 14, 15, 16, and 19, including FIG. 13 enlargements, 13*a*, 13*b*, and 13*c*; and FIG. 14 enlargements, 14*a*, 14*b*, and 14*c*; and FIG. 15 enlargements, 15*a*, 15*b*, and 15*c*; and FIG. 16 enlargements, 16*a*, 16*b*, and 16*c*; and FIG. 19 enlargements, 19*a*, 19*b*, and 19*c* are all perspective views. FIGS. 17, 18, 20, and 21 are cross-sections as indicated in the forward perspective views. In general, these pour spout configurations have a liquid flow control valve to turn on and off the flow of liquid from the device's internal liquid collecting vessel. Each liquid flow control valve along with the configuration of each liquid egress passage help quickly terminate liquid flow from the devices and thus reduce the time needed before a glass or other liquid collecting receptacle can be removed from below the spout without resulting in the spout dripping on a countertop.

These pour spout configurations also allow the liquid flow control valve to be activated and deactivated using movement of a glass or other liquid collecting receptacle placed beneath them.

Because these pour spouts can completely block the flow of liquids from the devices, these pour spouts also may allow storage of liquids within the embodiments before the liquids are dispensed into a glass or other liquid collecting receptacle, thus eliminating the need to have a liquid collecting receptacle positioned below the liquid egress passage whenever juicing takes place.

Figure 22:
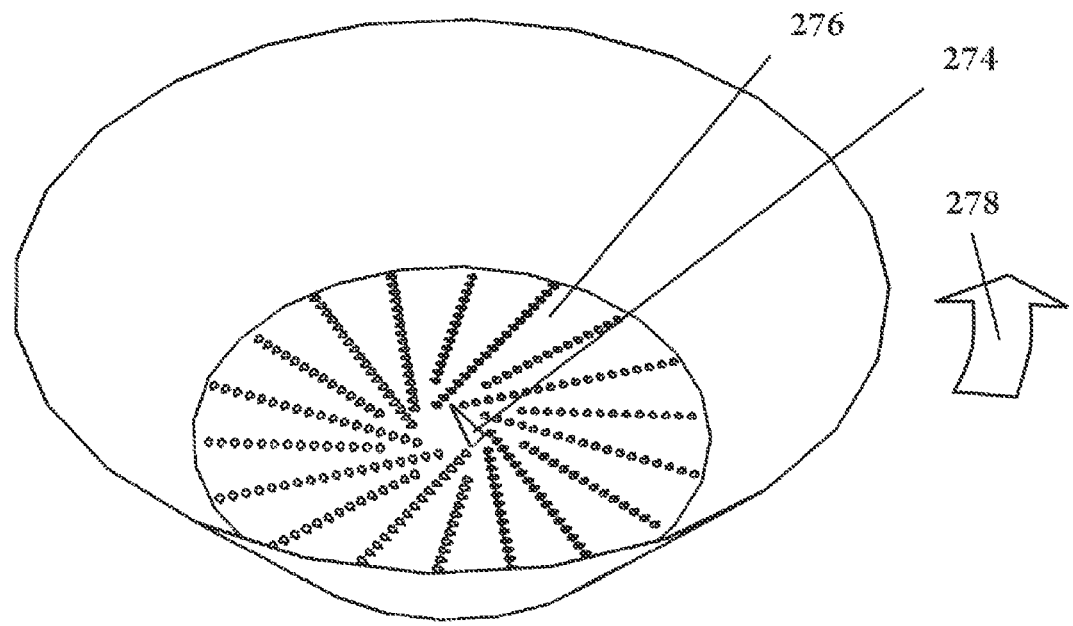
FIG. 22 is an illustration of a centrifugal juicer shredding disc having a diagonally disposed triangular blade of a food preparation device according to one embodiment of the subject application.
Figure 23:
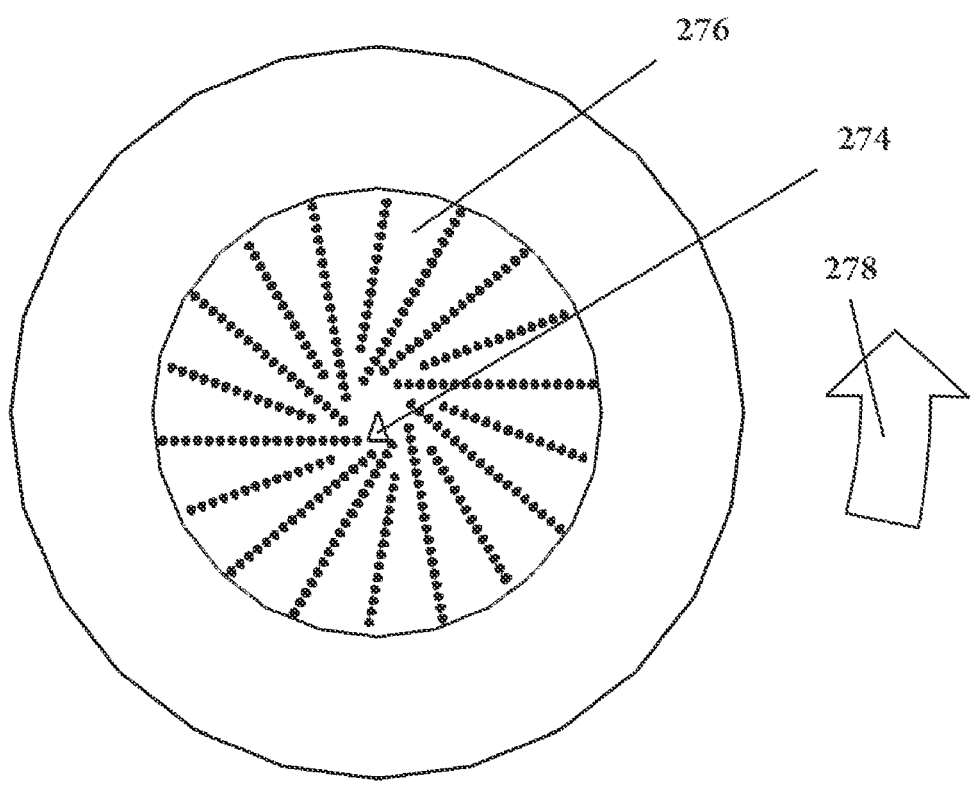
FIG. 23 is another view of the centrifugal juicer shredding disc having a diagonally disposed triangular blade of a food preparation device of FIG. 22 according to one embodiment of the subject application.
Figure 24:
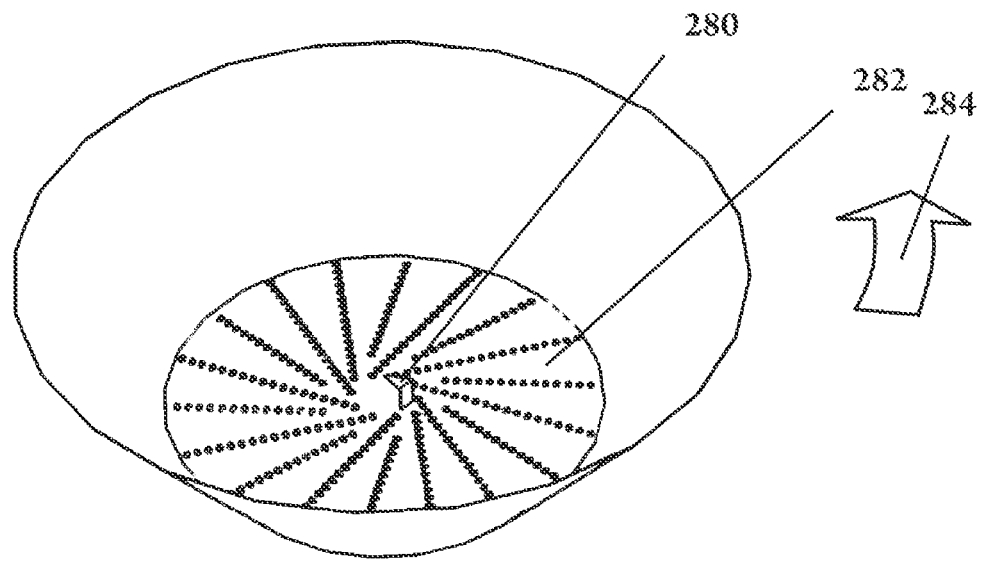
FIG. 24 is an illustration of a centrifugal juicer shredding disc having a bent triangular blade of a food preparation device according to one embodiment of the subject application.
Figure 25:
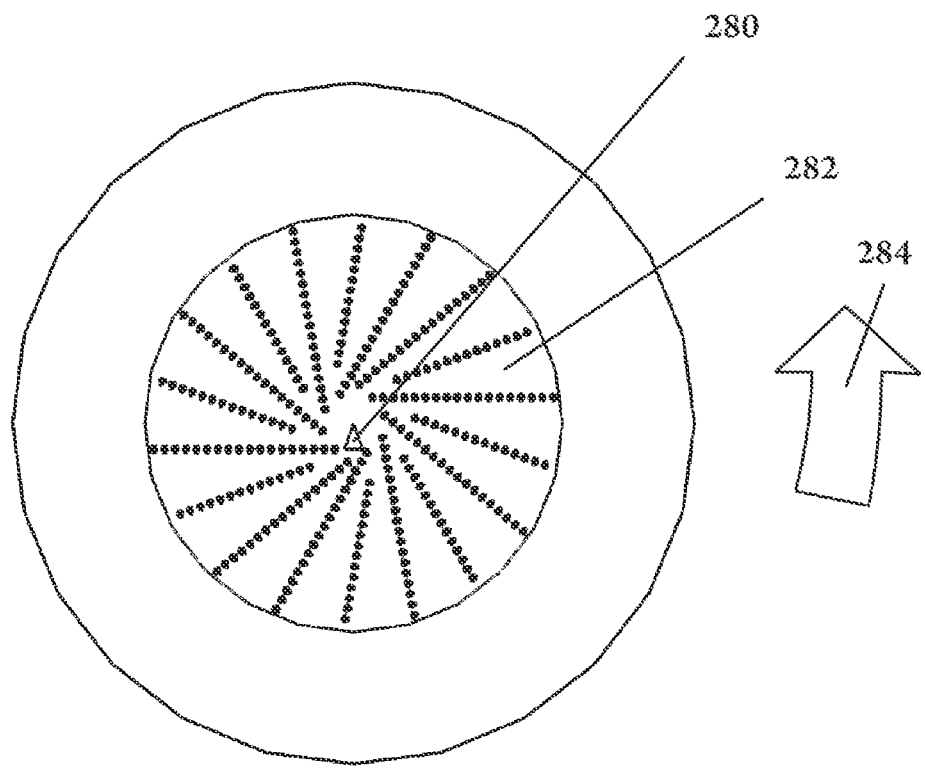
FIG. 25 is another view of the centrifugal juicer shredding disc having a bent triangular blade of a food preparation device of FIG. 24 according to one embodiment of the subject application.
Figure 26:
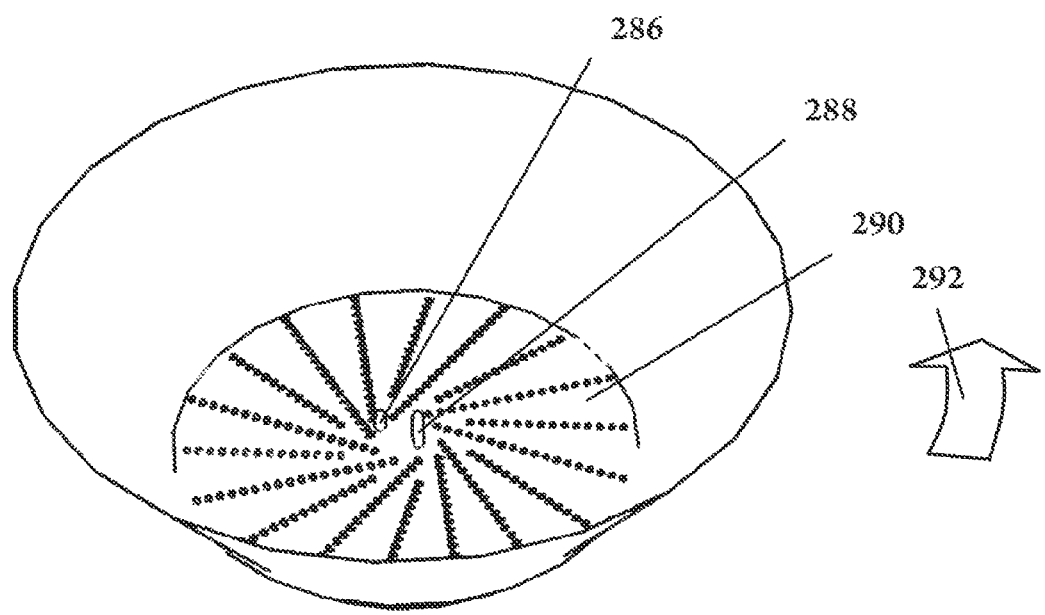
FIG. 26 is an illustration of a centrifugal juicer shredding disc having a short pin and a long pin mounted adjacent to the center of the disc of a food preparation device according to one embodiment of the subject application.
Figure 27:
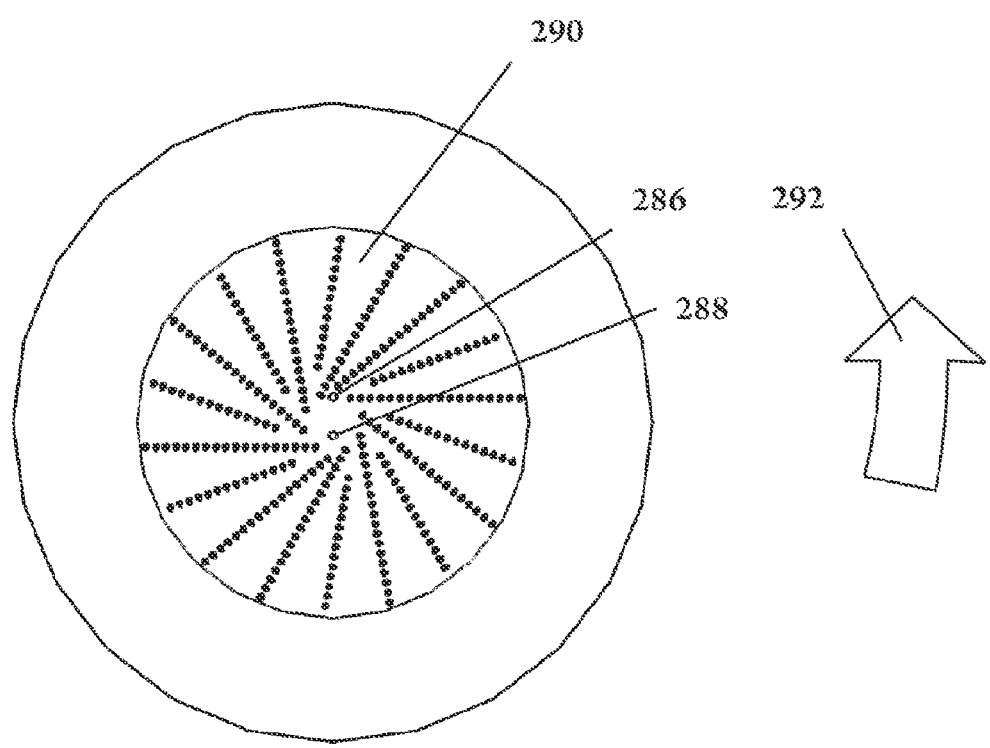
FIG. 27 is another view of the centrifugal juicer shredding disc having a short pin and a long pin mounted adjacent to the center of the disc of a food preparation device of FIG. 26 according to one embodiment of the subject application.
Figure 28:
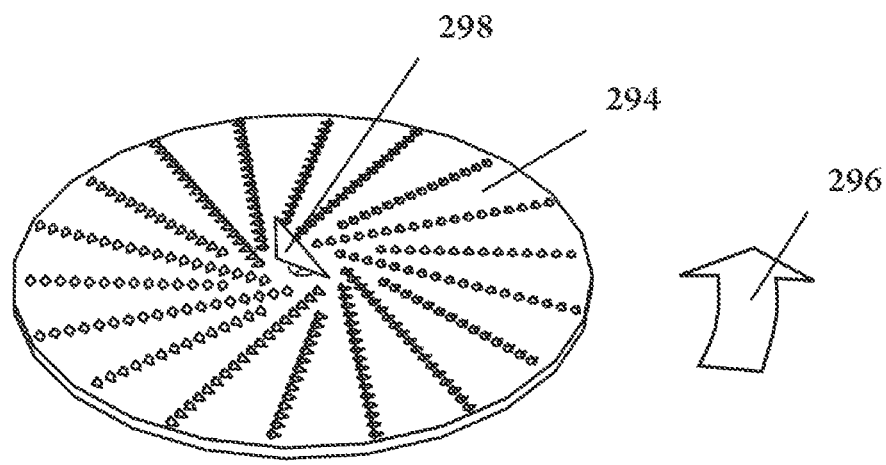
FIG. 28 is an illustration of a centrifugal juicer shredding disc having a central vertically disposed triangular blade of a food preparation device according to one embodiment of the subject application.

FIGS. 22 through 28 show centrifugal juicers with shredder disc configurations that have central shredder disc configurations designed to hasten and make more efficient shredding. Each shredder disc, except for the one shown in FIG. 28, is shown with its inverted truncated cone shaped filter element. FIGS. 22, 24, 26 and 28 are perspective views. FIGS. 23, 25, and 27 are plan views.

Figure 29:
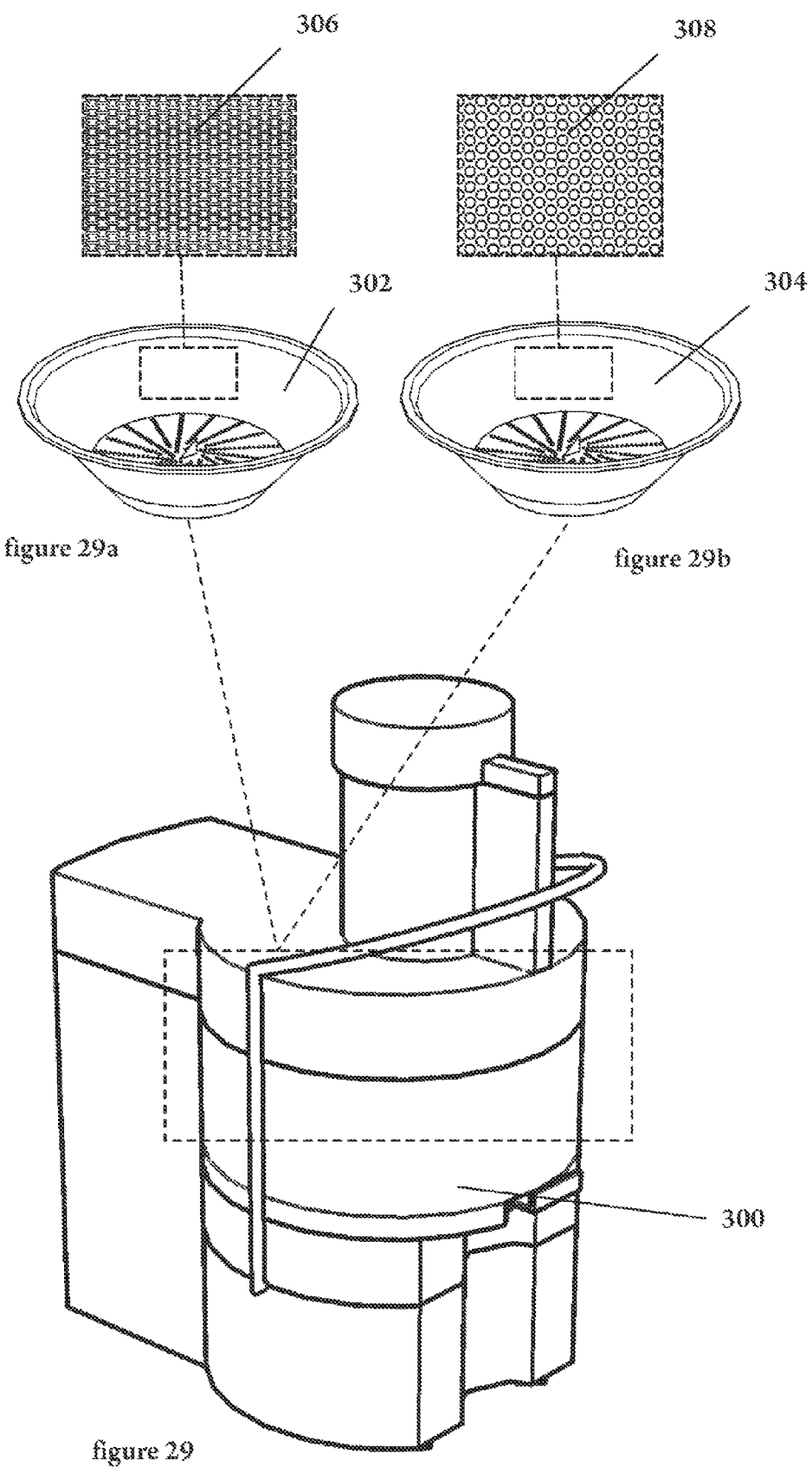
FIG. 29 is an illustration of a centrifugal juicer according to one embodiment of the subject application.

FIG. 29 as well as FIGS. 29*a* and 29*b* are forward perspective views that illustrate utilizing variable filter mesh configurations to limit or increase the amount of pulp within extracted juices.

Figure 30:
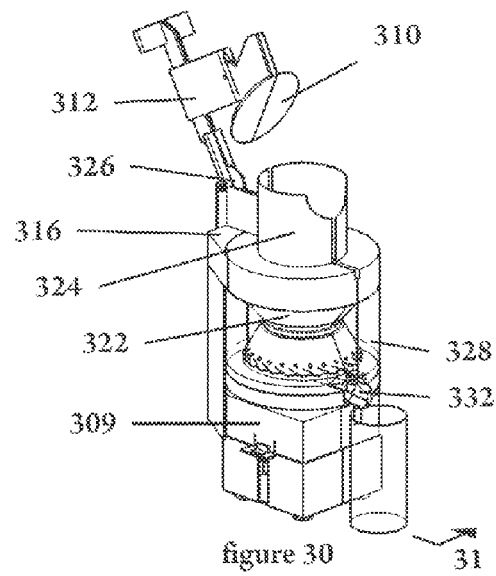
FIG. 30 is an illustration of a centrifugal juicer having a pusher plunger according to one embodiment of the subject application.
Figure 31:
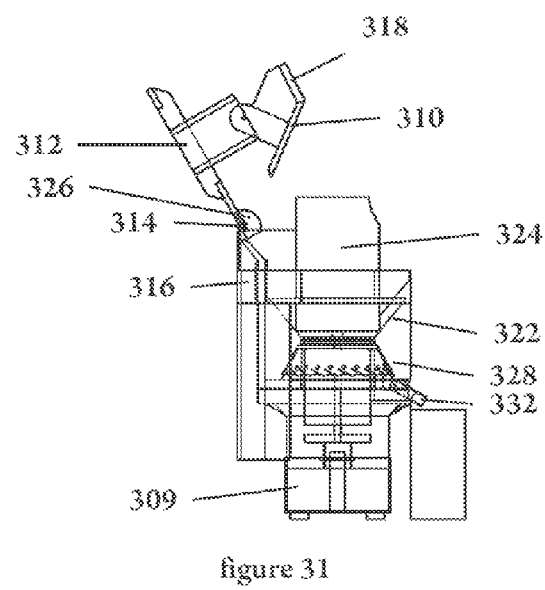
FIG. 31 is another view of the illustration of the centrifugal juicer having a pusher plunger of FIG. 30 according to one embodiment of the subject application.
Figure 32:
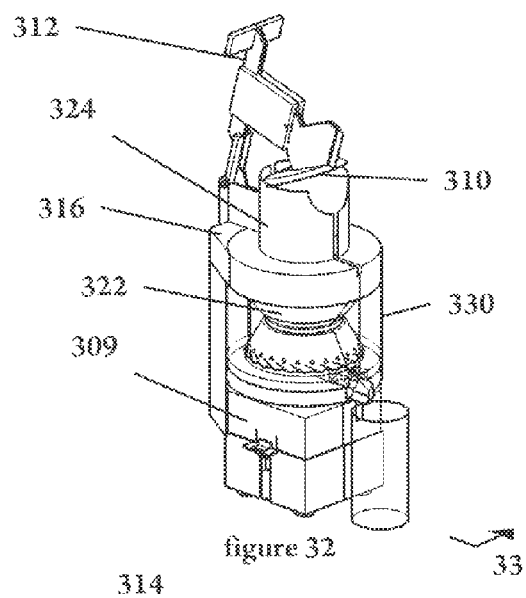
FIG. 32 is a view of the illustration of the centrifugal juicer having a pusher plunger of FIG. 30 according to one embodiment of the subject application.
Figure 33:
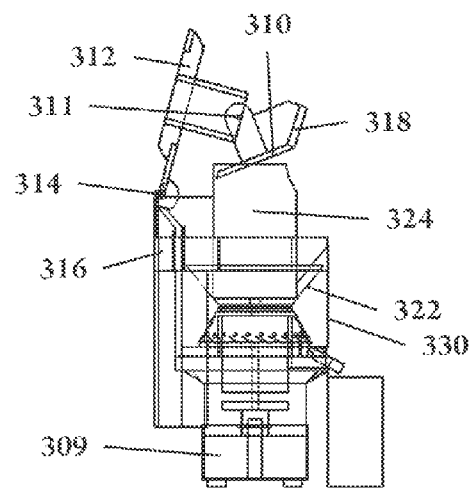
FIG. 33 is a further view of the illustration of the centrifugal juicer having a pusher plunger of FIG. 30 according to one embodiment of the subject application.
Figure 34:
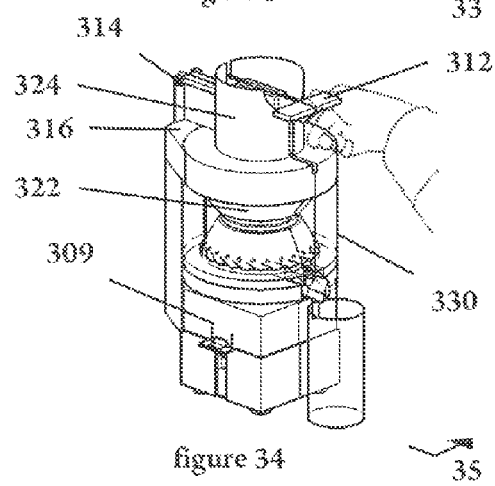
FIG. 34 is another view of the illustration of the centrifugal juicer having a pusher plunger of FIG. 30 according to one embodiment of the subject application.
Figure 35:
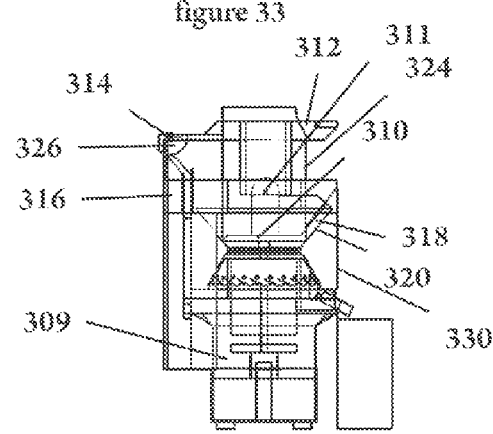
FIG. 35 is a view of the illustration of the centrifugal juicer having a pusher plunger of FIG. 30 according to one embodiment of the subject application.

FIGS. 30 through 38, including FIG. 38 enlargement, FIG. 38*a*, illustrate a preferred embodiment incorporating many of the aforementioned devices and designs as well as illustrating new devices and designs. FIGS. 30, 32, 34, 36, 37, 38, and 38*a* are perspective views. FIGS. 31, 33, and 35 are cross-sections as indicated in the forward perspective views. These devices and designs include: an adjustable height base and a liquid outlet passage with a flow control valve. The preferred embodiment also incorporates: a reservoir to retain juices before they are dispensed from the embodiment, a hand powered lever pusher plunger which activates a safety interlock switch; and a mixing and agitation element to help prevent juice separation from occurring and/or to mix juice once separation has occurred.

Figure 39:
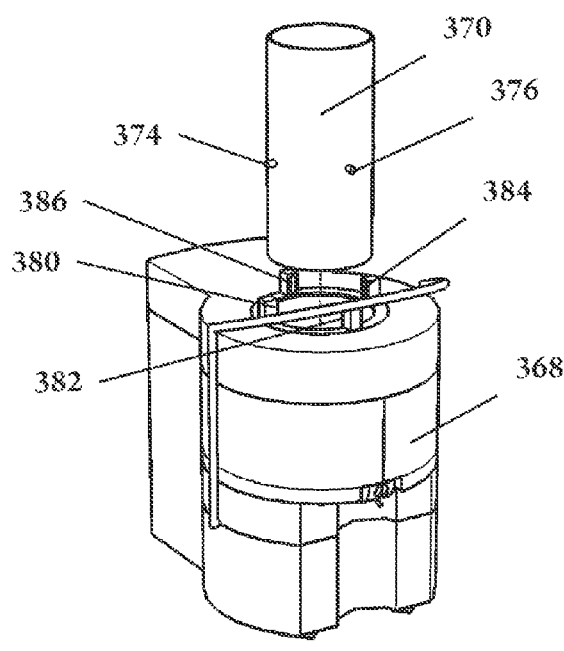
FIG. 39 is an illustration of a perspective view of a centrifugal juicer having a feed chute according to one embodiment of the subject application.
Figure 40:
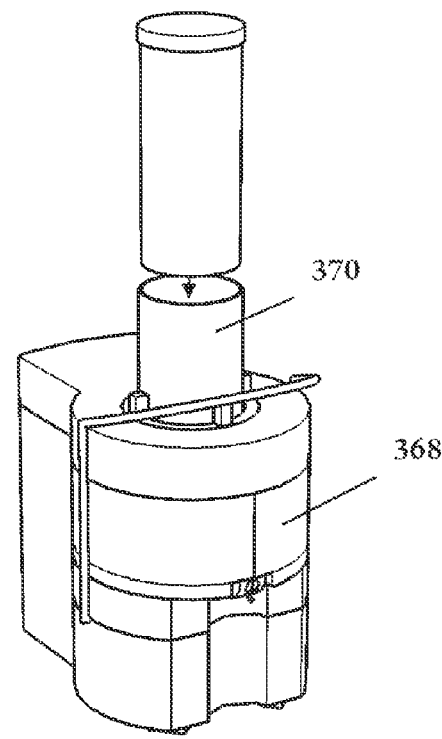
FIG. 40 is a further perspective view of the illustration of the centrifugal juicer having a feed chute of FIG. 39 according to one embodiment of the subject application.
Figure 41:
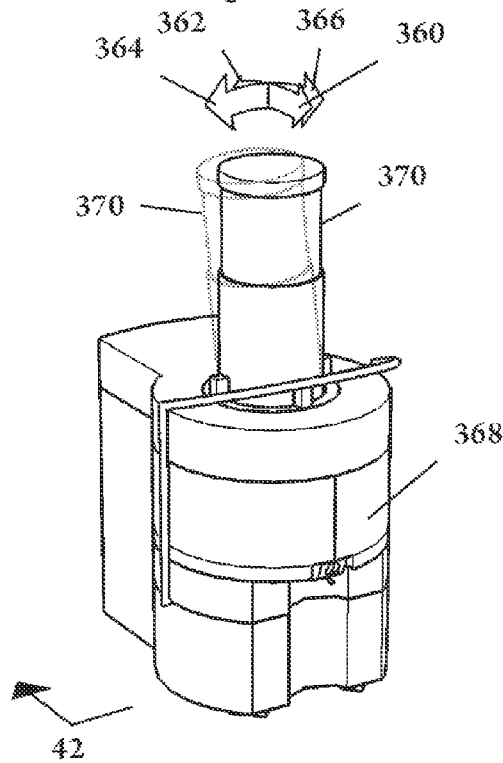
FIG. 41 is another perspective view of the illustration of the centrifugal juicer having a feed chute of FIG. 39 according to one embodiment of the subject application.
Figure 42:
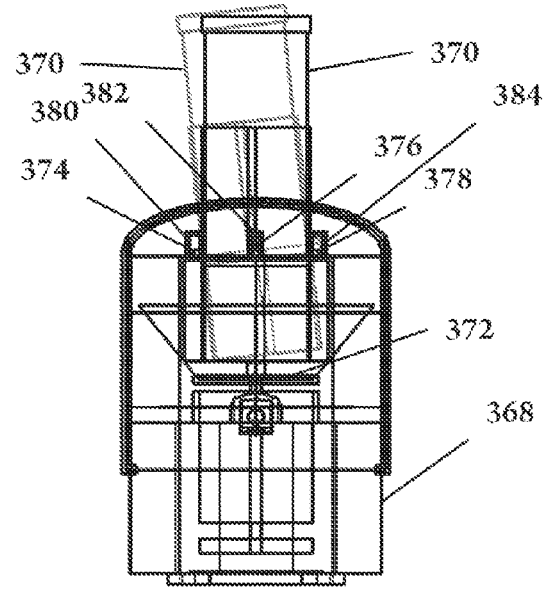
FIG. 42 is a front x-ray view of the illustration of the centrifugal juicer having a feed chute of FIG. 39 according to one embodiment of the subject application.

FIGS. 39 through 42 illustrate a rocking feed chute which moves foods being shredded across the shredding disc to facilitate faster shredding. FIG. 39 is a perspective view with the feed chute exploded off. FIGS. 40 and 41 are perspective views with FIG. 41 showing the rocking motion of the feed chute ghosted in. FIG. 42 is a front x-ray view. FIG. 42 shows the rocking motion of the feed chute ghosted in.

Figure 43:
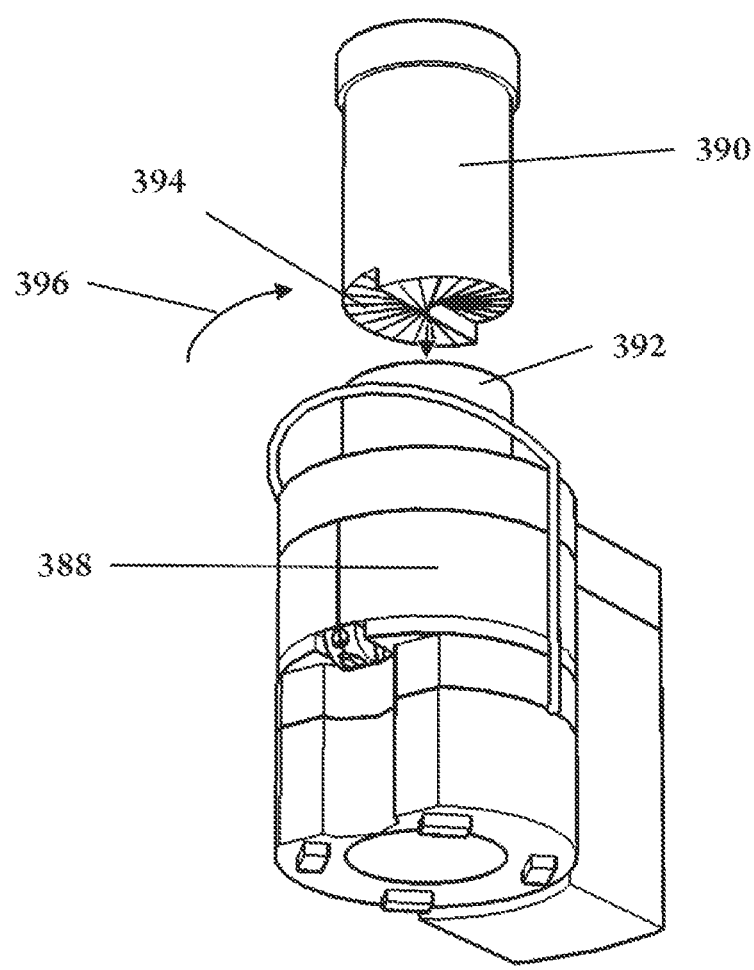
FIG. 43 is an illustration of a centrifugal juicer having a pusher plunger that is contoured on a bottom surface according to one embodiment of the subject application.
Figure 44A:
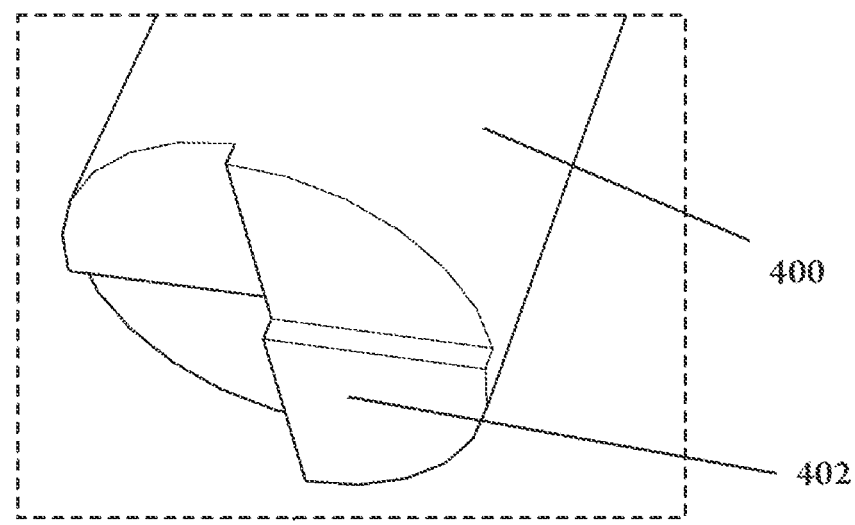
FIG. 44a is an illustration of the centrifugal juicer having a pusher plunger that is contoured on the bottom surface of FIG. 44 according to one embodiment of the subject application.
Figure 44:
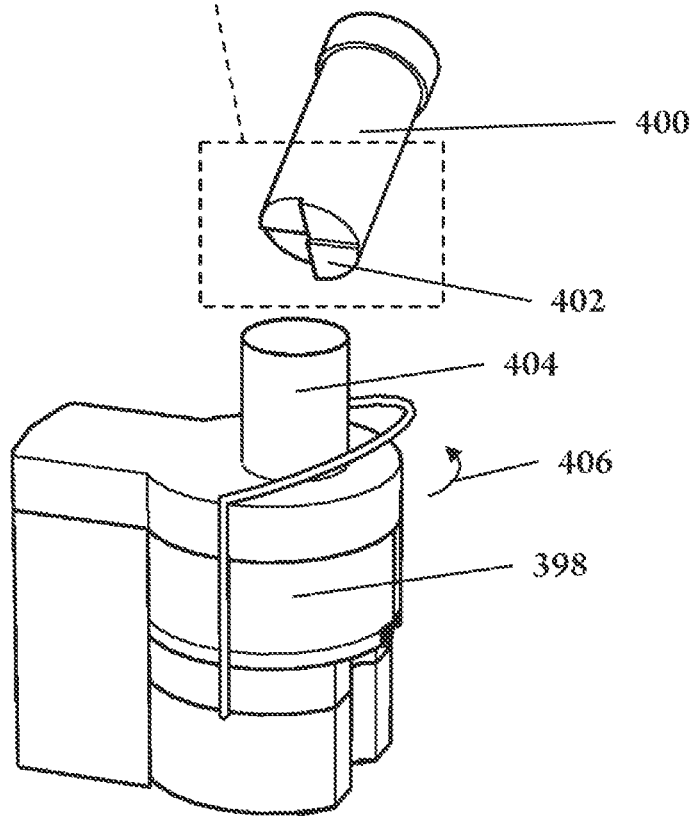
FIG. 44 is an illustration of a centrifugal juicer having a pusher plunger that is contoured on a bottom surface according to one embodiment of the subject application.

FIGS. 43 through 44, including FIG. 44 enlargement, 44*a*, are perspective views that illustrate pusher plunger configurations which help prevent foods being shredded from rotating.

Figure 55:
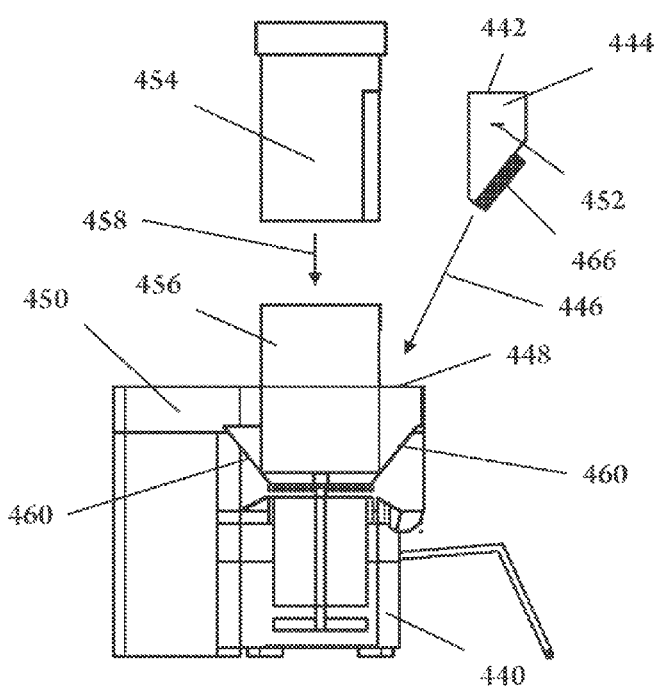
FIG. 55 is an illustration of a perspective view the centrifugal juicer having a push button leaf spring returned cleaning brush of FIG. 52 according to one embodiment of the subject application.
Figures 56, 57:
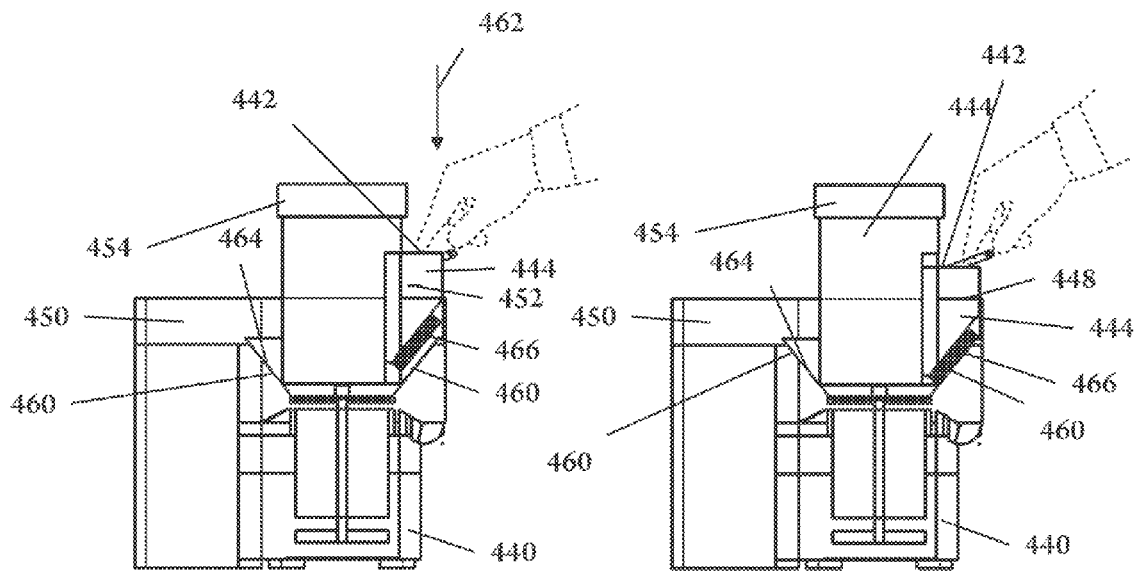
FIG. 56 is an illustration of another perspective view the centrifugal juicer having a push button leaf spring returned cleaning brush of FIG. 52 according to one embodiment of the subject application.
FIG. 57 is an illustration of another perspective view the centrifugal juicer having a push button leaf spring returned cleaning brush of FIG. 52 according to one embodiment of the subject application.

FIGS. 45 through 57 illustrate the use of various wiping devices to clean the conical filter screen, and, in some embodiments, the shredder disc. FIGS. 45 through 54 are perspective views. FIGS. 55 through 57 are sections as indicated in the perspective views. Each wiping device accomplishes cleaning by using a wiping member, such as a brush or a flexible or rigid wiper, to wipe against the inside of the truncated conical filter screen, and, in some embodiments, simultaneously against the shredder disc, while the motor powering the shredder disc and coupled conical filter screen is activated.

FIGS. 58 through 63 show modifications to the feed chute which may reduce undesired food movement, including, but not limited to, food rotation. These modifications may also reduce the ejection of food particles from the feed chute.

FIGS. 58 through 60 and FIG. 62 are perspective views. FIGS. 61 and 63 are plan views. This reduction of food rotation and ejected food particles is accomplished through use of a plurality of inward directed vertical flexible fins which contact foods being fed into the feed chute.

FIGS. 64 through 67 are perspective views which show a flexible segmented diaphragm which extends generally horizontally across the feed chute to help prevent the ejection of food particles from the feed chute. This feature also helps to hold food and prevent undesired food movement, including, but not limited to, food rotation.

FIGS. 68 through 71 illustrate a two-stage liquid extraction system with the first stage being accomplished in a conventional way of shredding foods by pushing them against a rotating shredding disc and centrifugally propelling the shredded foods against an inverted truncated cone shaped filter screen. The second stage starts midway up the inverted truncated cone shaped filter screen where the shredded foods are squeezed through a tapering annular passage and optionally are also run against one or more shredding surfaces. FIGS. 68 through 70 are exploded perspective views with the liquid collection vessel removed to show the truncated conical filter more clearly. FIG. 71 is a cross-section as indicated in the perspective views. FIG. 71*a* is an enlargement of a portion of FIG. 71 as indicated in FIG. 71.

Figure 76:
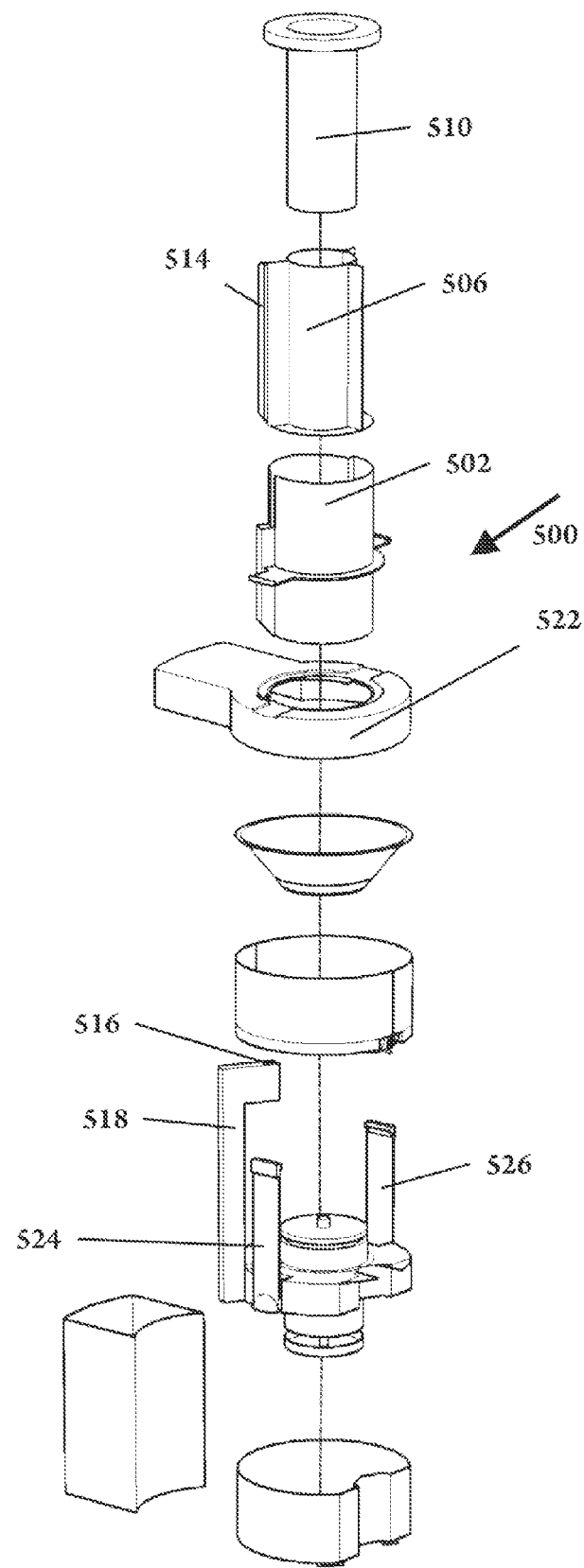
FIG. 76 is an illustration of an exploded view of the centrifugal juicer of FIG. 72 according to one embodiment of the subject application.

FIGS. 72 through 76 show a feed chute with 2 different sized feed openings. The larger feed opening is accomplished with safety by incorporating a safety interlock switch which detects the presence or lack of presence of the smaller feed opening. The smaller feed opening, along with its pusher plunger, alone or together, may also act as a pusher plunger to help feed foods through the larger feed opening. FIGS. 72 through 74 are perspective views. FIGS. 75*a* and 75*b* are plan view sections as indicated in the perspective views. FIG. 76 is a perspective exploded view.

Figure 78:
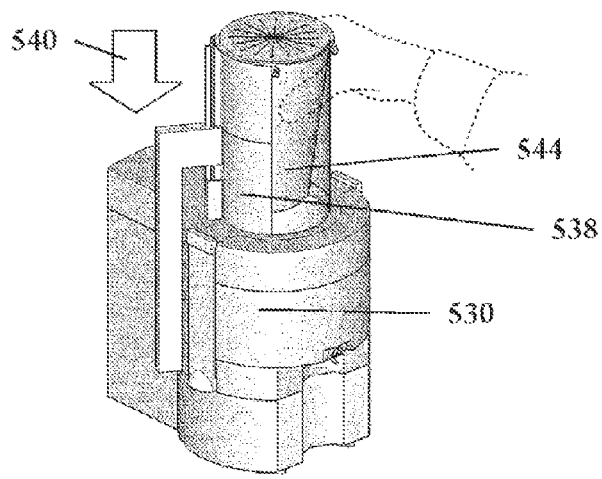
FIG. 78 is an illustration of a perspective view of a gripping pushing plunger with respect to the feed chute of the centrifugal juicer of FIG. 77 according to one embodiment of the subject application.
Figure 79:
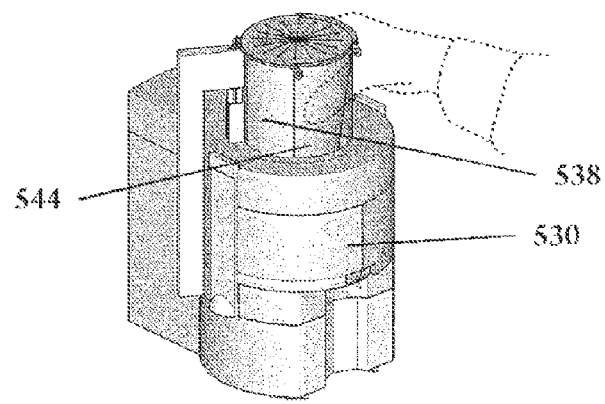
FIG. 79 is an illustration of a perspective view of the gripping pushing plunger fully depressed with respect to the feed chute of the centrifugal juicer of FIG. 77 according to one embodiment of the subject application.
Figure 80:
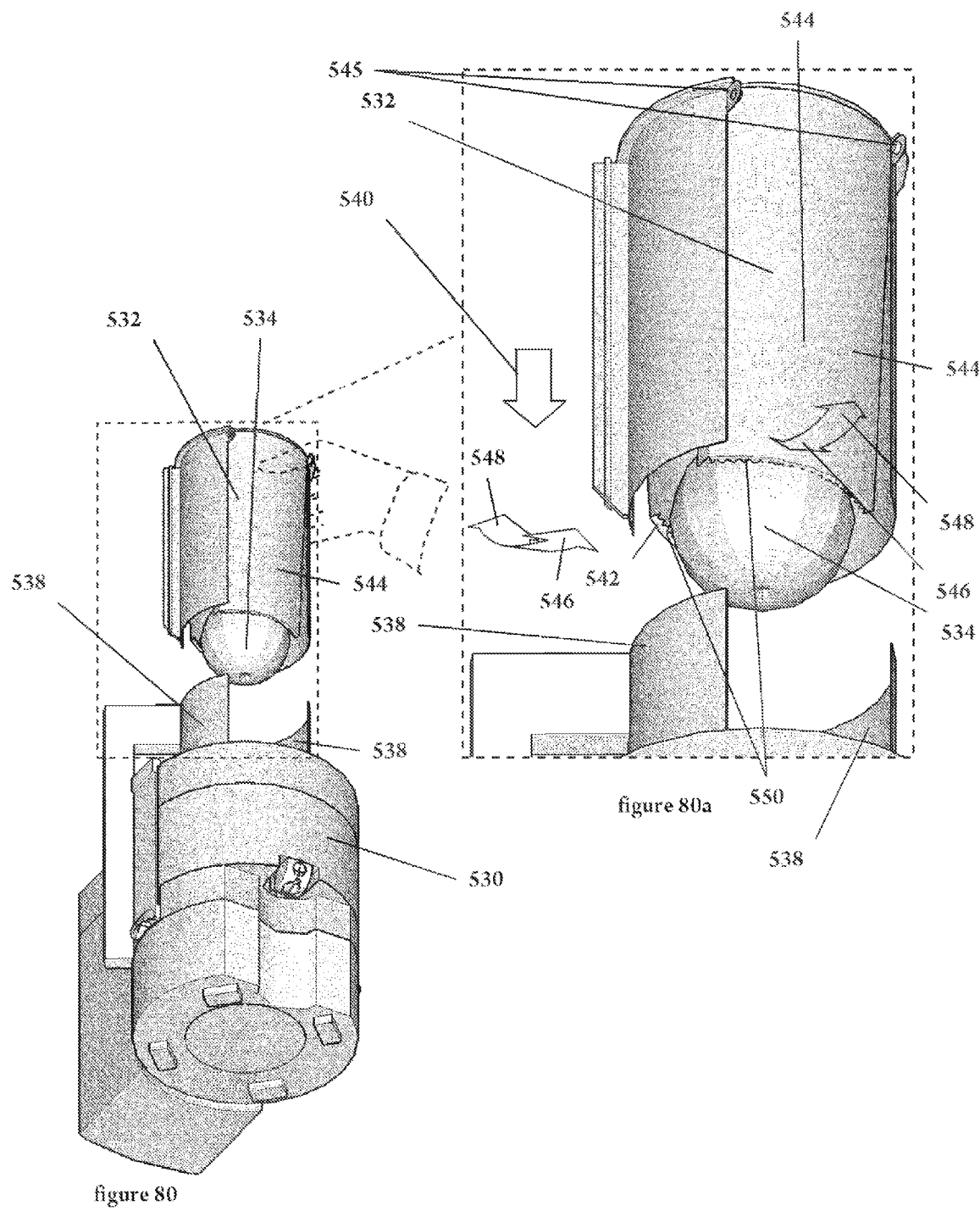
FIG. 80 is an illustration of a lower front perspective view of the centrifugal juicer of FIG. 77 according to one embodiment of the subject application.

FIG. 77 through FIG. 81 illustrate a pusher plunger which has arms to grip food being shredded. FIGS. 77 through 81, including FIG. 80*a* which is an enlarged portion of FIG. 80, are perspective views.

Figure 82:
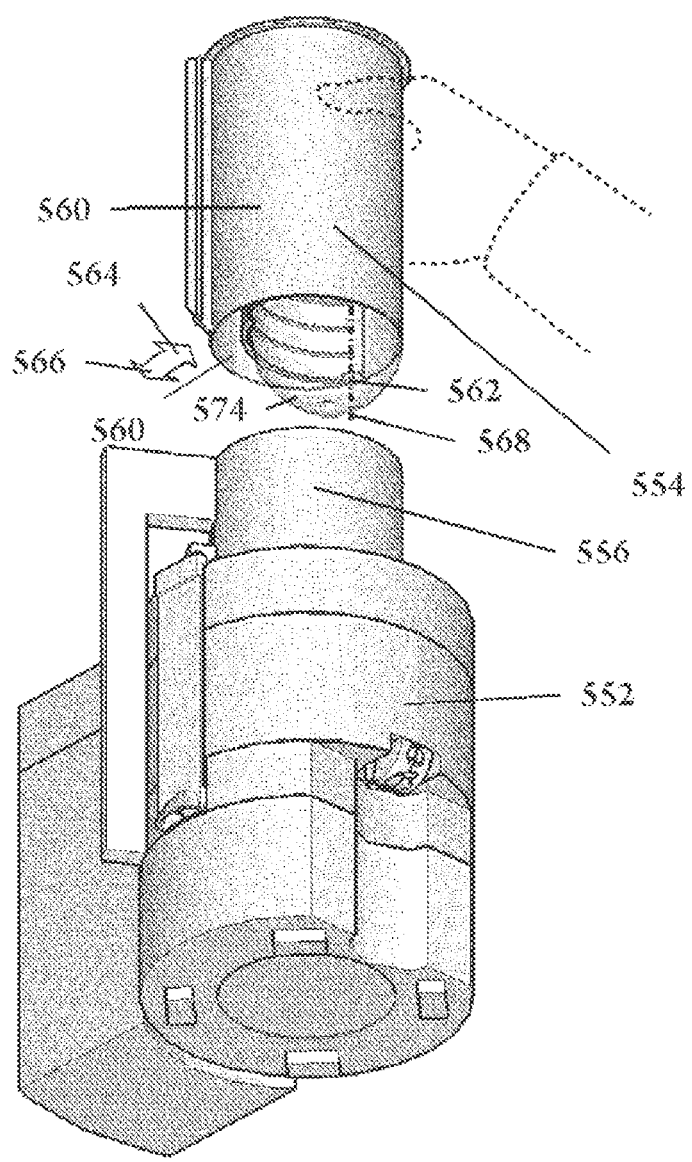
FIG. 82 is an illustration of a centrifugal juicer having an alternate gripping pusher plunger and feed chute according to one embodiment of the subject application.
Figure 83:
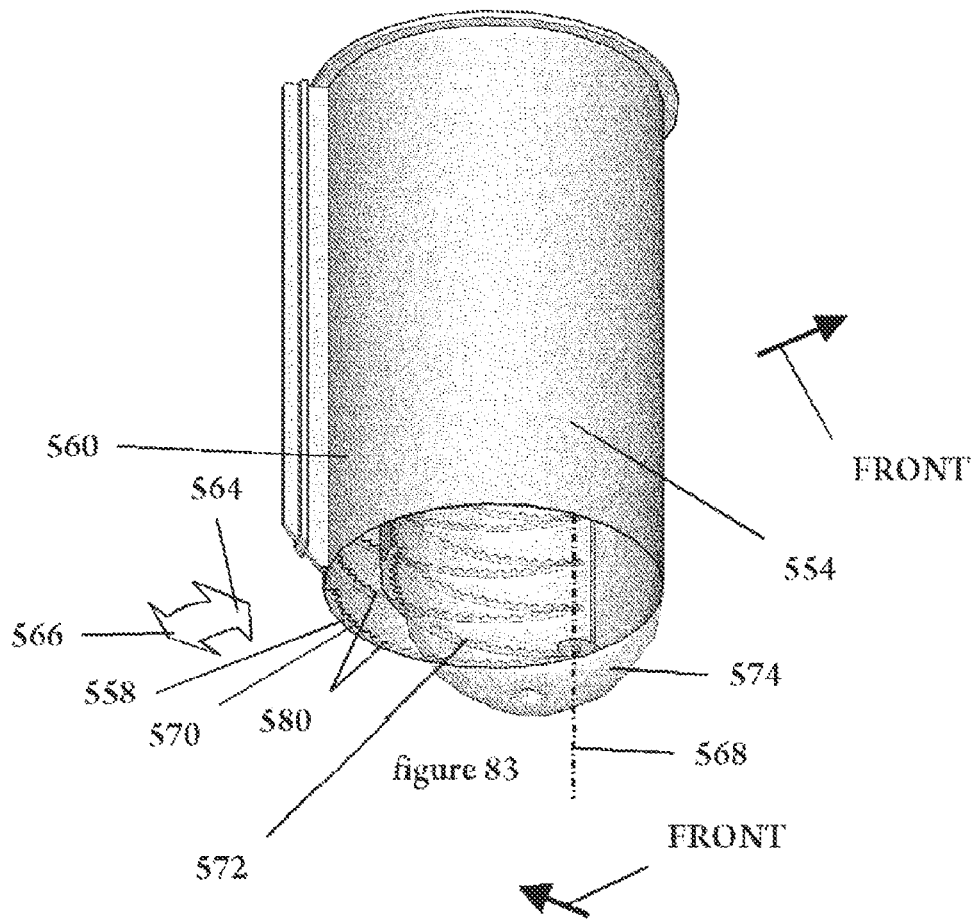
FIG. 83 is an illustration of a below front perspective view of the gripping pushing plunger of the centrifugal juicer of FIG. 82 according to one embodiment of the subject application.
Figure 84:
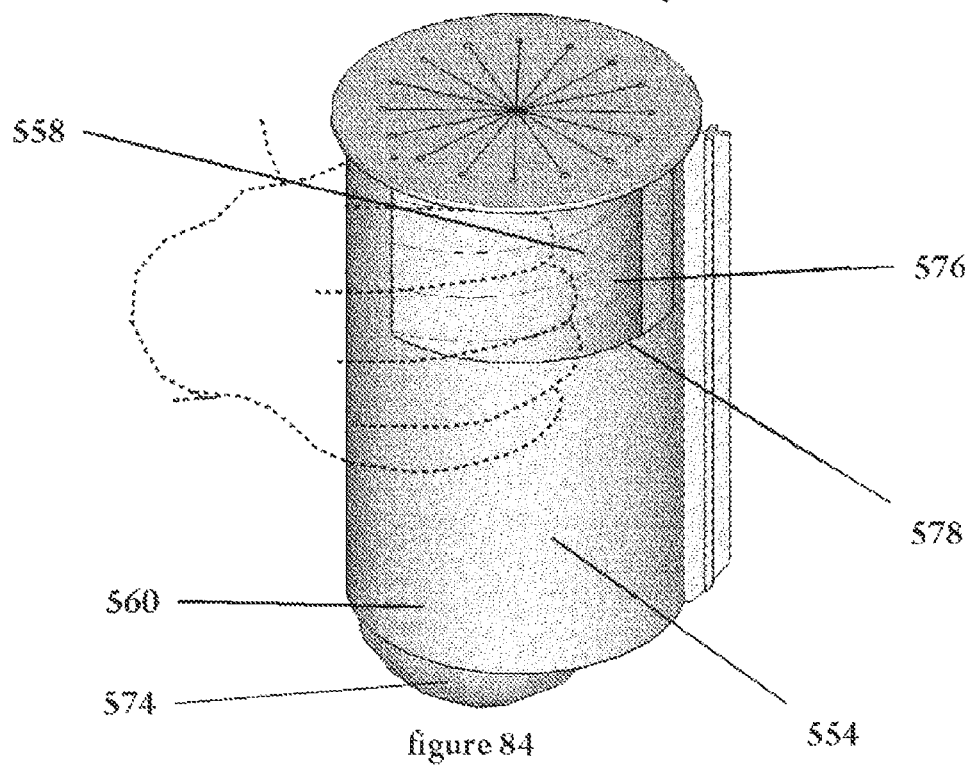
FIG. 84 is an illustration of an above behind perspective view of the gripping pusher plunger of the centrifugal juicer of FIG. 82 and FIG. 83 according to one embodiment of the subject application.

FIGS. 82 through 84 illustrate another preferred embodiment of a pusher plunger which grips food being shredded. FIG. 83 is a forward perspective view and FIG. 84 a rear perspective view of the pusher plunger.

Figure 85:
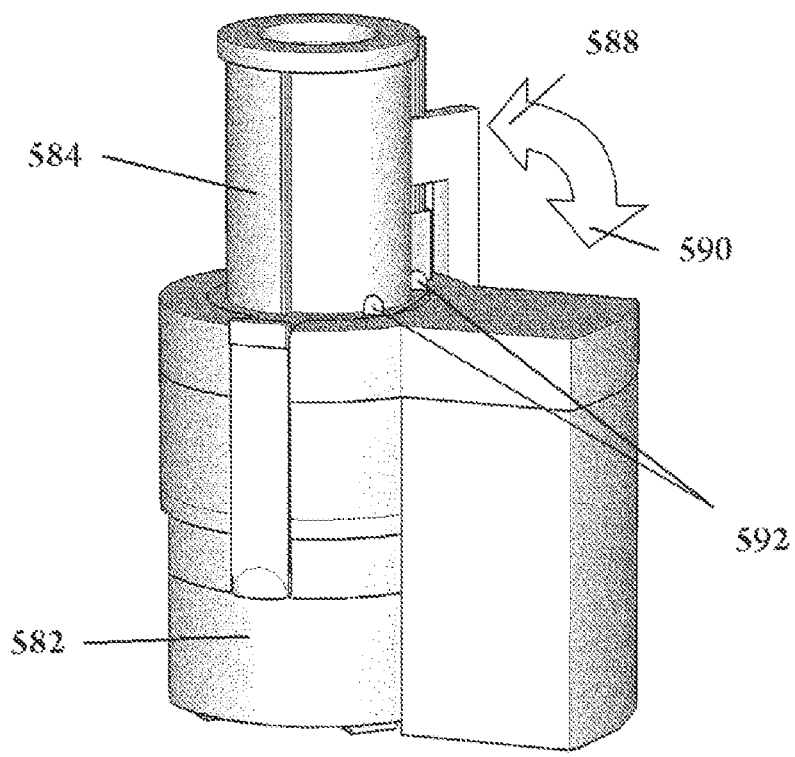
FIG. 85 is an illustration of a perspective view of a centrifugal juicer having a pivoting feed chute according to one embodiment of the subject application.
Figure 86:
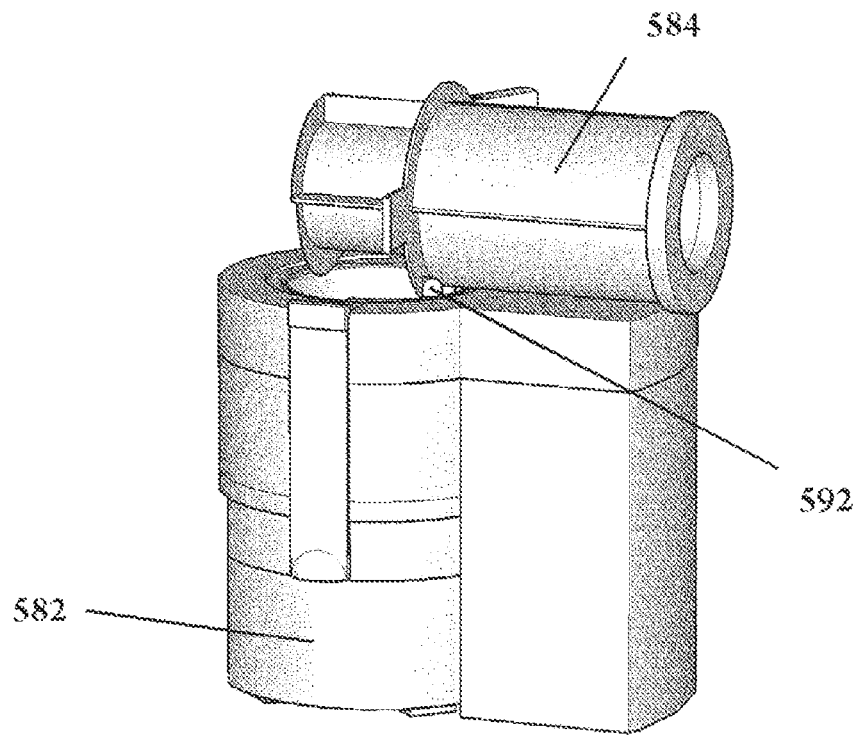
FIG. 86 is an illustration of another perspective view of the centrifugal juicer having a pivoting feed chute of FIG. 85 according to one embodiment of the subject application.

FIGS. 85 and 86 are perspective views which show a feed chute which has a hinge which allows the feed chute to tip over for compact storage.

FIGS. 87 through 90 show a blender type device with: an inclined motor to potentially improve blending speed and quality, and increase embodiment stability; multiple filter screens to vary the amount of pulp within dispensed liquids; and two exemplary embodiments of segmented resilient diaphragm shredding chamber lids to reduce unwanted ejection of food particles from the shredding chamber.

Figure 87:
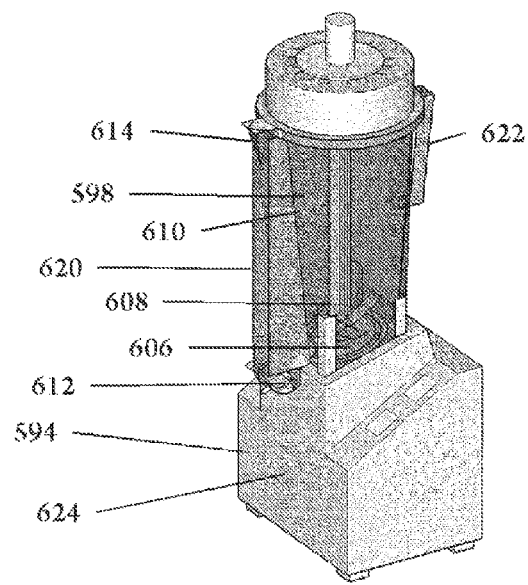
FIG. 87 is an illustration of a perspective of a blender according to one embodiment of the subject application.
Figure 88:
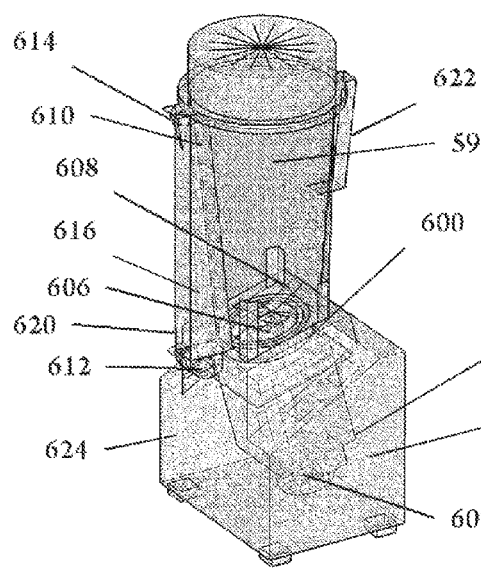
FIG. 88 is an illustration of an x-ray perspective view of the blender of FIG. 87 according to one embodiment of the subject application.
Figure 89:
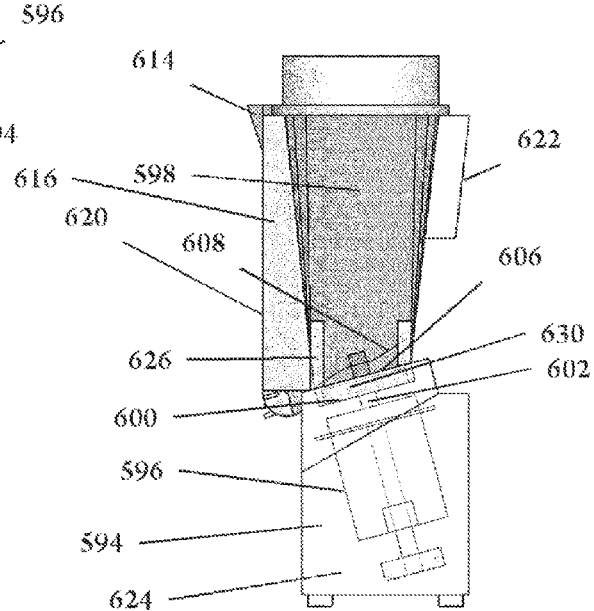
FIG. 89 is an illustration of a right-side view of the blender of FIG. 87 according to one embodiment of the subject application.
Figures 90, 90A:
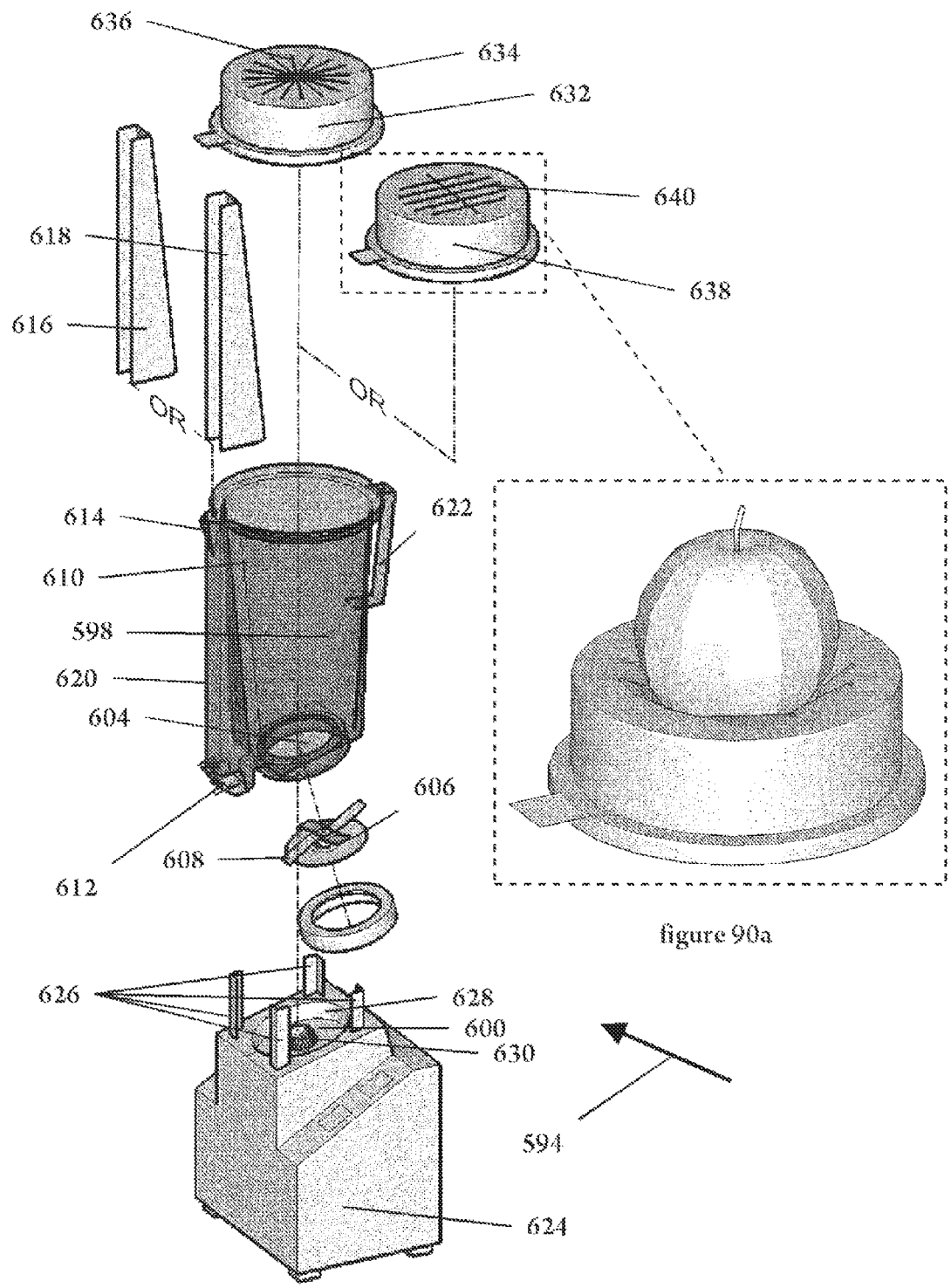
FIG. 90 is an illustration of an exploded perspective view of the blender of FIG. 87 according to one embodiment of the subject application.
FIG. 90*a* is an illustration of an expanded-ray view of the blender of FIG. 90 according to one embodiment of the subject application.

FIG. 87 is a perspective view. FIG. 88 is an x-ray perspective view from the viewpoint of FIG. 87. FIG. 89 is a cross-section as shown in the perspective view. FIG. 90 is an exploded perspective view. And FIG. 90*a* is an enlargement of a portion of FIG. 90, showing an article of food being pushed through one of the exemplary lids shown in FIG. 90.

Figure 91:
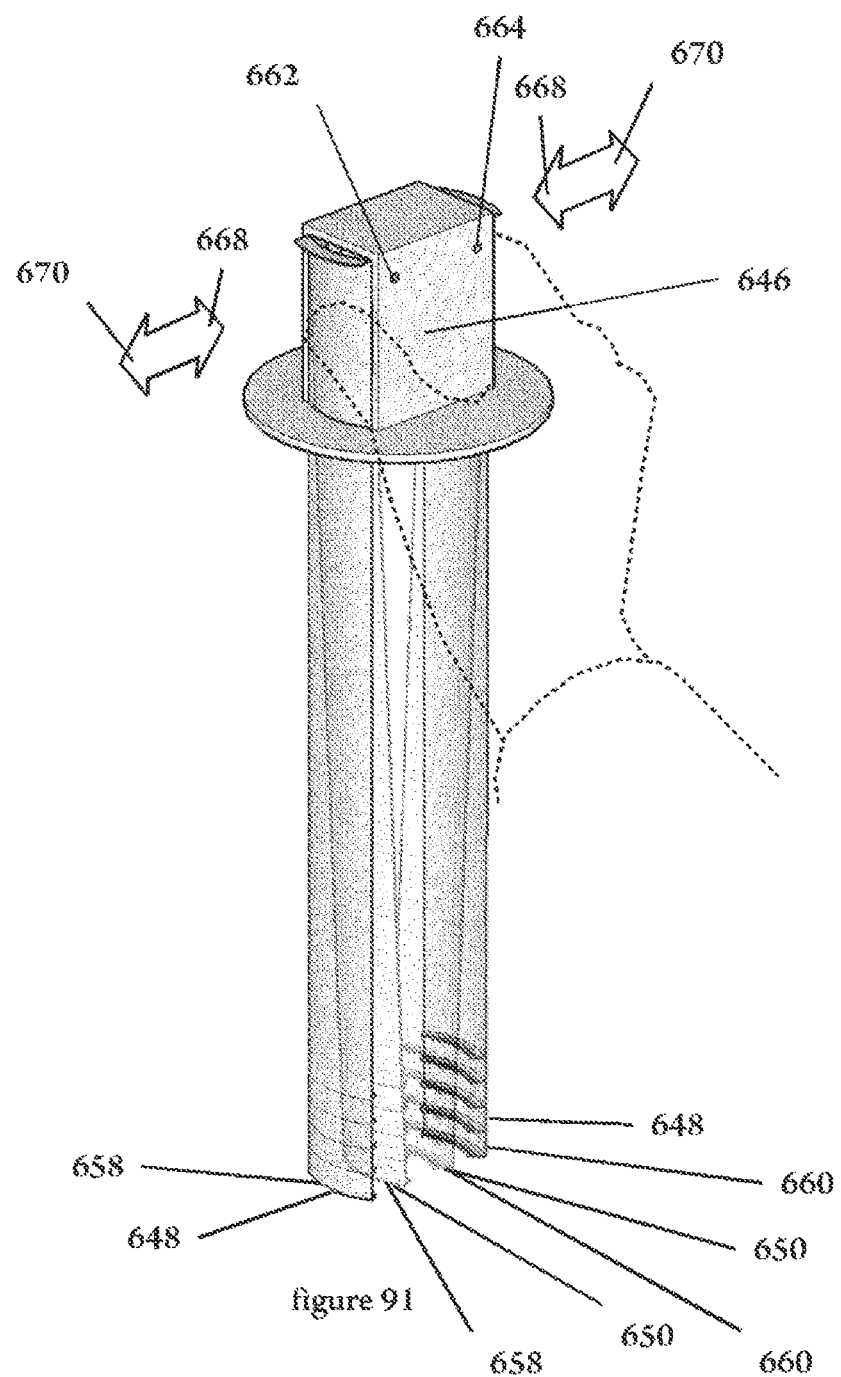
FIG. 91 is an illustration of a gripping pusher plunger for use in a blender according to one embodiment of the subject application.
Figure 92:
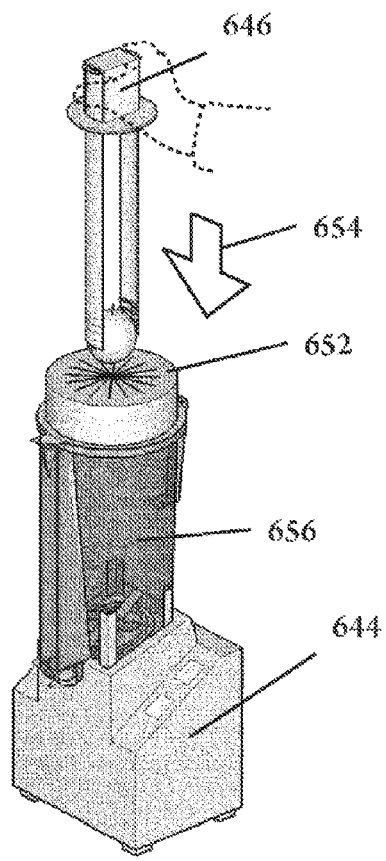
FIG. 92 is an illustration of a perspective view of a blender and the gripping pusher plunger of FIG. 91 according to one embodiment of the subject application.
Figure 93:
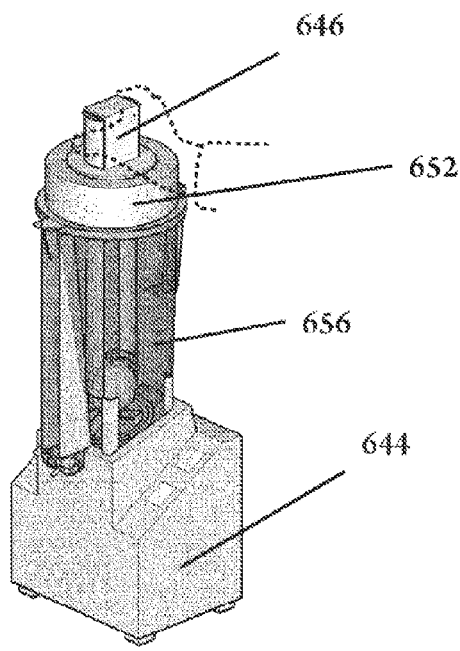
FIG. 93 is an illustration of a perspective view of a blender wherein the gripping pusher plunger of FIG. 91 and FIG. 92 has been inserted according to one embodiment of the subject application.

FIGS. 91 through 93 show the use of a gripping pusher plunger with extending arms in a blender type device. FIGS. 91 through 93 are perspective views.

Figure 94:
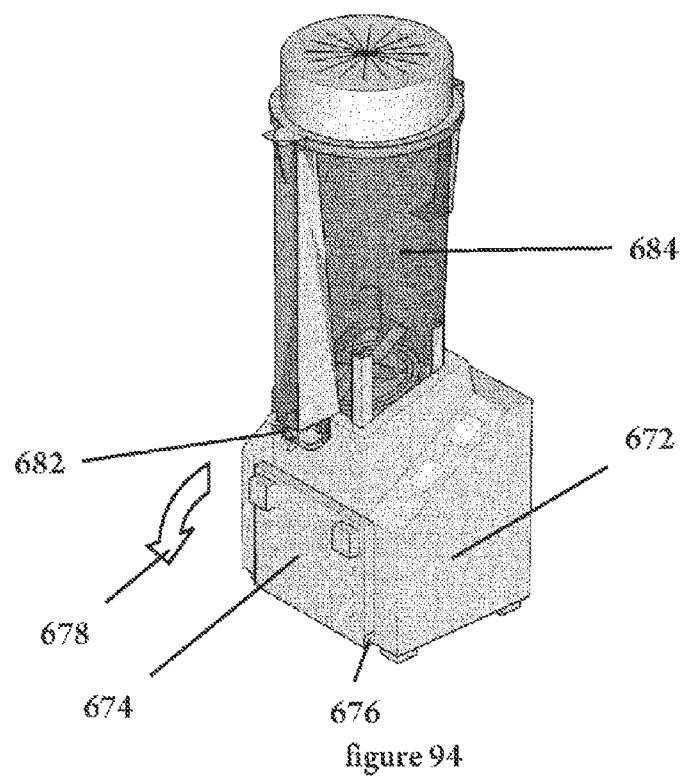
Figure 95:
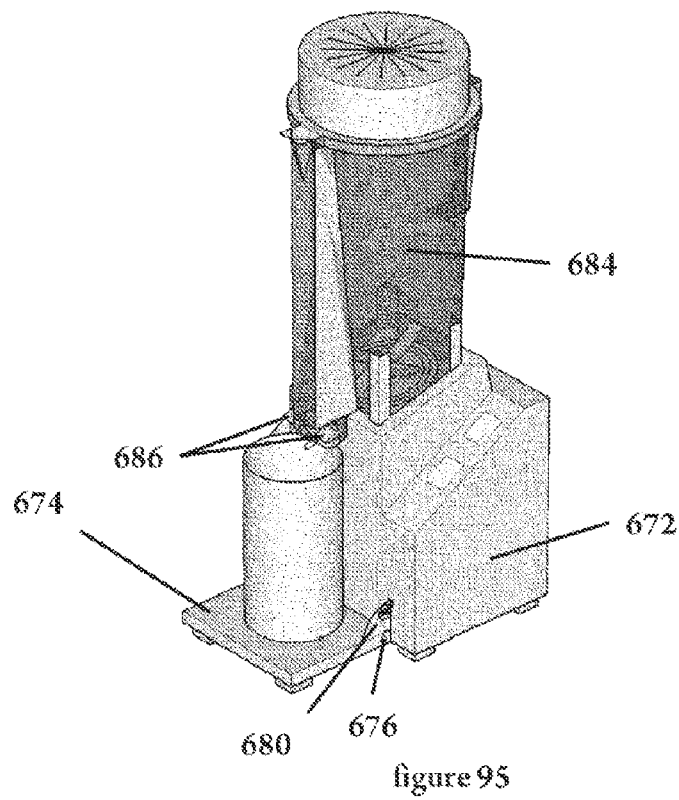

FIGS. 94 and 95 are perspective views which show a support platform which hinges down from the front of a blender type device to improve embodiment stability and convenience of use while promoting compact storage.

Figure 96:
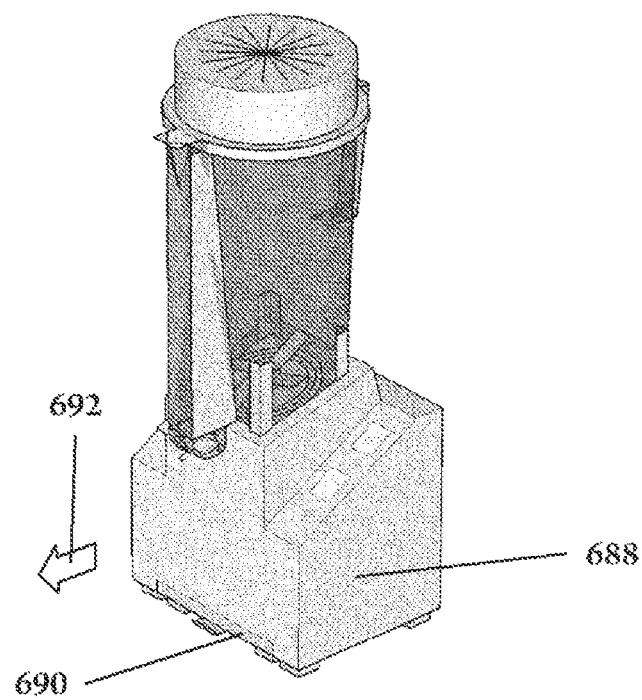
Figure 97:
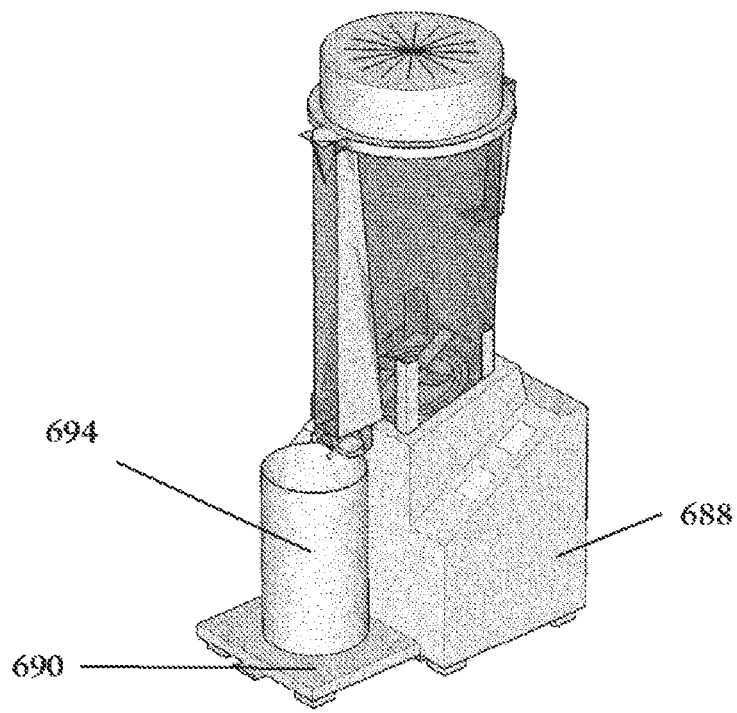

FIGS. 96 and 97 are perspective views which show another support platform which slides out from the front of a blender type device, also to improve embodiment stability and convenience of use while promoting compact storage.

For brevity sake herein, where similar devices are used on different preferred embodiments, the features, advantages, alternatives, and descriptions of such devices is not repeated for each preferred embodiment, but rather a person knowledgeable in the art would know that for such preferred embodiments, such features, advantages, alternatives and descriptions should be associated, alone or in combination with the features, advantages, alternatives and descriptions additionally found in each preferred embodiment.

As a non-limiting example, segmented pliable sheet cover 482 is described in detail in FIGS. 64 through 67 and in the text herein which describes those figures. Similar segmented pliable sheet covers are also shown at least in FIGS. 77 through 79, 81, 84, 87, 88, 90, 90*a*, 92, 93, and 94 through 97. The features, advantages, alternatives, and descriptions of each segmented pliable sheet cover is not repeated for these figures which also show similar segmented pliable sheet covers. It should be understood, however, that such features, advantages, alternatives, and descriptions are present wherever a segmented pliable sheet cover is shown. A more detailed description of the several embodiments of the subject application, with respect to the figures referenced above, is illustrated hereinafter.

Exemplary Preferred Embodiment One

Referring to FIGS. 1 through 3, food preparation device 100 is supported by base 102. Food preparation device 100 may be a centrifugal type juice extractor as illustrated, or it may be an alternative such as by way of a non-limiting examples, a food processor or blender or other type of food processing device. Base 102 has generally vertical sidewalls 106 at its periphery. Generally horizontal partition 104 is asymmetrically placed vertically within vertical sidewalls 106 and divides the space within vertical sidewalls 106 into 2 concavities, one being shallow and the other being deep and occupying most of the interior space defined by sidewalls 106. Generally horizontal partition 104 may be contiguous or may have openings penetrating some or most of its surface. Vertical sidewalls 106 are spaced wide enough apart to allow food preparation device 102 to telescope within vertical sidewalls 106.

FIG. 1 shows when food preparation device 100 is telescoped into the deep concavity defined by sidewalls 106 and generally horizontal partition 104. In this position the combination of food preparation device 100 and base 102 takes up little more space than food preparation device 100 alone. This compact configuration may make shipping and storage easier.

FIG. 2 shows food preparation device 100 telescoped into base 102, with base 102 being flipped over from the position for it shown in FIG. 1 so that food preparation device 100 telescopes into the shallow concavity defined by sidewalls 106 and generally horizontal partition 104. In this position pour spout 108 is elevated to allow taller liquid collecting vessels such as illustrative glass 110 to sit below and receive liquid from pour spout 108 (FIG. 2).

FIG. 3 shows food preparation device 100 lifted above base 102 with base 102 flipped over 112 to the position shown in FIG. 2. Snaps or latches may be used to hold base 102 to food preparation device 100 in either or both of the compact and extended positions. Generally vertical sidewalls 106 may be of various plan configurations including cylindrical as shown, as well as other peripheral shapes such as, by way of non-limiting examples, square, rectangular, triangular or other regular or irregular shapes. Likewise, the peripheral plan shape of food preparation device 100 which telescopes into base 102 may be varied to fit within such different shaped bases.

Exemplary Preferred Embodiment Two

FIGS. 4 through 6 illustrate adjustable height base 114 used to elevate and lower food preparation device 116. As shown in FIG. 6, base 114 includes helical slots 118 and 120 which penetrate through generally vertical sidewalls 122. At the top of helical slots 118 and 120 are two finger grips which mirror each other, and only one of which, finger grip 124, is shown. As is shown in FIG. 6 as well, food preparation device 116 also has finger grip 126, which has a counterpart which is replicated on the opposite side of food preparation device 116.

As shown in FIGS. 4 and 5, food preparation device 116 telescopes within adjustable height base 114. As also shown in FIGS. 4 and 5, finger grip 126 projects through helical slot 118, and, not shown, its opposite side counterpart projects through helical slot 120. When finger grip 126 is squeezed 127 toward finger grip 124, and their opposite side counterparts are simultaneously squeezed toward one another, food preparation device 116 rotates and rises causing food preparation device 116 to be elevated from its lower position which is shown in FIG. 4, to its upper raised position shown in FIG. 5. This in turn raises pour spout 128 to its upper position as shown in FIG. 5 allowing taller liquid collecting receptacles such as exemplary glass 130 shown in FIG. 5 to be placed beneath pour spout 128.

Downward facing detents at the top of helical slots 118 and 120, by supporting finger grip 126 and opposite side counterpart, hold food preparation device 116 in its upper position.

This preferred embodiment offers simple two-handed operation and allows base 114 to be continuously integrated with food preparation device 116.

Finger grip 126 may be disengaged from helical slot 118 by pushing it inward. This is also true for their opposite counterparts. This allows base 114 to be separated from food preparation device 116 for cleaning or other purposes.

Exemplary Preferred Embodiment Three

FIGS. 7 through 9, and including FIG. 9 enlargement 9A, show another preferred embodiment. Here, food preparation device 132 telescopes inside of, and raises and lowers vertically within, base 134 allowing taller liquid collecting receptacles, such as exemplary glass 136 to be placed below pour spout 138. Latch actuation button 140 is biased outward and rides within slot 142. This arrangement is imaged on the opposite side of base 134 and food preparation device 132 where a latch actuation button which is not shown rides within slot 144. Food preparation device 132 is raised within base 134 by finger pressure pulling latch actuation button 140 toward finger rest 146 and simultaneously doing the same action with the latch actuation button not shown and finger rest 148. Latch claws 150 grip detents on the interior of sidewalls 152 to hold food preparation device 132 in its raised position. Pressing in on latch actuation button 140 and the opposing latch actuation button not shown located on the opposite side causes latch claws 152 to become disengaged from detents on the interior of sidewalls 152, and thus allows food preparation device 132 to telescopically descend within base 132 to the more compact configuration shown in FIG. 7. This may aid in storage. Food preparation device 132 may be lifted free of base 134 for cleaning or other purposes by lifting it out of base 134.

Exemplary Preferred Embodiment Four

FIGS. 10 through 12, and including FIG. 12 enlargement 12a, show another embodiment which raises and lowers food preparation device 154 within base 155 so that in its raised position pour spout 156 can be raised above tall liquid collecting vessels, such as exemplary glass 158; and in its lowered position shown in FIG. 10 it can be made more compact for storage, shipping, or other purposes. Food preparation device 154 is raised within base 155 by finger pressure pulling latch actuation button 160 toward finger rest 162 and simultaneously doing the same action with the latch actuation button not shown and finger rest 164. Latch claws 166, including 3 other symmetrically mounted latch claws not shown, grip detents 170 on the interior of sidewalls 168 to hold food preparation device 154 in its raised position. Pressing in on latch actuation button 160 and the opposing latch actuation button not shown on the opposite side, causes latch claws 166 disengaged from grip detents 170 on the interior of sidewalls 168, and thus allows food preparation device 154 to telescopically descend within base 132 to the more compact configuration shown in FIG. 10. This may aid in shipping and storage. Food preparation device 154 may be freed from base 155 for cleaning or other purposes by lifting it out of base 155.

The plan cross-section where food preparation device 154 telescopically overlaps base 155 may be of any of many different geometries. These include not only the rectangular cross section shown, but also other regular and irregular shapes including, but not limited to: circular, elliptical, polygonal, and any other appropriate shape.

Exemplary Preferred Embodiment Five

FIG. 13, in FIGS. 13a, 13b, and 13c which are enlargements of a portion of FIG. 13, show a preferred embodiment for a valve controlled liquid dispensing spout. Here, liquid dispensing chute 172 pivots up and down 182, 184 on pins 174 and 176 which are disposed within pivot holes 178 and 180. Downward pivoted chute movement 184 may be initiated by a liquid collecting vessel, such as by way of a non-limiting example, a glass, pressing inward 186 against actuation lever 188, or it may be initiated by putting downward pressure on the extended outer end of chute 172, as a non-limiting example, using a finger.

Downward pivoted chute movement 184 results in pliable plug 190 unplugging from plughole 192 and thus allowing liquid to escape from liquid containment vessel 194 through plughole 192.

Upward pivoted chute movement 182 may be initiated with upward 182 pressure on the extended outer end of chute 172, as a non-limiting example, using finger pressure or the upward movement of a rim of a liquid collecting vessel. Such upward pivoted chute movement 182 has a result of pushing pliable plug 190 into plughole 192 and thus blocking the passage of liquid through plughole 192 and thus closing the valve formed by plug 190 and plughole 192.

By rotationally leveling chute 172 and by stopping liquid flowing into it, dripping from chute 172 after it stops dispensing is terminated almost immediately, thus saving the time normally spent waiting for dripping to stop.

This embodiment offers user convenience by both using finger movement, and alternatively using movement of the upper rim of a liquid collecting vessel, to initiate and stop the flow of liquid from the embodiment's liquid dispensing chute.

Exemplary Preferred Embodiment Six

FIG. 14 and FIGS. 14a, 14b, and 14c which are enlargements of a portion of FIG. 14, show another preferred embodiment for a valve controlled liquid dispensing spout.

In this preferred embodiment food preparation device 196 has liquid dispensing outlet 198, which is comprised of slide 200 which slides up 206 and down 208 in front of the first outlet orifice 202 which is located on the front the main body of food preparation device 196. Slide 200 has second outlet orifice 204 penetrating front to back through it.

First outlet orifice 202 has circumferential pliable seal 210 completely surrounding its periphery. Circumferential pliable seal 210 forms a liquid tight barrier against the back of slide 200. When slide 200 is in its full up position as shown in FIG. 14a, second outlet orifice 204 is completely above circumferential pliable seal 220 resulting in the lower portion of slide 200 forming a liquid tight seal across first outlet orifice 202, and therefore shutting off the flow of any liquid through first outlet orifice When slide 200 is lowered 208 to its lower position as shown in FIG. 14b, second outlet orifice 204 is directly in front of the first outlet orifice 202, and therefore allows the flow of liquid through liquid dispensing outlet 198.

Finger grip 212 allows slide 200 to be manually raised 206 and lowered 208. In addition, when slide 200 is in its lowered position, as shown in FIG. 14b, the rim of a liquid collecting vessel which liquid dispensing outlet 198 is dispensing into can contact bottom portion 214 of second outlet orifice 204 and push slide 200 upward 206 to the positioned shown in FIG. 14a, and consequently shut off the flow of liquid through liquid dispensing outlet 198. This is a convenience for the user.

Ears 216 and 218 may be manually pushed toward each other to disengage slide 200 from the main body of food preparation device 196 for cleaning or other purposes.

Exemplary Preferred Embodiment Seven

FIG. 15, and including enlargements of FIG. 15, FIG. 15a, FIG. 15b, and FIG. 15c, show a preferred embodiment of a liquid dispensing outlet 220.

Food preparation device 222 includes liquid collection vessel 224 with dispensing outlet 220 on its forward lower face. As shown in FIGS. 15a, 15b, and 15c, dispensing outlet 220 includes slide 226 and also includes first liquid dispensing outlet orifice 228 located on the bottom portion of liquid collection vessel 224.

Circumferential pliable seal 230 surrounds first liquid dispensing orifice 228 and forms a liquid tight seal between slide 226 and the circumference of first liquid dispensing orifice 228. Slide 226 includes second liquid dispensing outlet orifice 232 which penetrates top to bottom through slide 226.

When slide 226 is pushed fully in, as shown in FIG. 15a, only the non-penetrated part of slide 226 is in contact with circumferential pliable seal 230, thus preventing liquid from passing through dispensing outlet 220.

When slide 226 is pulled fully outward, as shown in FIG. 15b, second liquid dispensing outlet orifice 232 is directly below first liquid dispensing outlet orifice 228, thus forming a continuous opening which allows the flow liquid through dispensing outlet 220.

To turn on and off the flow liquid through dispensing outlet 220, slide 226 may be pulled out 234 and pushed in 236 manually using finger grip 238.

Slide 226 may also be pulled out 234 and pushed in 236 using downward protruding member 240 to contact the upper rim of a liquid collection container placed below dispensing outlet 220. Here movement of the upper rim of the liquid collection container while pushing or pulling against downward protruding member 240 may move slide 226 from and to the position shown in 15a, where no liquid passes through outlet 220, from and to the position shown in FIG. 15b, where liquid may pass through outlet 220. This may be a convenience for the user.

Exemplary Preferred Embodiment Eight

FIGS. 16, 17, and 18 as well as FIG. 16 enlargements, FIG. 16a, FIG. 16b, and FIG. 16c, show a preferred embodiment for a liquid output passage. Liquid output passage 242 includes partially cylindrical pivoted cover 244 which conforms to and covers the outside of liquid output passage base 246 which has a partial cylindrical face which is penetrated by first output orifice 248. Orifice 248 is surrounded by circumferential pliant seal 250 which seals its periphery liquid tight against the inside face of pivoted cover 244. Pivoted cover 244 is penetrated by second outlet orifice 252.

When pivoted cover 244 is pivoted upwards 254, as shown in FIGS. 16a and 18, only the non-penetrated portion of pivoted cover 244 is sealed against circumferential pliant seal 250, and therefore liquid is not allowed to pass through liquid output passage 242. When pivoted cover 244 is pivoted downwards 256, as shown in FIGS. 16b and 17, second output orifice 252 is aligned in front of first output orifice 248, and therefore liquid is allowed to pass through liquid output passage 242.

Up 254 and down 256 movement of pivoted cover 244 may be accomplished by finger pressure against cover 244. It may also be accomplished using the rim of a liquid collection vessel which liquid output passage 242 is filling, by pushing the rim against projection 258, or against projection 260. This flexibility of actuation methods may be a convenience for the user.

Lip 262 on the output side of second outlet orifice 252 helps to stop dripping as soon as pivoted cover 244 is moved to its raised position shown in FIGS. 16a and 18.

Exemplary Preferred Embodiment Nine

Figure 19:
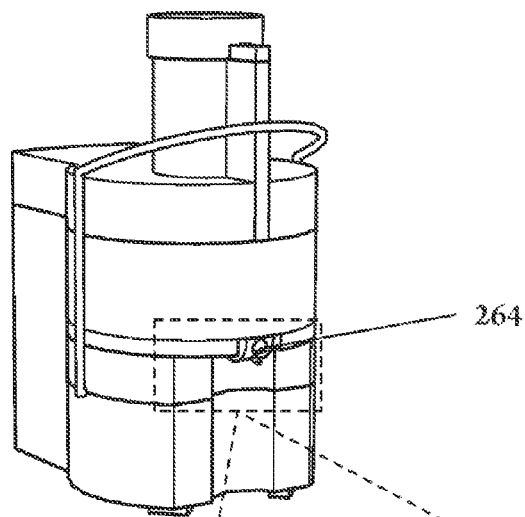
FIG. 19 is an illustration of a liquid output passage configuration of a food preparation device according to one embodiment of the subject application.
Figure 19A:
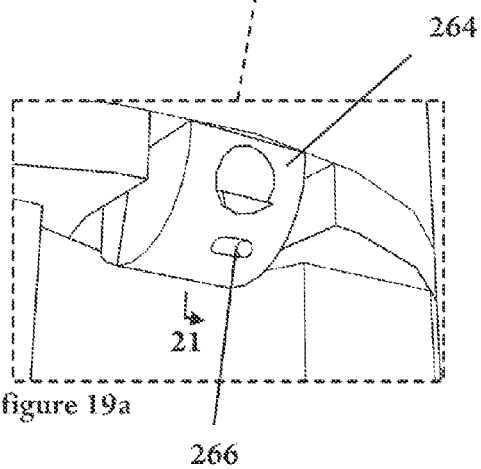
FIG. 19a is an enlargement illustration of the liquid output passage configuration of the food preparation device of FIG. 19 according to one embodiment of the subject application.
Figure 19B:
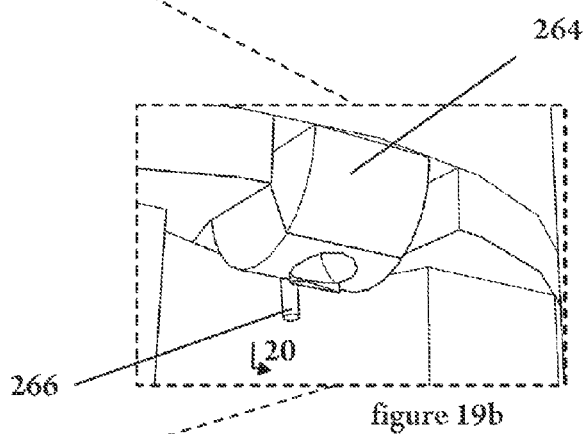
FIG. 19b is an enlargement illustration of the liquid output passage configuration of the food preparation device of FIG. 19 according to one embodiment of the subject application.
Figure 19C:
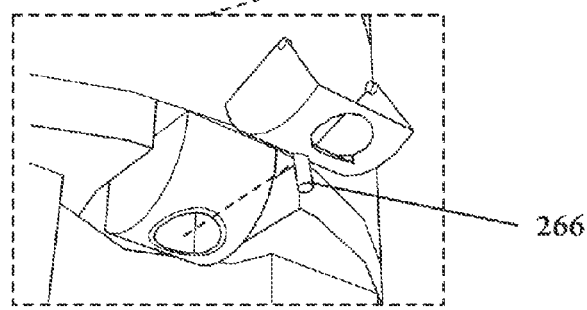
FIG. 19c is an enlargement illustration of the liquid output passage configuration of the food preparation device of FIG. 19 according to one embodiment of the subject application.

FIGS. 19, 20, and 21, as well as FIG. 19 enlargements, FIG. 19a, FIG. 19b and FIG. 19c, show a preferred embodiment of a liquid outlet passage 264 which is similar to that shown in FIGS. 16 through 18 except projection 260 has been minimized. Similar appearing parts perform similar functions.

In this preferred embodiment projection 266 is contacted when pivoted cover 268 is moved up 270 and down 272 under pressure from movement of a liquid collection vessel rim.

Exemplary Preferred Embodiments Ten, Eleven, Twelve, and Thirteen

FIGS. 22 through 28 show 4 preferred embodiments for a centrifugal juicer shredding disc. These all share on the outer portions of the shredding discs, shredding elements which may be similar to those found in many of today's centrifugal juicers with different patterns of upward facing sharpened elements. The preferred embodiments differ in the shredding element found at each disc's centers. Here, raised shredding elements provide a combination of food shredding movement and food shredding chopping by engaging the food with asymmetric members.

FIGS. 22 and 23 show a preferred embodiment. Referring to FIGS. 22 and 23, diagonally disposed triangular blade 274 is located with its base adjacent to the center of shredding disc 276. Each of the upward extending edges on blade 274 may be dull or may be beveled for sharpness.

As shredding disc 276 rotates 278 it carves a portion of food descending onto the center of shredding disc 276. Simultaneously, because blade 274 is offset to disc 276 itself, it moves the food latterly in a vibrating motion across the top of disc 276. Both of these actions help to disintegrate food.

FIGS. 24 and 25 show a preferred embodiment. Referring to FIGS. 24 and 25, bent triangular blade 280 is mounted near the center of shredding disc 282. Each of the upward extending edges on blade 280 may be dull or may be beveled for sharpness.

As shredding disc 282 rotates 284 it carves a portion of food descending onto the center of shredding disc 282. Simultaneously, because blade 280 is offset to disc 282 itself, it moves the food latterly in a vibrating motion across the top of disc 282. Both of these actions help to disintegrate food.

FIGS. 26 and 27 show a preferred embodiment. Referring to FIGS. 26 and 27, short pin 286 and long pin 288 are mounted adjacent to the center of shredding disc 290.

As shredding disc 290 rotates 292 it shreds a portion of food descending onto the center of shredding disc 290. Simultaneously, because short pin 286 and long pin 288 are mounted asymmetrically on disc 290, they move the food latterly in a vibrating motion across the top of disc 282. Both of these actions help to disintegrate food.

FIG. 28 shows preferred embodiment shredding disc 294 with central vertically disposed triangular blade 298. Each of the edges on blade 298 may be dull or beveled for sharpness.

As shredding disc 294 rotates 296 it shreds a portion of food descending onto the center of shredding disc 294. Simultaneously, because blade 298 is offset to disc 294, it moves the food latterly in a vibrating motion across the top of disc 294. Both of these actions help to disintegrate food.

Exemplary Preferred Embodiment Fourteen

FIG. 29, and enlargements of FIG. 29, FIG. 29a and FIG. 29b, show a preferred embodiment of centrifugal juicer 300.

Here, 2 interchangeable filter cones, 302, 304, each with a different filter mesh, 306, 308 respectively, are supplied with juicer 300. By providing more than one filter cone, each filter cone having a different porosity filter mesh, extracted juices may be provided with more or less pulp. This may be an important user feature as demonstrated by the grocery store orange juice market which has individual sections for juice with no pulp, some pulp, and heavy pulp.

Exemplary Preferred Embodiment Fifteen

FIGS. 30 through 38, including FIG. 38 enlargement, FIG. 38a, illustrate a preferred embodiment of the subject application. Here centrifugal juicer embodiment 309 is shown with, pusher plunger face 310 which is pivotally 311 mounted to lever/handle 312, which in turn is pivotally 314 mounted to juicer lid 316.

Figure 36:
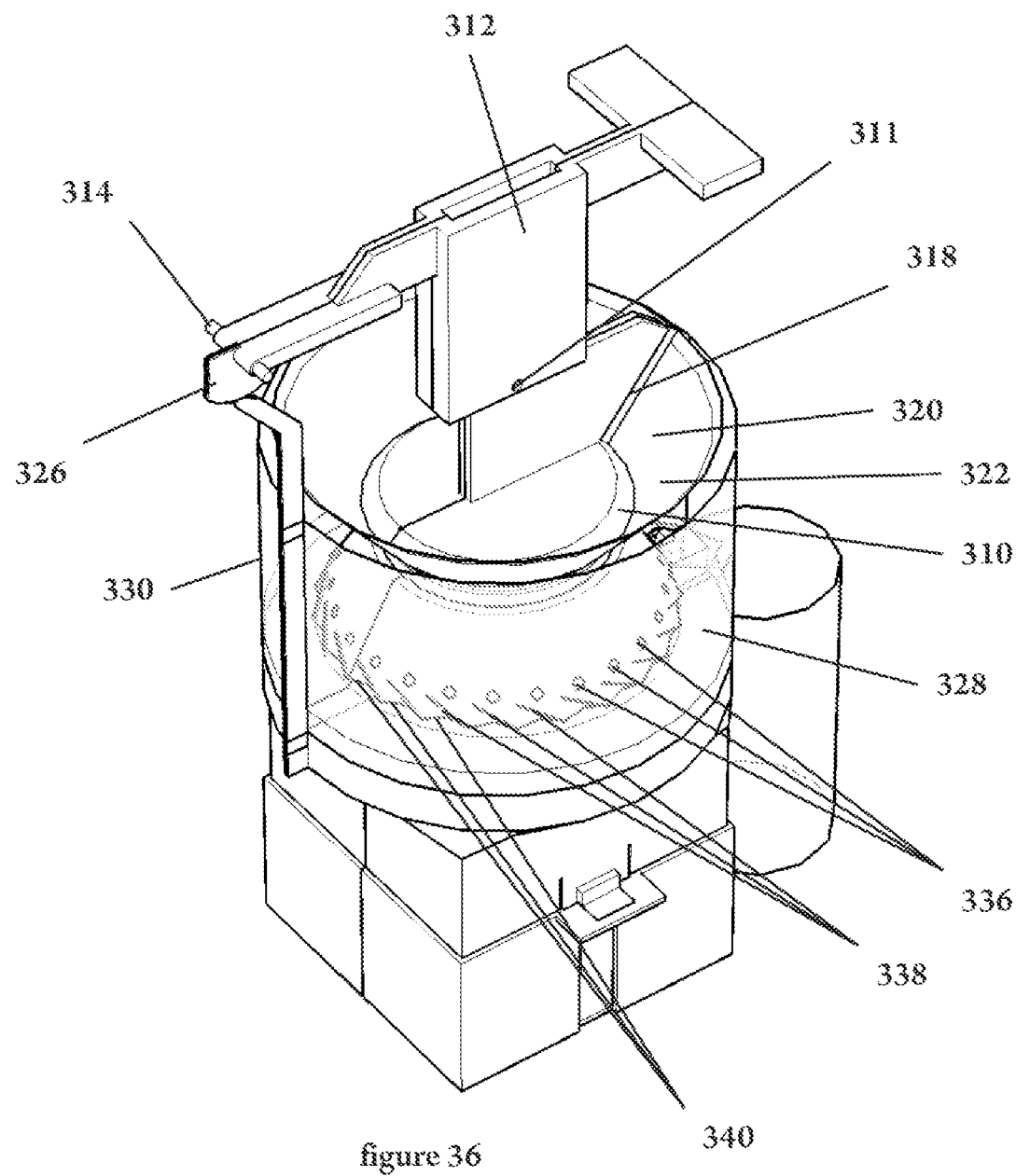
FIG. 36 is another view of the illustration of the centrifugal juicer having a pusher plunger of FIG. 30 according to one embodiment of the subject application.

Disposed directly adjacent to pusher plunger face 310 and connected to it, is wiper 318. FIG. 35 shows plunger face 310 fully lowered. FIG. 36 shows embodiment 309 with lid 316 not shown for clarity of viewing inner components, and pusher plunger face 310 is shown also fully lowered as in FIG. 35. As shown in FIGS. 35 and 36, wiper 318 wipes against inner face 320 of truncated conical filter 322 when pusher plunger face 310 is fully lowered. In operation, when truncated conical filter 322 is powered and spinning, contact of wiper 318 against inner face 320 of truncated conical filter 322 cleans face 320. Wiper 318 may be: a brush, a stiff or flexible blade, one or more rigid or flexible segmented blades, or may be made using other appropriate construction.

Automatically cleaning inner filter face 320 can be a major advantage to an embodiment user, first, because it makes simple what is normally a tedious and difficult job to do, and second, because it improves the efficiency of filter 322 by wiper 318 cleaning debris off inner face 320 which would otherwise clog filter 322.

Pusher plunger face 310 traverses generally vertically within feed chute 324. FIGS. 30 and 31 show pusher plunger face 310 in its fully raised position. FIGS. 32 and 33 show pusher plunger face 310 partially lowered. In FIGS. 34 through 37 pusher plunger face 310 is fully lowered. FIG. 38 is a partially exploded perspective view with pusher plunger face 310 fully lowered.

When pusher plunger face 310 is fully raised, as illustrated in FIGS. 30 and 31, a safety interlock switch is activated by cam 326. Cam 326 is located at the base of lever handle 312 directly adjacent to pivot 314. The activated safety interlock switch shuts off power to embodiment 309's motor and will not allow operation of embodiment 309's motor unless pusher plunger face 310 is at least lowered to a predetermined position.

Thus, unless pusher plunger face 310 is at least partially lowered, there is no safety hazard posed from a hand extending through feed chute 24 and coming in contact with a spinning shredder disc.

When comparing embodiment 309 to other centrifugal juicers, this allows an usually large feed chute, approaching the full diameter of embodiment 309's shredder disc, because hand entry into the feed chute is prevented, not by the diameter of the feed chute, or by its length as in other centrifugal juicers, but rather by the necessity for pusher plunger face 310 to be partially lowered and thus partially blocking the entry to feed chute 324 before embodiment 309's motor can be activated.

Embodiment 309 also shows the use of the elevated base shown in FIGS. 10 through 12 and descriptions related to those figures given herein.

Embodiment 309 has internal liquid reservoir 328 which can be viewed through reservoir 328's generally vertical side walls 330 which have at least a translucent section through which the contents of reservoir 328 may be viewed to prevent overflowing reservoir 328, and/or to see the quality, content, and/or condition of the juice or other liquid within reservoir 328, and/or for any other reason. Reservoir 328 receives liquid which has passed through truncated conical filter 322.

Embodiment 309 uses output chute/valve 332 which is similar to the device illustrated in FIGS. 13, 13a, 13b, and 13c herein and described in the descriptions herein related those figures. Use of an outlet which can be fully closed through valve action is fundamental to the operation of internal liquid reservoir 328. By way of non-limiting examples, several outlets which can be fully closed are shown in FIGS. 13 through 21 herein, and described in related specification thereto.

Internal liquid reservoir 328 allows juicing without requiring a glass or other liquid collection vessel being placed under output chute/valve 332. This may be an advantage to the user who does not have to juggle glasses or other liquid collection vessels while simultaneously placing fruits, vegetables or other foods into embodiment.

A problem with centrifugal juicers is that usually the juice they provide separates within a few minutes after it is produced. This separation changes both the appearance and taste of the fresh juice. To prevent this, embodiment 309 has truncated cone mixing element 334 which is attached to the bottom of inverted truncated conical filter 322, and rotates with it when embodiment 309's motor is activated.

When rotating, element 334 mixes liquids within reservoir 328, thus overcoming the problems of juice and/or liquid separation.

The mixing ability of truncated cone mixing element 334 may be enhanced through the use of texturing or contouring or penetrating the inner and/or outer faces of element 334. By way of non-limiting examples, element 334 is illustrated with holes 336 penetrating it surface, ribs 338 disposed on its outer surface, and contoured lower rim 340 (FIG. 36). Any combination of any or all of these elements, as well as a multitude of other devices such as, by way of additional non-limiting examples, rippling or bending or adding propeller-like blades to the surface(s) of element 334, would suffice to enhance element 334's mixing action.

Exemplary Preferred Embodiment Sixteen

FIGS. 39 through 42 show preferred embodiment centrifugal juicer 368 with feed chute 370 which rocks front 360 to back 362 and side 364 to side 366, or any diagonal between, to more efficiently shred food fed through chute 370 by allowing movement of food across shredding plate 372.

Feed chute 370 is held in place by 4 pins (of which pins 374, 376, and 378 are shown) which engage inside of 4 loosefitting openings 380, 382, 384, and 386. The loose fit between the 4 pins and the 4 openings allows feed chute 370 a limited degree of rocking motion as shown by the ghosted images in FIGS. 41 and 42 which in turn allows food fed through feed chute 370 to be exposed to shredding plate 372 a small portion at a time rather than exposing the full cross section of food being fed through feed chute 370 to shredding plate 372 all at once.

FIGS. 39 through 41 are perspective views each taken from identical viewpoints. FIG. 42 is a front x-ray view of centrifugal juicer 368.

Exemplary Preferred Embodiment Seventeen

FIG. 43 shows preferred embodiment centrifugal juicer 388 with pusher plunger 390 which is contoured on bottom surface 394 to reduce undesirable rotation of food fed through feed chute 392 with centrifugal juicer 388 having its shredder disc rotating as shown by arrow 396.

Exemplary Preferred Embodiment Eighteen

FIG. 44 shows preferred embodiment centrifugal juicer 398 with pusher plunger 400 which is contoured on bottom surface 402 to reduce undesirable rotation of food fed through feed chute 404 with centrifugal juicer 388 having its shredder disc rotating as shown by arrow 406. FIG. 44a is an enlargement illustration of the pusher plunger 400 which is contoured on the bottom surface 402.

Exemplary Preferred Embodiment Nineteen

Figure 45:
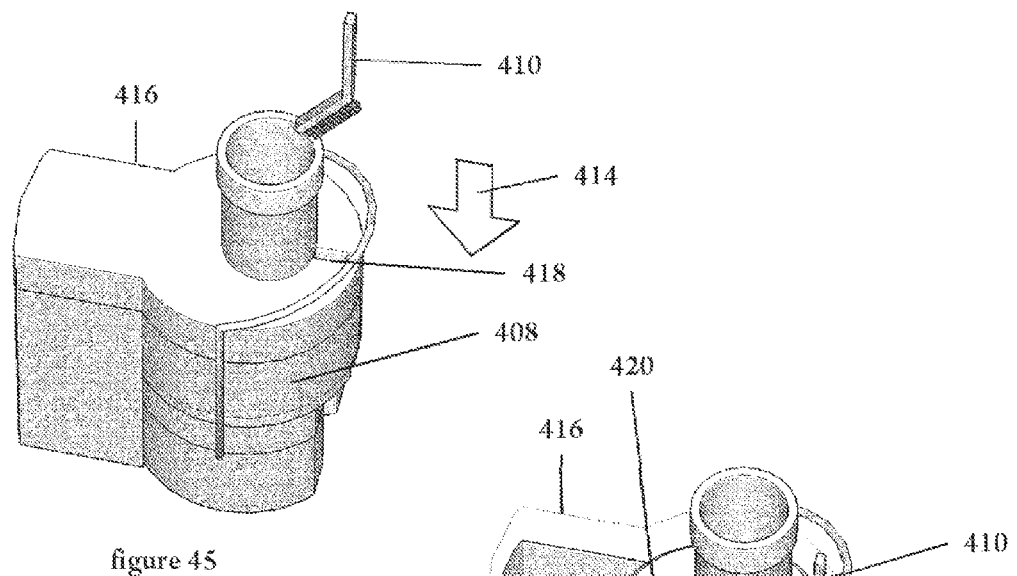
FIG. 45 is an illustration of a perspective view of a centrifugal juicer which uses a cleaning brush according to one embodiment of the subject application.
Figure 46:
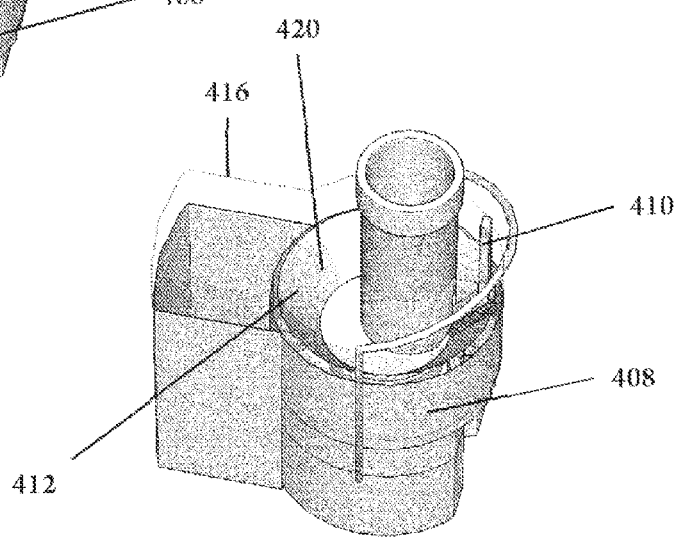
FIG. 46 is another perspective view of the centrifugal juicer which uses a cleaning brush of FIG. 45 according to one embodiment of the subject application.
Figure 47:
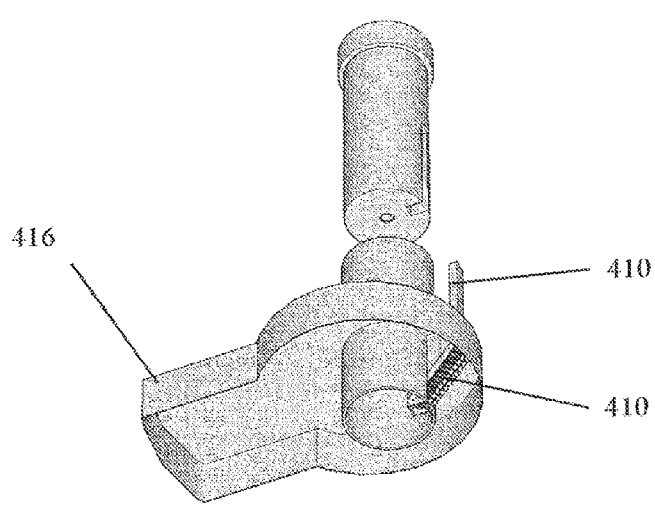
FIG. 47 is a perspective view of the underside of the lid of the centrifugal juicer which uses a cleaning brush of FIG. 45 according to one embodiment of the subject application.

FIGS. 45, 46, and 47 show preferred embodiment centrifugal juicer 408 which uses cleaning brush 410 to remove debris from truncated conical filter 412.

FIG. 45 is a perspective view of preferred embodiment centrifugal juicer 408, with cleaning brush 410 ready to be inserted 414 into lid 416 through slot 418 where it will be brought into contact with inward facing surface 420 of truncated conical filter 412.

FIG. 46 is a perspective taken from the same viewpoint as FIG. 45. In FIG. 46, lid 416 is ghosted in to facilitate showing cleaning brush 410 being inserted through slot 418 and contacting inner facing surface 420 of truncated conical filter 412. In this position, cleaning brush 410 wipes and cleans inner facing surface 420.

FIG. 47 is a perspective view of the underside of lid 416 with brush 410 inserted through it.

The wiper on cleaning brush 410 may be a bristled brush, and/or may be one or more wiper blades made of pliant and/or rigid material(s), or may be of other appropriate design.

In operation, the user may at any time clean inward facing surface 420 of truncated conical filter 412 by manually inserting cleaning brush 410 into slot 418 while embodiment 408's motor is operating.

Such cleaning is much easier than removing truncated conical filter 412 and cleaning it in a sink. Also, by being able to easily clean filter 412 at any time, it may improve the efficient use of embodiment 408 by maintaining the efficiency of filter 412 through not having it clogged with debris.

Exemplary Preferred Embodiment Twenty

FIGS. 48 through 51 are perspective views that show centrifugal juicer embodiment 422 which has wiper 424 attached to the bottom of pusher plunger 426 where wiper 424 automatically cleans both the shredder disc of embodiment 422 and inward facing surface 428 of truncated conical filter 430 each time pusher plunger 426 is fully inserted through feed chute 432 into lid 434 of embodiment 422 while embodiment 422's motor is operating.

Figure 48:
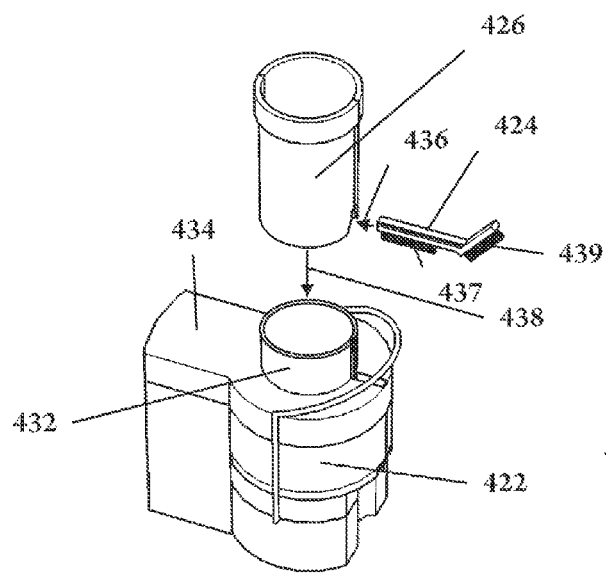
FIG. 48 is an illustration of a perspective view of a centrifugal juicer having a wiper attached to a bottom of a pusher plunger according to one embodiment of the subject application.
Figure 50:
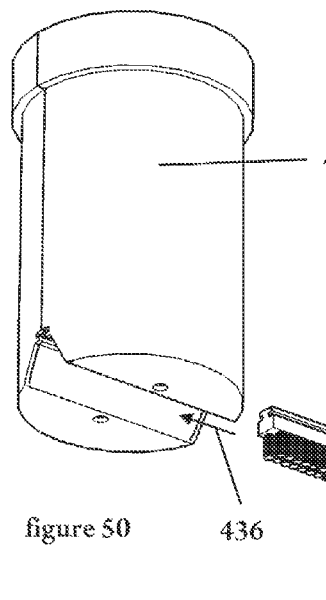
FIG. 50 is an illustration of an underside perspective view of the centrifugal juicer with the wiper ready to be inserted into the bottom of the pusher plunger of FIG. 48 according to one embodiment of the subject application.

FIGS. 48 and 50 show wiper 424 ready to be inserted 436 into the bottom of pusher plunger 426.

Figure 49:
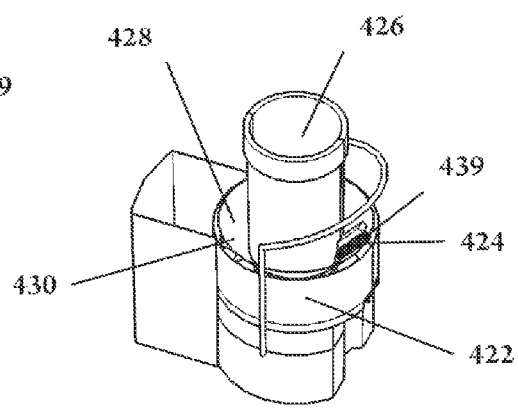
FIG. 49 is an illustration of another perspective view of the centrifugal juicer having a wiper attached to the bottom of the pusher plunger of FIG. 48 according to one embodiment of the subject application.

FIG. 49 is taken from the same viewpoint as FIG. 48. In FIG. 49, lid 434 is not shown so that truncated conical filter 430 might be more easily viewed. In FIG. 49, pusher plunger 426 is fully lowered 438 and wiper 424 is in contact with, and cleaning, both inward facing surface 428 of truncated conical filter 430 and embodiment 422's shredder disc.

FIG. 50 is an underside perspective view of pusher plunger 426 with wiper 424 ready to be inserted into the bottom of pusher plunger 426.

Figure 51:
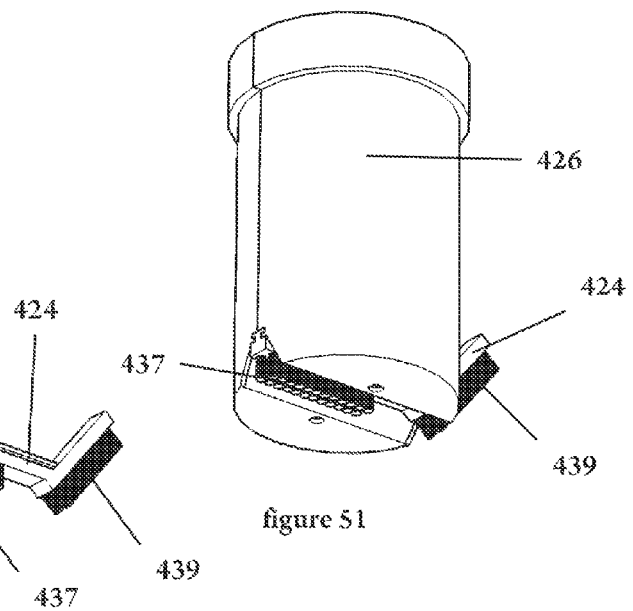
FIG. 51 is an illustration of an underside perspective view of the centrifugal juicer having the wiper fully inserted in the bottom of the pusher plunger of FIG. 48 according to one embodiment of the subject application.

FIG. 51 is an underside perspective view of pusher plunger 426 with wiper 424 fully inserted into the bottom of pusher plunger 426.

The wiping members 437 and 439 on wiper 424 may be bristled brushes, and/or may be each possessing one or more wiper blades made of pliant and/or rigid material(s), or may be of other appropriate design.

Exemplary Preferred Embodiment Twenty-One

FIGS. 52 through 57 show preferred embodiment centrifugal juicer 440 which has push button 442 leaf spring 452 returned cleaning brush 444 inserted 446 through slot 448 in lid 450.

Figure 52:
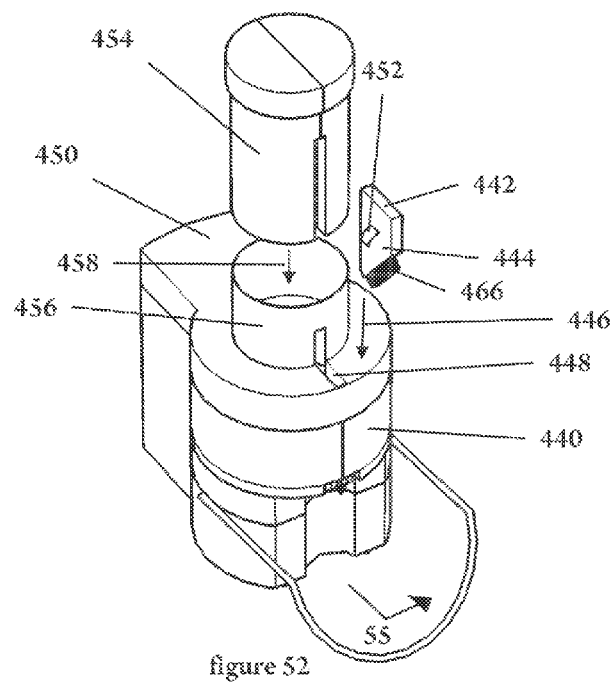
FIG. 52 is an illustration of a perspective view of a centrifugal juicer having a push button leaf spring returned cleaning brush inserted through a slot in a lid according to one embodiment of the subject application.

FIG. 52 is a perspective view of embodiment 440 with cleaning brush 444 ready to be inserted 446 into slot 448 and pusher plunger 454 ready to be inserted 458 into feed chute 456.

Figure 53:
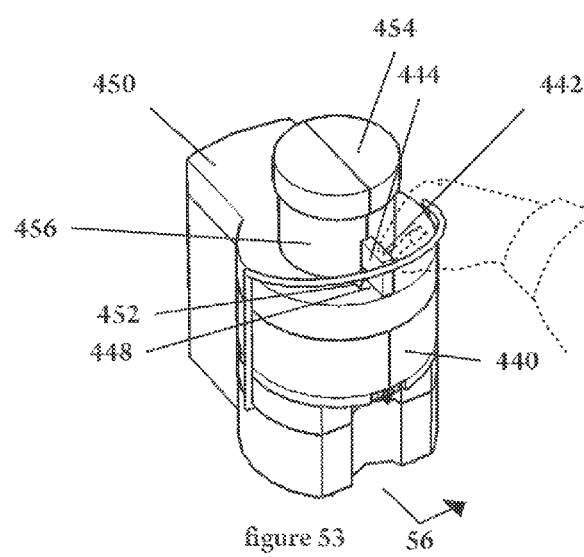
FIG. 53 is an illustration of another perspective view the centrifugal juicer having a push button leaf spring returned cleaning brush of FIG. 52 according to one embodiment of the subject application.

FIG. 53 is a perspective taken from the same point of view as FIG. 52. In FIG. 53, pusher plunger 454 is fully inserted into feed chute 456 and cleaning brush 444 is inserted into, but not depressed 462 into, slot 448.

Figure 54:
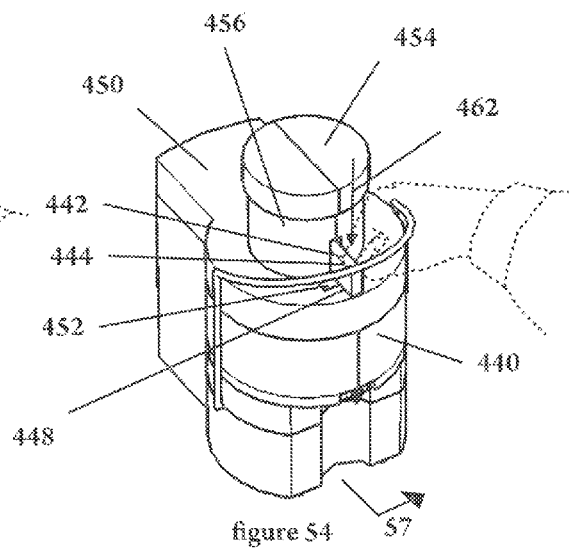
FIG. 54 is an illustration of a further perspective view the centrifugal juicer having a push button leaf spring returned cleaning brush of FIG. 52 according to one embodiment of the subject application.

FIG. 54 is a perspective that is taken from the same viewpoint as FIG. 53, and is similar to FIG. 53 except in FIG. 54 cleaning brush 444 is fully depressed into slot 448 which, when the motor of embodiment 440 is simultaneously activated, causes cleaning of inner surface 464 of truncated conical filter 460 by wiping member 466 disposed at the base of cleaning brush 444 contacting inner surface 464 as shown in FIG. 57.

Leaf spring 452 biases upward cleaning brush 444 and returns cleaning brush 444 to the upper position shown in FIGS. 53 and 56 when there is no downward pressure on pushbutton 442.

Wiping member 466 at the bottom of cleaning brush 444 may be a bristled brush, and/or may be one or more wiper blades made of pliant and/or rigid material(s), or may be of other appropriate design. This embodiment offers easy on-demand cleaning of truncated conical filter 460.

Exemplary Preferred Embodiment Twenty-Two

FIGS. 58 through 63 show preferred embodiment centrifugal juicer 468 which has inward directed pliable vertical ribs 470 disposed within feed chute 472.

Figure 58:
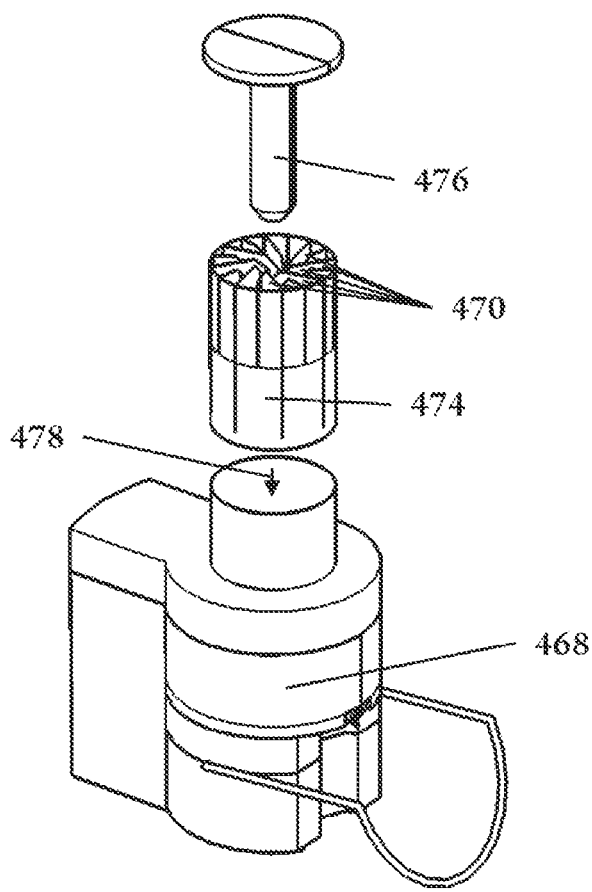
FIG. 58 is an illustration of a perspective view of a centrifugal juicer having inward directed pliable vertical ribs within a feed chute according to one embodiment of the subject application.

FIG. 58 is a perspective view of preferred embodiment centrifugal juicer 468 with pliable vertical rib insert 474 removed from within feed chute 472 and with pusher plunger 476 above pliable vertical rib insert 474 and ready to be inserted 478.

Figure 59:
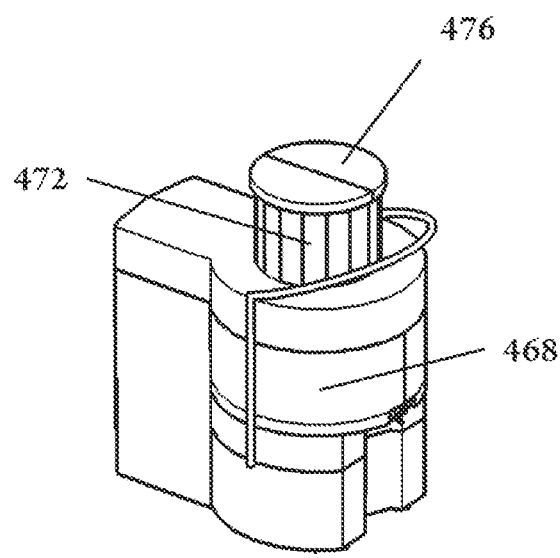
FIG. 59 is another illustration of a perspective view of the centrifugal juicer having inward directed pliable vertical ribs within the feed chute of FIG. 58 according to one embodiment of the subject application.

FIG. 59 is a perspective view taken from the same viewpoint as FIG. 58. FIG. 59 shows both pliable vertical rib insert 474 and pusher plunger 476 fully inserted into feed chute 472.

Figure 60:
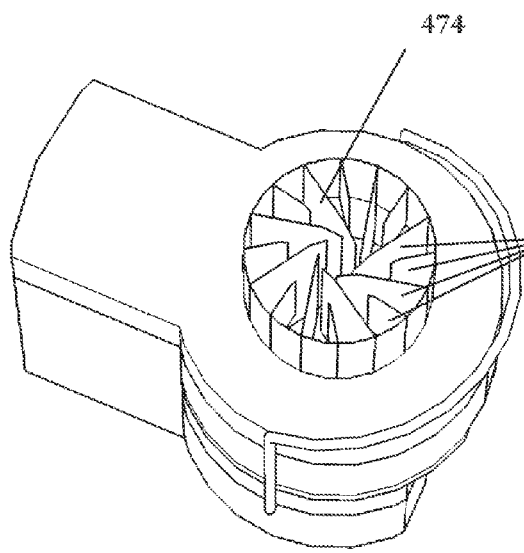
FIG. 60 is an illustration of an overhead perspective view of the centrifugal juicer having inward directed pliable vertical ribs within the feed chute of FIG. 58 according to one embodiment of the subject application.
Figure 61:
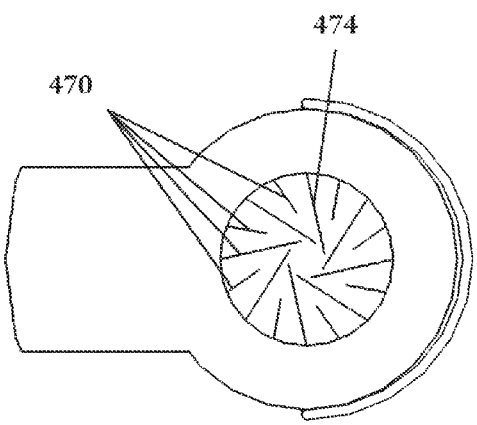
FIG. 61 is an illustration of a direct overhead perspective view of the centrifugal juicer having inward directed pliable vertical ribs within the feed chute of FIG. 58 according to one embodiment of the subject application.

FIG. 60 is an overhead perspective looking down into pliable vertical rib insert 474. FIG. 61 is a direct overhead view of embodiment 468.

Figure 62:
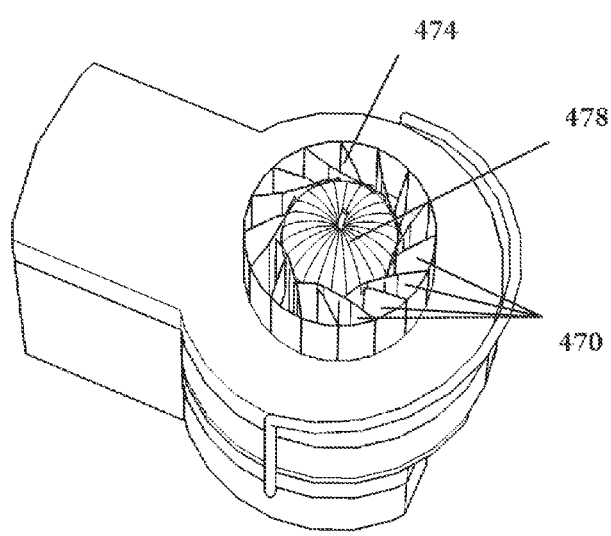
FIG. 62 is an illustration of a perspective top view of the centrifugal juicer having a food item inserted therein of FIG. 58 according to one embodiment of the subject application.
Figure 63:
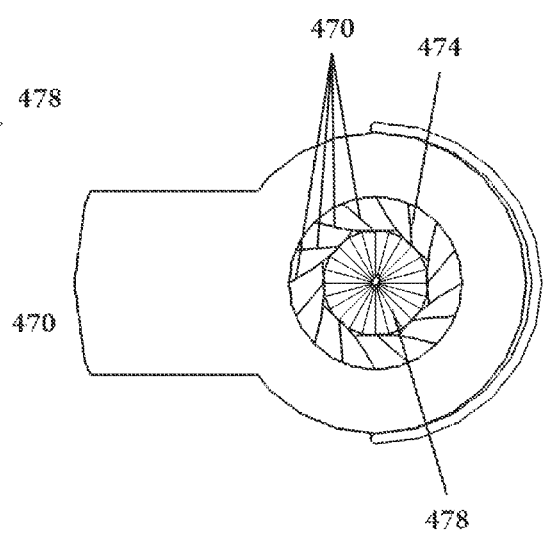
FIG. 63 is an illustration of a direct overhead perspective view of the centrifugal juicer of FIG. 62 according to one embodiment of the subject application.

FIG. 62 is a perspective taken from the same viewpoint as FIG. 60. FIG. 62 shows exemplary food 478 being inserted into pliable vertical rib insert 474, and shows how inward directed pliable vertical ribs 470 deflect, direct, and hold exemplary food 478 while it drops down onto the shredder disc of embodiment centrifugal juicer 468. FIG. 63 is a direct overhead view of FIG. 62 depicting exemplary food 478 therein.

Inward directed pliable vertical ribs 470 allow a large feed opening while simultaneously impeding hand entry into feed chute 472. This offers users both a benefit by having a feed opening which can accept large articles of food without the necessity to cut them into smaller pieces, and a safety benefit by preventing accidents caused by user contact with the shredder blade.

Inward directed pliable vertical ribs 470 also block food particles created and propelled by embodiment 468's shredder disc from exiting the top of feed chute 472. This too is a safety benefit to the user. It also helps reduce messes on countertops, users, and adjacent floors.

Exemplary Preferred Embodiment Twenty-Three

Preferred embodiment centrifugal juicer 480 is shown in FIGS. 64 through 67. Preferred embodiment 480 has segmented pliable sheet cover 482 covering entry 484 to feed chute 486.

Figure 66:
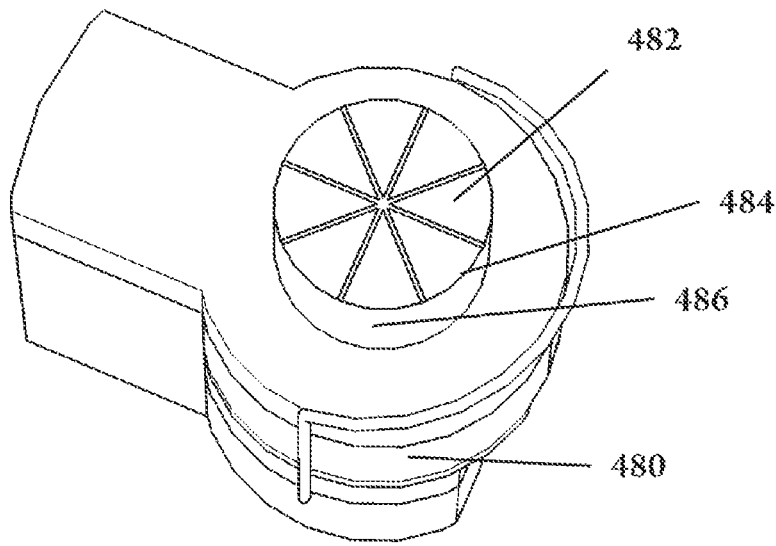
FIG. 66 is an illustration of an overhead perspective view of the centrifugal juicer having the segmented pliable sheet cover insert member over the entry to the feed chute of FIG. 64 according to one embodiment of the subject application.
Figure 67:
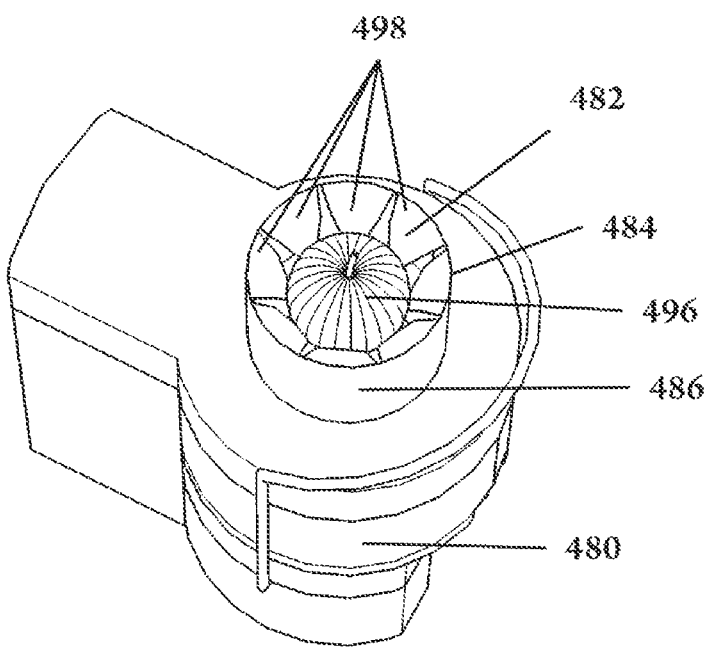
FIG. 67 is an illustration of an overhead perspective view of the centrifugal juicer having a segmented pliable sheet cover insert member over an entry to a feed chute of FIG. 64 with a food item inserted therein according to one embodiment of the subject application.
Figure 75A:
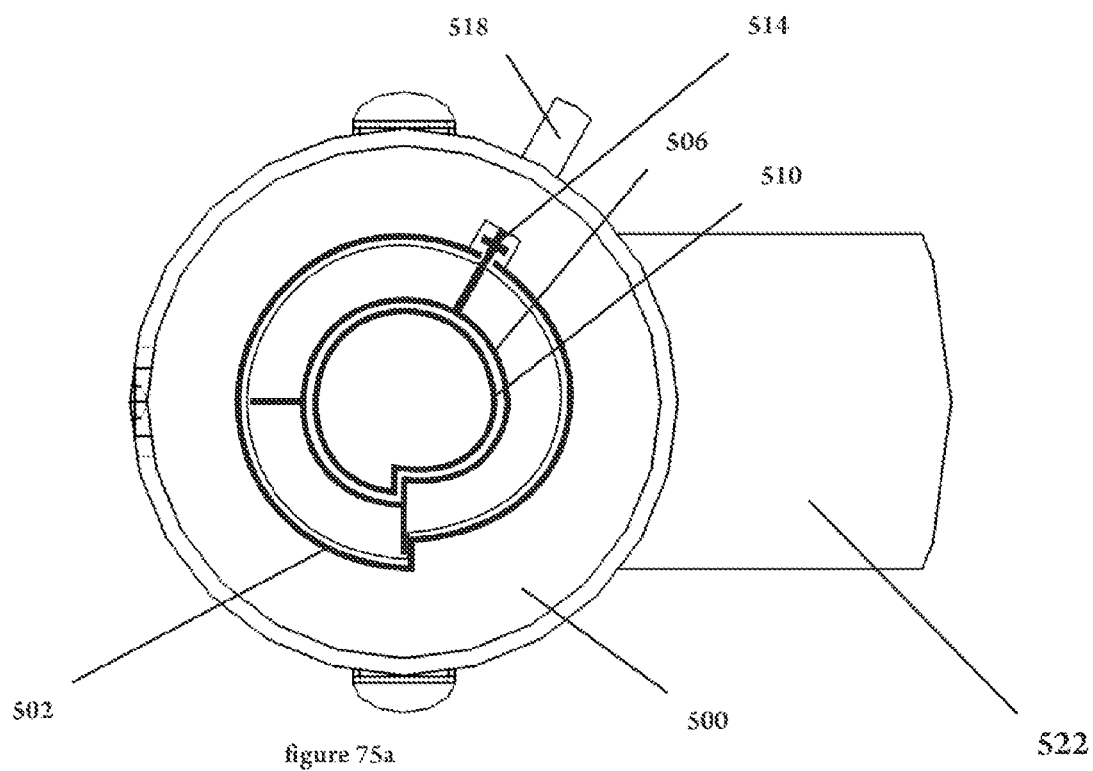
FIG. 75a is an illustration of an overhead view of the centrifugal juicer of FIG. 72, FIG. 73, and FIG. 74 according to one embodiment of the subject application.
Figure 75B:
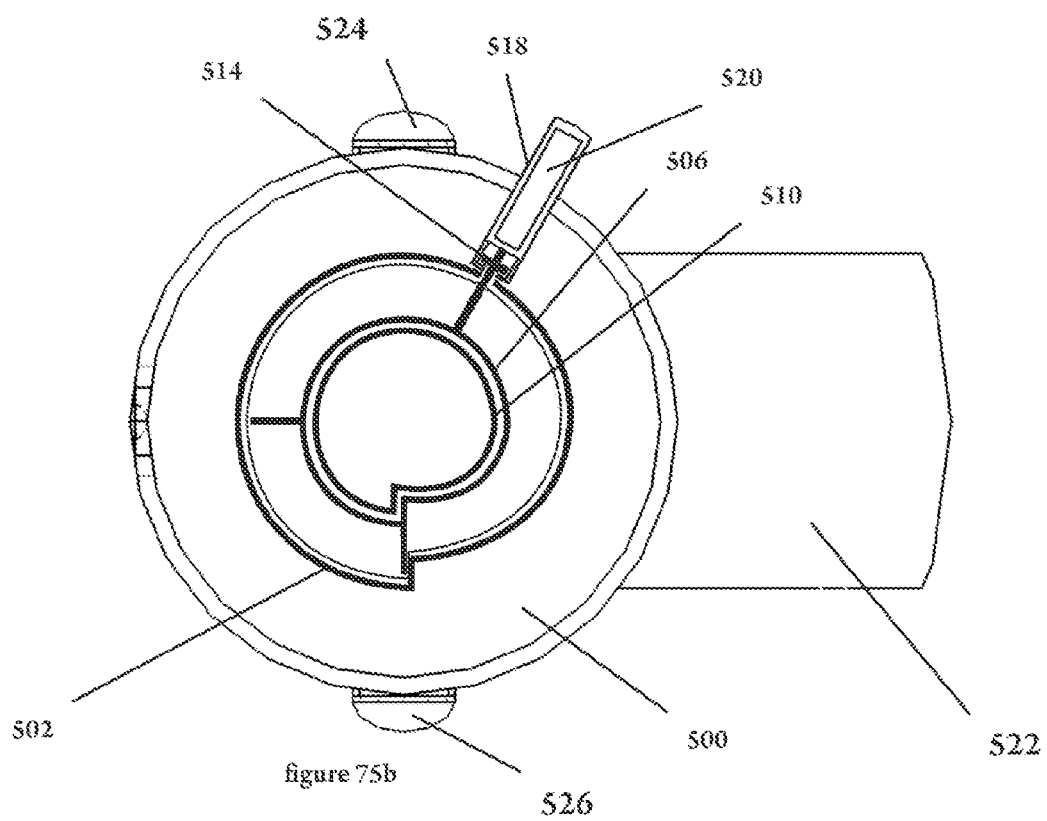
FIG. 75b is another illustration of an overhead view of the centrifugal juicer of FIG. 72, FIG. 73, and FIG. 74 according to one embodiment of the subject application.

Segmented pliable sheet cover 482 is comprised of multiple pliable sheets 488 which are in close proximity and are able to separate and bend to allow passage of articles of food through cover 482, as shown in FIG. 67, while being able to block entry 484 when food articles are not passing through cover 482, as shown in FIG. 66.

Figure 64:
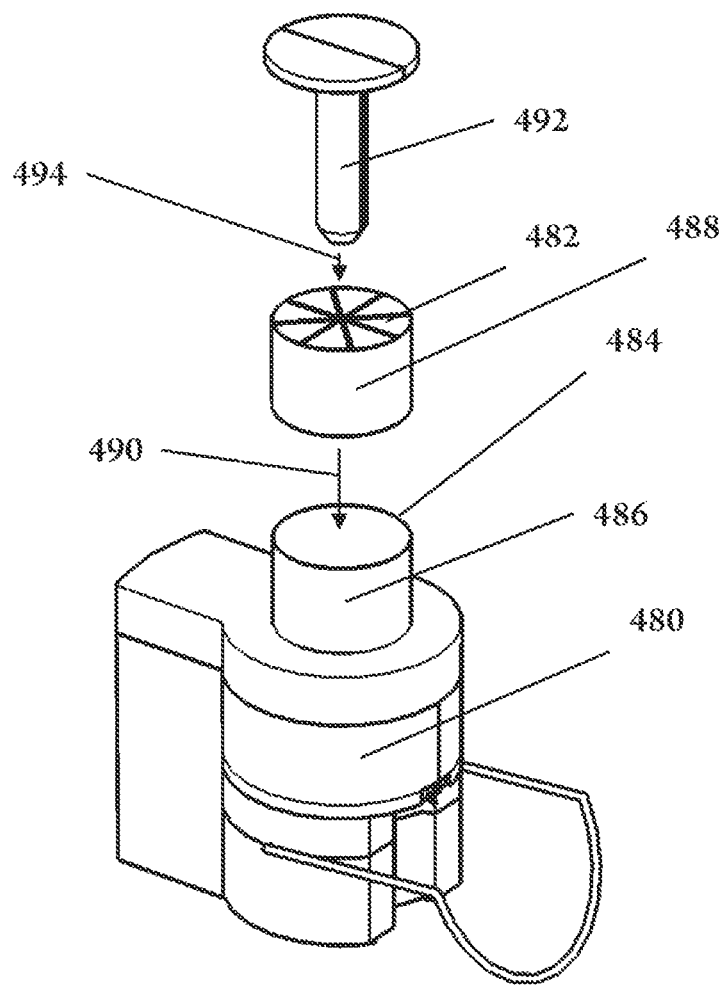
FIG. 64 is an illustration of a perspective view of a centrifugal juicer having a segmented pliable sheet cover insert member over an entry to a feed chute according to one embodiment of the subject application.

A multitude of segment patterns is possible besides the radiating pattern shown in FIGS. 64, 66 and 67. As a non-limiting example, referring to FIGS. 90 and 90a, a fishbone type of pattern is shown as an alternative.

FIG. 64 is a perspective view with segmented pliable sheet cover insert member 488 ready to be inserted 490 into feed chute 486, and pusher plunger 492 ready to be subsequently inserted 494 through segmented pliable sheet cover 482.

Figure 65:
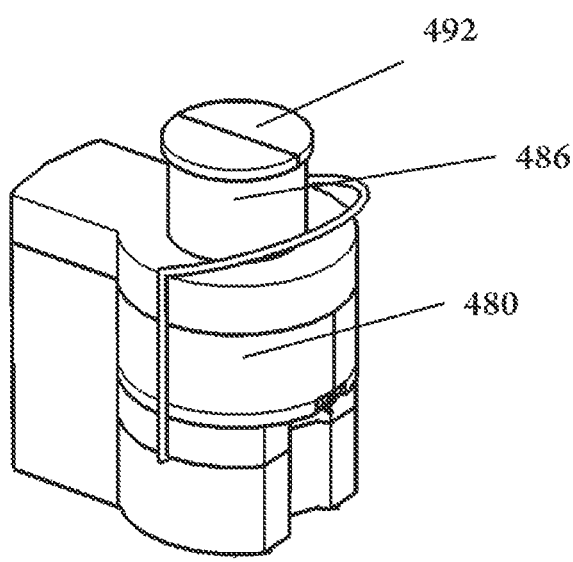
FIG. 65 is an illustration of the perspective view of the centrifugal juicer of FIG. 64 having the pliable sheet insert member and pusher plunger fully inserted into the feed chute according to one embodiment of the subject application.

FIG. 65 is a perspective view taken from the same viewpoint as FIG. 64. It shows preferred embodiment 480 with segmented pliable sheet cover insert member as 488, and pusher plunger 492 fully inserted into feed chute 486.

FIG. 66 is an overhead perspective view of preferred embodiment 480 with segmented pliable sheet cover insert member 488 inserted into feed chute 486. In this disposition, segmented pliable sheet cover 482 blocks entry 484 to feed chute 486. This helps prevent accidents due to user contact with the shredder disc and other internal moving parts of preferred embodiment 480. It also helps to prevent particles of food which have been created by the shredder disc of preferred embodiment 480 from being propelled by the shredder disc back out of entry 484 of feed chute 486. Food particles escaping entry 484 might cause countertop and user messes, and might create a safety hazard from food particle impact.

FIG. 67 is an overhead perspective view of preferred embodiment 480 taken from the same viewpoint as FIG. 66. FIG. 67 shows exemplary food article 496 being inserted through segmented pliable sheet cover 482. While food article 496 is passing through segmented pliable sheet cover 482 it is held by segments 498 of segmented pliable sheet cover 482 which helps to stabilize and control food article movement. This is particularly true of the elongated shape foods such as carrots and celery, where segments 498 help to control rotational and vibrational movement.

Segmented pliable sheet cover 482 may be made of any of variety of materials including, by way of non-limiting examples: silicon or neoprene rubber, or various elastomers.

Exemplary Preferred Embodiment Twenty-Four

FIGS. 68 through 71 and including FIG. 71 enlargement, 71A, show a preferred embodiment, centrifugal juicer embodiment 342. Embodiment 342 adds an additional juice extracting step to its juicing method.

Initially food is lowered through feed chute 344 onto shredding disc 346 where the food is first disintegrated and, driven by centrifugal force, food escapes under lower edge 348 of feed chute 344.

Feed chute 344 is generally cylindrical except for vertical protrusion 350 which runs the full height of chute 344. Protrusion 350 helps to stabilize food fed into chute 344 and prevent the food from spinning and/or having other undesirable motions.

Once escaping under lower edge 348 of feed chute 344, food particles, driven by centrifugal force, move up the inside of inverted truncated cone filter 352.

Part way up the inside of inverted truncated cone filter 352, annular converging wall 354 squeezes the food particles against the inside of inverted truncated cone filter 352 resulting in additional liquid being extracted from the food particles.

One or more roughened surfaces may aid in this additional liquid extraction process. As a non-limiting example, shredder plates 356 with sharpened protrusions on their inward facing surfaces might be mounted on the inside of inverted truncated cone filter 352. Such plates could, by way of non-limiting examples, be larger or smaller or of greater or lesser number than those illustrated in FIG. 70, and might even extend the full inner diameter of inverted truncated cone filter 352. They might also be of different shape than those illustrated in FIG. 70 such as, by way of non-limiting examples, round or triangular. Their roughened surfaces might be sharp points, or might be linear or curved blade-like protrusions or might be textured like sandpaper.

As another non-limiting example of such roughened surfaces, shredder plate 358 might be mounted on annular converging wall 354 as illustrated in FIG. 69. Again, by way of non-limiting examples, such a plate could be larger or smaller or of greater number than that illustrated in FIG. 70, and might even extend the full outer diameter of annular converging wall 354. It might also be of different shape than that illustrated in FIG. 69, such as, by way of non-limiting examples, round or triangular. Its roughened surface might be sharp points, or might be linear or curved blade-like protrusions or might textured like sandpaper.

Shredder plates 356 and 358 further disintegrate food particles passing through them and thereby extract additional liquid from the food particles they contact.

Exemplary Preferred Embodiment Twenty-Five

FIGS. 72 through 76 show preferred embodiment centrifugal juicer 500. Preferred embodiment 500 has large feed chute 502 extending upward from lid 504. Large feed chute 502 can have small feed chute 506 inserted 508 into it. In turn, small feed chute 506 can have pusher plunger 510 inserted 512 into it.

Activation rib member 514 on the side of small feed chute 506 passes through opening 516 on safety interlock switch stalk 518 when small feed chute 506 is being inserted 508 into large feed chute 502. Activation rib member 514, when passing through opening 516, activates safety interlock switch 520, which consequently permits embodiment centrifugal juicer 500's motor to operate. As illustrated, the safety interlock switch is located at the top of safety interlock switch stalk 518 adjacent to opening 516. However, the safety interlock switch could be located elsewhere, as by way of a non-limiting example, be located inside the lower housing of preferred embodiment centrifugal juicer 500 and be activated through mechanical means feeding through safety interlock switch stalk 518.

Having safety interlock switch 520 which is activated by insertion of small feed chute 506 into large feed chute 502, means that large feed chute 502 can be much larger in cross-section than a comparable feed chute which had to prevent through its feed chute length width and depth, accidents associated with users touching through the feed chute, dangerous internal parts, such as shredder discs. Having a larger issue may result in less food preparation time being needed because foods do not have to be cut a small in order to fit through the chute.

In use, the user inserts food articles into large feed chute 502 and, using small feed chute 506 possibly in combination with pusher plunger 510 as a pusher plunger, pushes the inserted food through large feed chute 502 onto preferred embodiment 500's shredder disc where it is juiced. Insertion of small feed chute 506 into large feed chute 502 activates safety interlock switch 520 which causes preferred embodiment 500's motor to be turned on and juicing to take place.

For smaller foods that don't require the feed chute size of large feed chute 502, small feed chute 506 may be inserted into large feed chute 502 and preferred embodiment centrifugal juicer 500 used in a conventional manner without relying for safety on safety interlock switch 520 to turn off and on preferred embodiment 500's motor while feeding food articles into preferred embodiment 500.

Large feed chute 502 is mounted on lid 522 by trunk latches 524 and 526. Securing trunk latches 524 and 526 causes not only the securing of large feed chute 502 to lid 522, but also causes lid 522 to be secured on lower body 528 of preferred embodiment 500.

Exemplary Preferred Embodiment Twenty-Six

FIGS. 77 through 81 show preferred embodiment centrifugal juicer 530. Preferred embodiment 530 uses gripping pusher plunger 532 to grasp food articles being fed into, or already fed into, preferred embodiment 530. This grasping feature helps more positively feed food articles into preferred embodiment 530, and helps reduce undesirable food movement, including rotation and vibration, which may be encountered while feeding food articles into preferred embodiment 530. Gripping pushing plunger 532 may also be used like a conventional pushing plunger to push and direct foods onto preferred embodiment 530's shredder plate.

Figure 77:
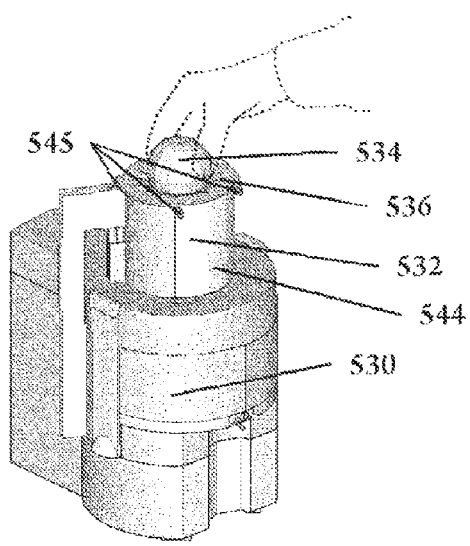
FIG. 77 is an illustration of a perspective view of a food item being pushed through a segmented pliable sheet feed chute cover of a centrifugal juicer according to one embodiment of the subject application.

FIG. 77 is a perspective view of preferred embodiment 530 showing exemplary food article 534 being pushed through segmented pliable sheet feed chute cover 536. Food articles may be introduced into preferred embodiment 530 in this manner, or by feeding the food articles directly into feed chute 538 when no pusher plunger is in place, or they may be fed in using the gripping feature of gripping pusher plunger 532 to hold and lower in a controlled fashion food articles.

Preferred embodiment centrifugal juicer 530 uses a safety interlock switch as described earlier herein to prevent accidental user contact with the spinning shredder disc of preferred embodiment 530.

FIG. 78 is a perspective view from the same vantage point as FIG. 77. FIG. 78 shows gripping pushing plunger 532 in its upper position entering into feed chute 538 and gripping pushing plunger 532 holding a food article (which is out of view) while preparing to lower 540 the food article into preferred embodiment 530 in a controlled manner.

FIG. 79 is a perspective view from the same vantage point as FIG. 78. Here, pusher plunger 532 has been fully lowered.

FIG. 80 is a perspective view taken from in front and below preferred embodiment centrifugal juicer 530. FIG. 80a is an enlarged of portion of FIG. 80 as indicated in FIG. 80. Gripping pushing plunger 532 has pivoted jaws 542 and 544 which are suspended from pivots 545 and move in 546 under squeezing hand pressure and out 548 under outward bias from internal springs. At the end of each pivoted jaw there are gripping surfaces which may include gripping teeth 550. In the alternative, and by way of non-limiting examples, sandpaper-like roughened surfaces, or spikes, or raised ribs, etc. might be used with or without gripping teeth 554 or they may be each used alone or in combinations and permutations with each other.

Figure 81:
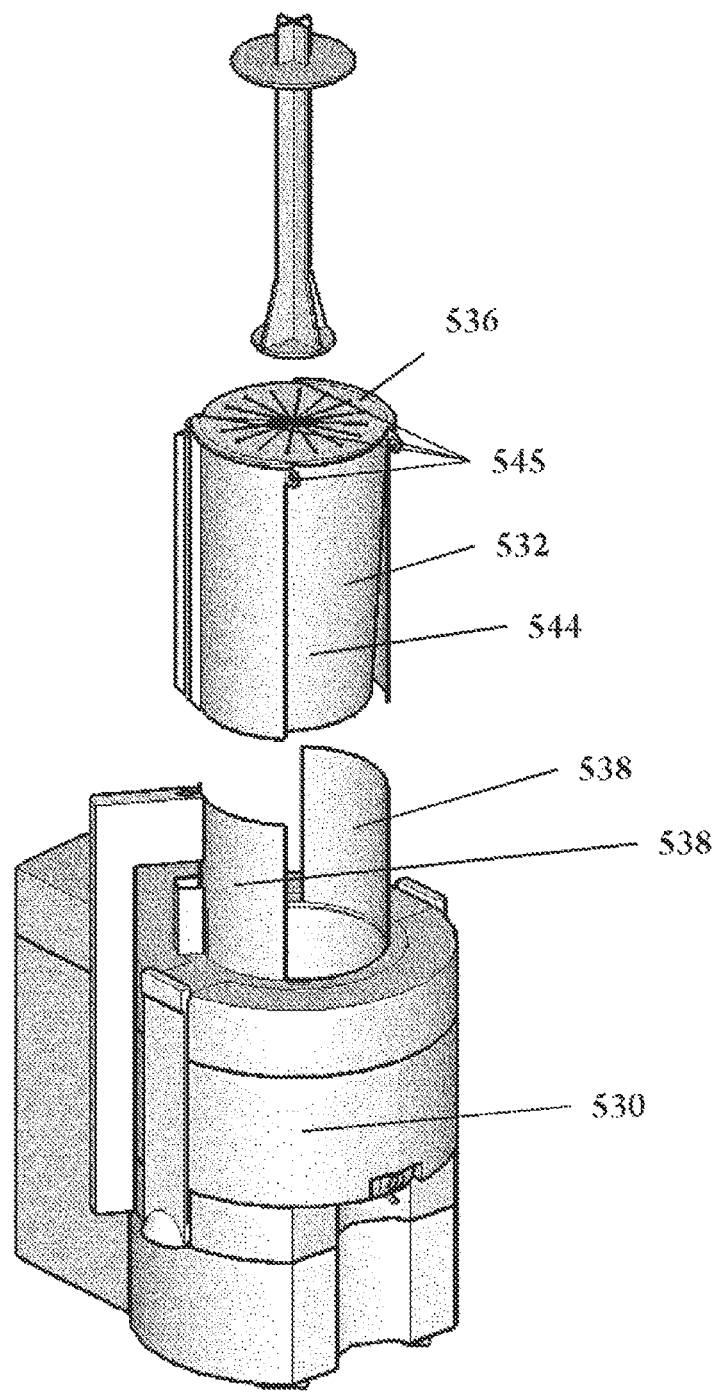
FIG. 81 is an illustration of an exploded perspective view of the centrifugal juicer of FIGS. 77-80a according to one embodiment of the subject application.

FIG. 81 is an exploded perspective view of preferred embodiment centrifugal juicer 530.

Exemplary Preferred Embodiment Twenty-Seven

FIGS. 82 through 84 show preferred embodiment centrifugal juicer 552 which is similar to preferred embodiment centrifugal juicer 530 described earlier herein except gripping pusher plunger 554 and feed chute 556 are constructed differently than their counterparts found on preferred embodiment 530. Here, there is only one gripping plate 558 which swings on pivots about vertical axis 568 inside outer walls 560 of gripping pusher plunger 554.

Preferred embodiment centrifugal juicer 552 offers similar benefits to preferred embodiment centrifugal juicer 530.

Gripping plate 558 is moved to its in position as shown in FIG. 82, and shown by ghosted lines 572 in FIG. 83, through finger pressure on rear wall 576 of gripping plate 558. As shown in FIG. 84, rear window 578 through outer walls 560 allow finger access to rear wall 576 of gripping plate 558.

Gripping plate 558 is moved to its out position as shown by solid lines 570 in FIG. 83 under bias from internal springs. FIG. 82 is a perspective view taken from below and in front of preferred embodiment 552. FIG. 82 shows gripping pusher plunger 554 holding exemplary food article 574 with gripping plate 558 in its pivoted in or gripping position.

FIG. 83 is a perspective view of gripping pusher plunger 554 taken from below and in front of gripping pusher plunger 554. FIG. 83 shows gripping plate 558 with solid lines 570 in its pivoted out position, and it shows gripping plate 558 in ghosted lines 572 in its pivoted in position holding exemplary food article 574 which is also ghosted, in its grasp.

FIG. 84 is a perspective view of gripping pusher plunger 554 taken from above and behind gripping pusher plunger 554. It, like FIG. 83, shows exemplary food article 574 being gripped by gripping pusher plunger 554 in its pivoted in position.

Gripping pusher plunger 554 is generally cylindrical and has generally cylindrical gripping plate 558 pivoted 562 forward 564 and rearward 566 on vertical axis 568 inside pusher plunger 554's outer walls 560.

Gripping plate 558 has teeth 580 on its interior surface to aid in gripping food articles. Other texturing might be used to hold food articles such as, by way of non-limiting examples, a sandpaper like finish, small spikes, waffle patterns, etc.

Also portions of the interior of outer walls 560 might be textured in a similar manner to aid in gripping food articles.

Exemplary Preferred Embodiment Twenty-Eight

FIGS. 85 and 86 show preferred embodiment centrifugal juicer 582 which has feed chute 584 that has pivots 592 to allow it to rotate up 588 to a use position as shown in FIG. 85, and down 590 to a more compact shipping and storage position, as shown in FIG. 86.

Exemplary Preferred Embodiment Twenty-Nine

FIGS. 87 through 90 including FIG. 90 enlargement, FIG. 90*a*, show preferred embodiment blender 594.

FIG. 87 is a perspective of preferred embodiment blender 594. FIG. 88 is an x-ray perspective taken from the same viewpoint as FIG. 87. FIG. 89 is a right side view of preferred embodiment blender 594 with various internal components including, but not limited to, inclined motor 596, shown in ghosted lines. FIG. 90 is an exploded perspective view of preferred embodiment blender 594. FIG. 90*a* is an enlarged this of a portion of FIG. 90 as indicated in FIG. 90.

Preferred embodiment blender 594 has inclined motor 596 mounted to the bottom of blending container 598 using motor mount 600 which is disposed generally at right angles to inclined motor drive shaft 602. Blending container 598 has open bottom 604 which attaches blade mount 606 and rotary blade 608 which is rotationally mounted to blade mount 606.

Blending container 598 has a generally vertical orientation. Located on forward face 610 of blending container 598 are valve 612 and pour spout 614. Mounted between valve 612 and pour spout 614 is first filter mesh 616. Second filter mesh 618 is part of preferred embodiment blender 594 and has a filter mesh which allows coarser solids through it than is allowed by first filter mesh 616. Thus the amount of solids, such as pulp, contained in liquids, and semi-liquids dispensed through valve 612 and pour spout 614 can be controlled by substituting different filter meshes with one another, such as substituting first filter mesh 618 with second filter mesh.

Filter meshes 616 and 618 are each U-shaped in plan view and are mounted into forward blending container channel 620. Pour spout 614 is mounted at the top of or blending container channel 620 and valve 612 is mounted at the bottom of forward blending container channel 620. Thus in order for liquid to exit blending container 598 through either valve 612 or pour spout 614, the liquid must pass through a filter mesh, such as first filter mesh 616 or second filter mesh 618.

Mounted on the back of blending container 598 is handle 622 which helps in manipulating blending container 598. Such manipulation may include, but is not limited to, mounting and dismounting blending container 598 from blender base 624, as well as pouring liquid from pour spout 614 and placing blending container 598 in a refrigerator or elsewhere.

Channels 626 hold blending container 598 as do mounting detent 628, to blender base 624. Together they mount blending container 598 in a generally vertical orientation. Frustum conical drive coupling 630 couples inclined motor 596 to blade 608 and allows, along with channels 626 and mounting detent 628, blending container 598 to be mounted and dismounted from blender base 624 through vertically lifting or dropping blending container 598 away from or onto blender base 624. This in turn may simplify and make more intuitive mounting and dismounting blending container 598 from blender base 624.

Having inclined motor 596 being mounted at angle to the generally vertical orientation of blending container 598 offers several potential advantages. As a non-limiting example, the bulk of the weight of relatively heavy inclined motor 596 is more behind the center of mass of blending container 598 than if inclined motor 596 were not inclined, which helps prevent preferred embodiment blender 594 from falling forward. By lessening the need for protruding forward facing countertop supports or extended forward facing outlet valves, this potentially saves countertop space.

As another non-limiting example, the spatial mass of inclined motor 596 is also more behind the center of spatial mass of blending container 598 than if inclined motor 596 were not inclined, which allows valve 612 space to be located more under the center of mass of blending container 598 rather than protrude outward. This also potentially saves countertop space.

As another non-limiting example, in combination with the configuration of blending container 598, the inclination of blade 608 may improve the flow of blending materials within blending container 598, at least because a vortex created by blade 608 will be inclined into forward face 610 of blending container 598 and be deflected. This can reduce blending ineffectiveness caused by vertical blending vortexes.

FIG. 90 shows lid 632 which utilizes segmented pliable sheet cover 634 which has radial segmentation pattern 636. It also shows lid 638 which has fishbone segmentation pattern 640. FIG. 90a shows how fishbone segmentation pattern 640 allows exemplary food article 642 to pass through it. These patterns demonstrate by way of non-limiting examples that segmented pliable sheet covers can be made in many geometric segmentation forms.

Exemplary Preferred Embodiment Thirty

FIGS. 91 through 93 show preferred embodiment blender 644 with gripping pusher plunger 646. FIG. 91 is a perspective view of gripping pusher plunger 646 with its open arm non-grasping disposition shown in solid lines 648, and its clamping arm grasping disposition shown in ghosted lines 650.

FIG. 92 is a perspective view of preferred embodiment blender 644 with grasping pusher plunger 646 ready to be inserted 654 through pliable segmented sheet lid 652 into blending container 656.

FIG. 93 is a perspective view taken from the same vantage point as FIG. 92, but after grasping pusher plunger 646 has been inserted into blending container 656 through pliable segmented sheet lid 652.

Gripping pusher plunger 646 is comprised of a first arm 658 and a second arm 660. First arm 658 is pivoted on its upper end on pivot point 662 and on a second mirror image pivot point which is on the opposite side of first arm 658 and not shown. Second arm 660 is pivoted on its upper end on pivot point 664 and on a second mirror image pivot point which is on the opposite side of second arm 660 and not shown.

Movement of first arm 658 and second arm 660 is controlled by finger grip 666 located adjacent to pivot point 662 and by an opposing mirror image finger grip which is not shown and is located at the top of second arm 660 adjacent to pivot point Inward finger pressure 668 on the two finger grips causes gripping pusher plunger 646 to move from its open arm nongrasping disposition shown in solid lines in FIG. 91, to its clamping arm grasping disposition shown in ghosted lines in FIG. 91.

First arm 658 and second arm 666 are spring biased 670 away from one another with internal spring. Relaxation of finger pressure against the two finger grips causes gripping pusher plunger 646 to move from its clamping arm grasping disposition shown in ghosted lines in FIG. 91 to its open arm nongrasping disposition shown in solid lines in FIG. 91.

Gripping pusher plunger 646 can be used to insert food into preferred embodiment blender 644 as shown in FIGS. 92 and 93 and direct food while it is in blending container 656. It can also be used as a conventional blender plunger, similar to that found on VitaMix™ brand blenders.

Exemplary Preferred Embodiment Thirty-One

FIGS. 94 and 95 show preferred embodiment blender 672. Preferred embodiment blender 672 has support platform 674 hinged to its forward face on pivot 676 and on a mirror image pivot not shown which is located on the opposite side of support platform 674.

For compact storage or shipment or for other purposes, support platform 674 can be placed in its vertical position as shown in FIG. 94.

To help stabilize preferred embodiment blender 672, support platform 674 can be pivoted down 678 to the disposition shown in FIG. 95. Finger operated lock 680 adjacent to pivot 676 holds support platform 674 in its lowered position as shown in FIG. 95.

Preferred embodiment blender 672 has shutoff valve 682 located at the base of blending container 684. This permits liquids within blending container 684 to be dispensed through shutoff valve 682.

Shutoff valve 682 is constructed in a similar manner to liquid outlet passage 264 shown in FIGS. 16, 16a, 16b, and 16c except in addition to projection 258 which may be controlled by movement of a liquid collection vessel against projection 258, shutoff valve 682 also has finger grips 686 which may be used to manually open and close shutoff valve 682.

Exemplary Preferred Embodiment Thirty-Two

FIGS. 96 and 97 show perspective views of preferred embodiment blender 688 taken from identical viewpoints.

Preferred embodiment blender 688 is similar to preferred embodiment blender 672 except instead of support platform 690 pivoting down to be deployed, support platform 690 telescopes out 692 from under preferred embodiment blender 688.

In its retracted position, shown in FIG. 96, preferred embodiment blender 688 is made more compact for shipping, storage or other purposes. In its telescoped out position, shown in FIG. 97, support platform 674 helps to stabilize preferred embodiment blender 688 and provides a resting platform for liquid collecting vessels such as exemplary glass 694.

Preferred embodiments of the subject application described herein illustrate underlying ideas and principles. The scope of any letters of patent issued as a result of this specification shall be limited only by the claims granted by the Patent and Trademark Office and the legal equivalents of those claims.

Many other embodiments of the subject application will be obvious to one knowledgeable in the art. Such embodiments shall be considered infringements, if they practice inventions described by granted claims and/or legal equivalents to those claims.

The invention claimed is:

1. A device comprising:
    a housing having a base disposed at a bottom thereof operable to abut an associated, generally horizontally planar resting surface;
    an electric motor having a rotatable drive shaft;
    the housing operable to secure the electric motor in an interior thereof such that the drive shaft is disposed at a vertical offset angle relative to the base;

the housing further having a top surface operable to receive an associated container such that the drive shaft extends into an interior thereof at an offset angle relative to a sidewall of the container;

the shaft operable to receive an associated rotary blade generally at an upper portion thereof;

an inlet able to accept food item;

a disintegrator comprising the rotary blade coupled to the inlet;

the disintegrator operable to disintegrated food items that pass through the inlet;

a first separator, and the first separator operable to accept disintegrated food items from the disintegrator and separate out generally liquid components and food particles within a first predetermined size range relative to food items disintegrated by the disintegrator;

the first separator configured to be user insert able and removeable from an associated housing; and a second separator, configured to be selectively substituted for the first separator, the second separator being configured to be user insert able and removable and accept disintegrated food items from the disintegrator so as to separate out generally liquid components and food particulates within a second predetermined size range of food items disintegrated by the disintegrator, the first predetermined size rang being different from the second predetermined size range.

2. The device of claim 1 further comprising:

the housing further operable to secure the electric motor at the offset angle such that the motor is angled such that a center of mass associated with the motor is disposed at a rearward portion of the housing relative to a grip on the container.

3. The device of claim 1, wherein both the first and the second separators are operable to use an applied centrifugal force to separate liquid components as well as food particulates.

4. The device of claim 1, wherein the first separator is operatively associated with a first upward expansive, rotatable frustum conical cone having first perforations of a first predetermined size, the perforations operable to separate liquid components as well as food particulates within a first predetermined size range, and wherein the second separator is operatively associated with an upward expansive, rotatable frustum conical cone having perforations of a second predetermined size operable to separate liquid components and food particulates within a first predetermined size range, and the first perforations are of a different size than the second perforations.

* * * * *